United States Patent
Jost et al.

(10) Patent No.: US 7,430,509 B2
(45) Date of Patent: Sep. 30, 2008

(54) LATTICE ENCODING

(75) Inventors: Uwe Helmut Jost, Haslemere (GB); Michael Richard Atkinson, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 10/530,044

(22) PCT Filed: Oct. 10, 2003

(86) PCT No.: PCT/GB03/04393

§ 371 (c)(1),
(2), (4) Date: Jan. 30, 2006

(87) PCT Pub. No.: WO2004/036545

PCT Pub. Date: Apr. 29, 2004

(65) Prior Publication Data

US 2006/0143009 A1    Jun. 29, 2006

(30) Foreign Application Priority Data

Oct. 15, 2002   (GB) ................................. 0224012.5

(51) Int. Cl.
   *G10L 15/00*   (2006.01)
(52) U.S. Cl. .................. 704/243; 704/250; 704/255
(58) Field of Classification Search ................ 704/243, 704/250, 255
   See application file for complete search history.

(56) References Cited

U.S. PATENT DOCUMENTS 5,799,276 A * 8/1998 Komissarchik et al. ...... 704/251
6,029,195 A * 2/2000 Herz ........................... 725/116
6,224,636 B1 * 5/2001 Wegmann et al. ........... 704/246
2005/0010412 A1 * 1/2005 Aronowitz ................... 704/254

OTHER PUBLICATIONS

Johnson, M.T., et al. "Near Minimal Weighted Word Graphs for Post-Processing Speech", International Workshop on Automatic Speech Recognition and Understanding, pp. 1-4, Dec. 1999, (http://asru99.research.att.com/abstracts/4_3523.pdf).

DiBattista,G., et al. "Drawing Directed Acyclic Graphs: An Experimental Study", Symposium on Graph Drawing, Sep. 1996, pp. 1-17, (http://citeseer.ist.psu.edu/cache/papers/cs/2383/ftp:zSzzSzftp.cs.brown.eduzSzpubzSztechreportszSz96zScs96-24.pdf/drawing-directed-acyclic-graphs.pdf/>.

* cited by examiner

*Primary Examiner*—Daniel D Abebe
(74) *Attorney, Agent, or Firm*—Fitzpatrick, Cella, Harper & Scinto

(57) ABSTRACT

Initially an embedding module (22) determines an embedding of a lattice in a two-dimensional plane. The embedding module (22) then processes the initial embedding to generate a planar graph in which no links cross. The planar graph is then simplified by a link encoding module (24) and data representing the lattice structure is generated by a shape encoding module (26)—in which the simplified planar graph is represented by a shape encoding (42) identifying the numbers of links bounding areas defined by the planar graph and data identifying the locations of those areas within the planar graph; and a link list (43) identifying the modifications made to the lattice structure by the link encoding module (24). These encodings are such that the same substructures within a lattice are represented using the same data and hence are suitable for compression using conventional techniques.

127 Claims, 25 Drawing Sheets

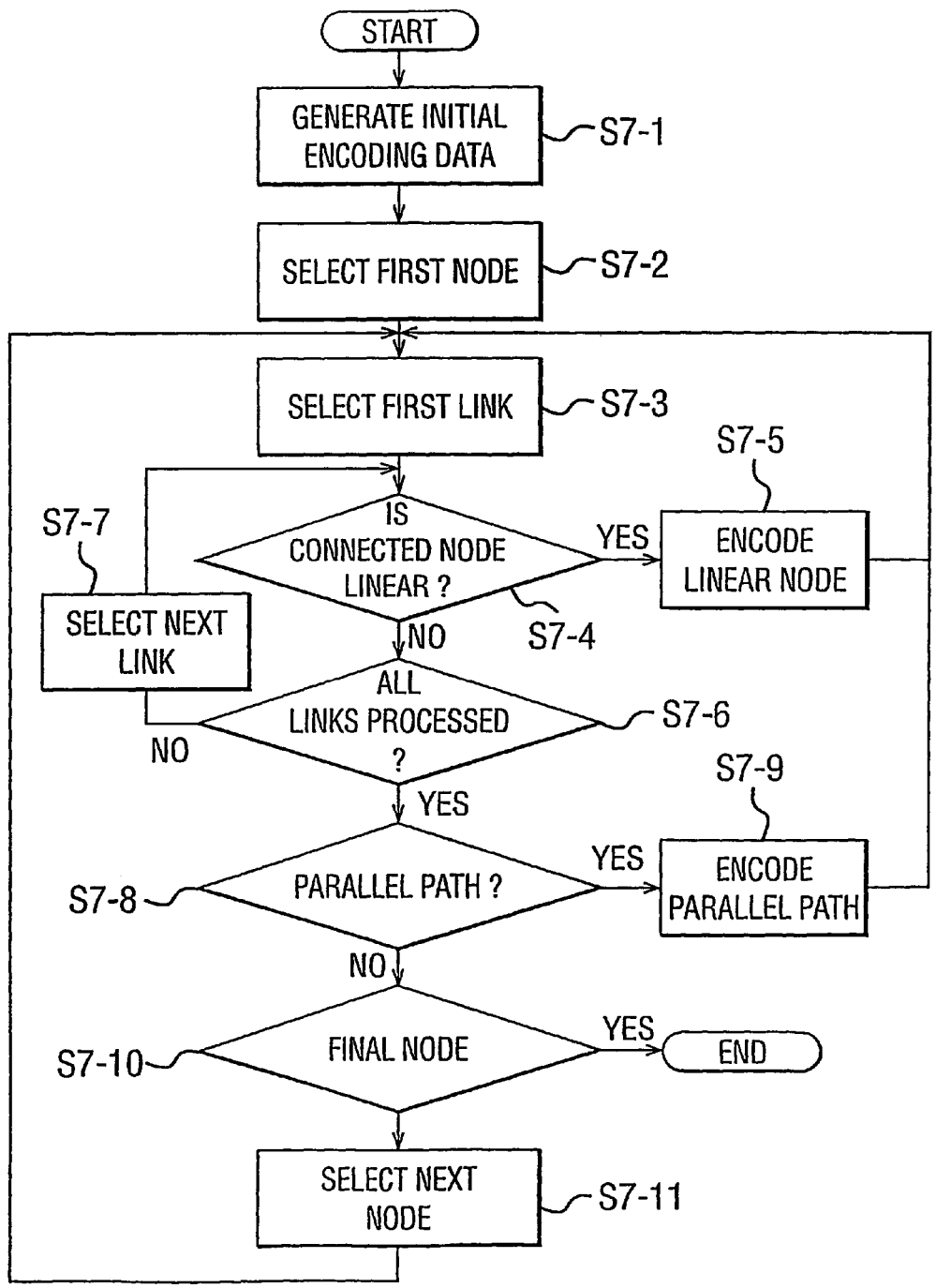

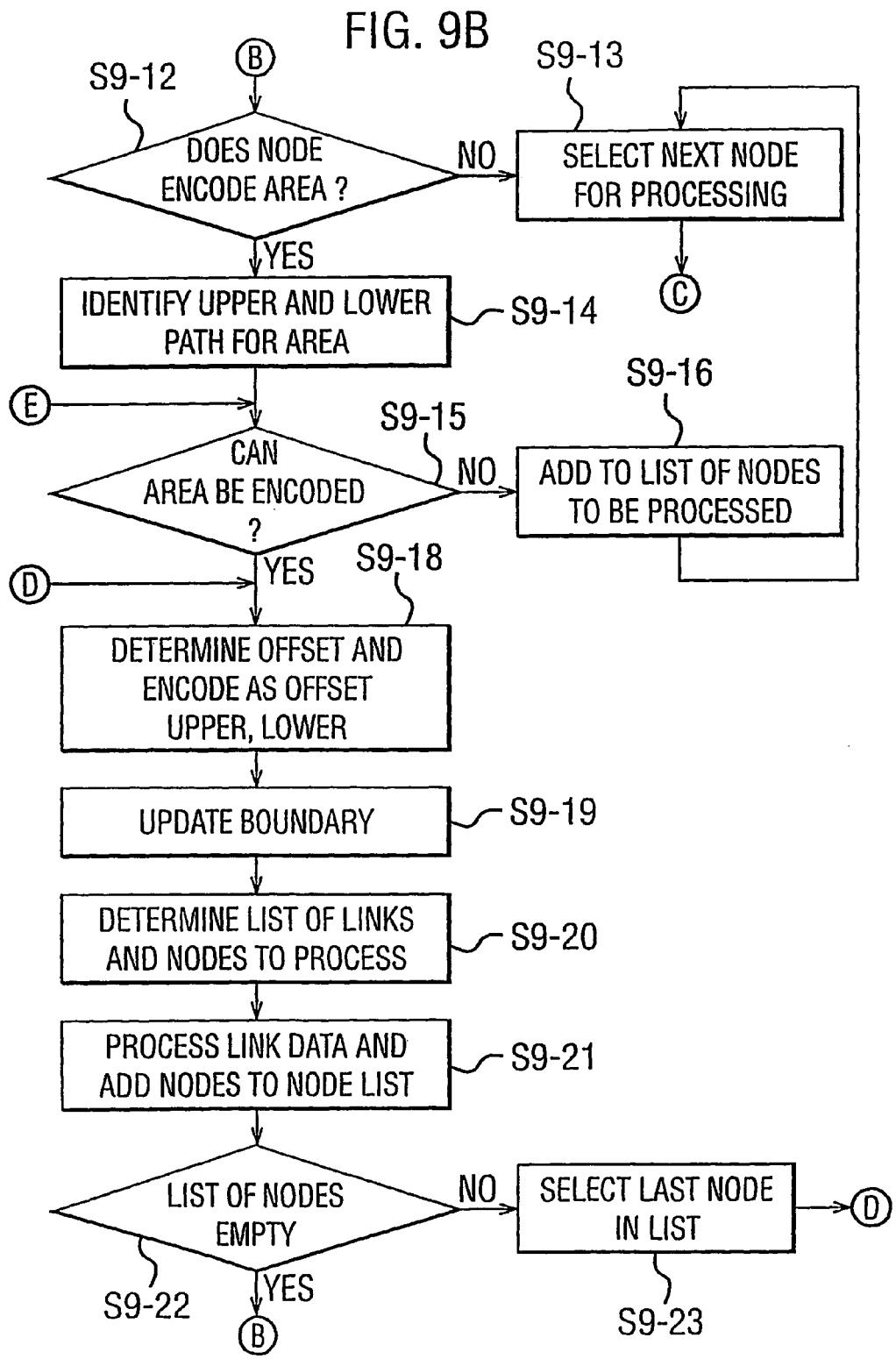

LATTICE ENCODING

The present application is concerned with methods and apparatus for encoding lattice data.

Lattices are directed acyclic graphs comprising a number of nodes interconnected by directed links. An example of a system generating lattice data is a speech recognition application where the lattice data is utilised to represent large numbers of alternative hypothesis as a detected speech signal is processed. The lattice data generated by a speech recognition system can then be utilised as the input to another application. In the case of lattice data for speech recognition systems the nodes and links of the lattice are associated with other data identifying words or other speech units such as phonemes and probabilities so that the lattice data records the alternative hypotheses a detected signal might represent.

Where lattice data is generated, two types of lattice data can be identified. Firstly there is data associated with the individual links and nodes of the lattice which identifies the hypotheses the lattice represents. Secondly there is a lattice structure identifying how the nodes of the lattice are interconnected.

Lattice structures are commonly stored by storing link data in the form of start-node end-node data. More compact representations of link data can be achieved by storing links sorted by start node (so that only end node data need be stored) and by using node offsets rather than absolute node numbers. The main problem with this approach is that the resulting encoding does not necessarily bring out any regularities in the lattice. That is to say two visually identical substructures can result in two completely different symbol sequences. This is because the link data and node numbers (or offsets) are independent of the encoding of particular substructures. Compressing the data representing the lattice structure stored in this form is therefore difficult.

Depending upon pruning parameters, lattice structures generated by for example speech recognition systems can be very large. If large lattice structures are to be stored, large amounts of storage are required. If large lattice structures are to be transmitted across a network a large amount of transmission capacity is required. There is therefore a requirement to compress lattice structures efficiently both for storage and transmission.

A representation of lattice structures is therefore needed which has a higher potential for expressing equivalent structures using the same symbol sequence and hence is more susceptible to higher compression using conventional compression techniques.

An embodiment of the present invention will now be described, by way of example only, with reference to the accompanying drawings, in which:

FIG. 7 is a flow diagram of the processing operations performed by the link encoding module of the lattice processor of FIG. 1;

Figure 1:
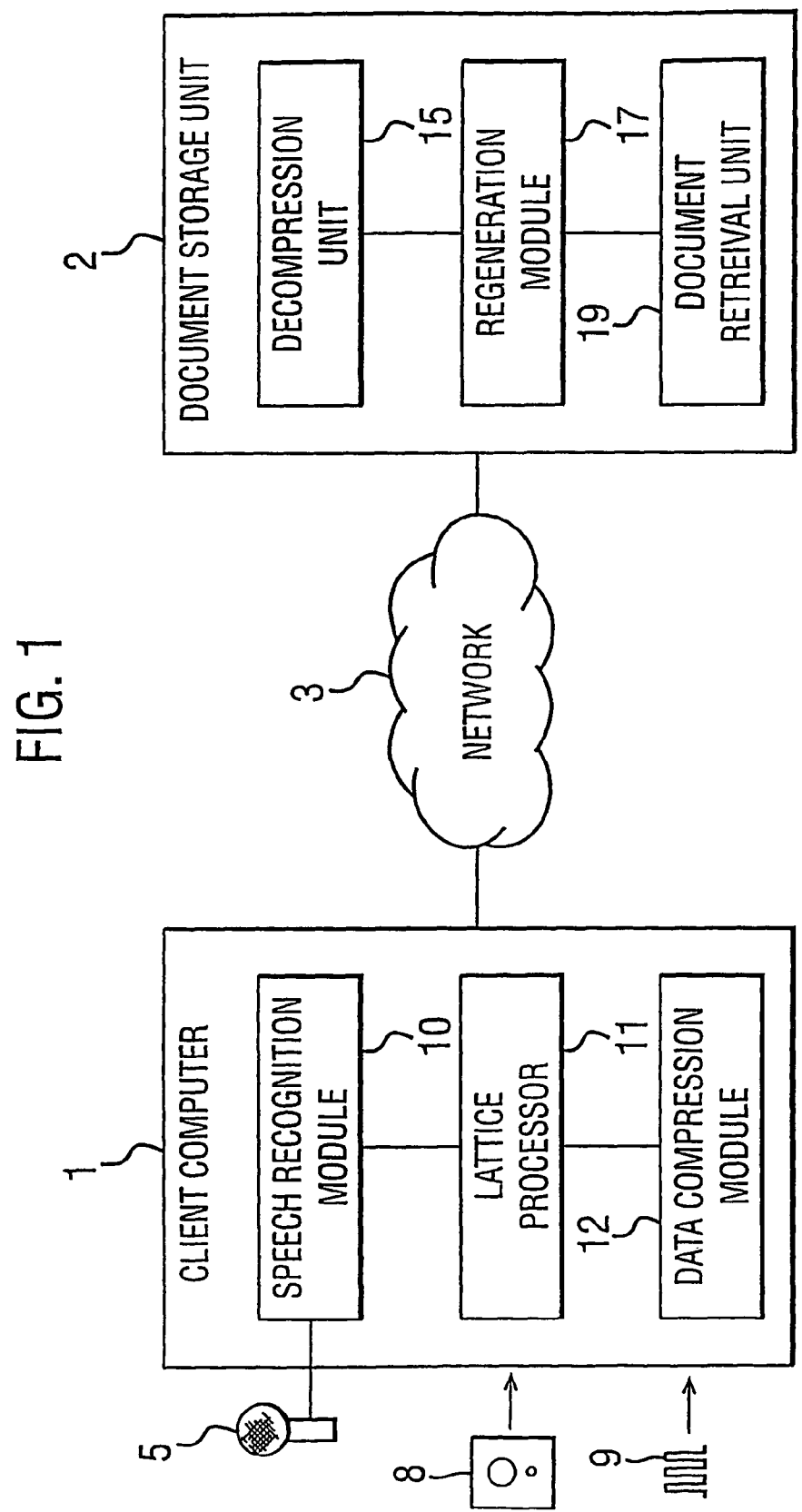
FIG. 1 is a schematic block diagram of a document retrieval system embodying a lattice processor and a regeneration module in accordance with the present invention.
Figure 6A:
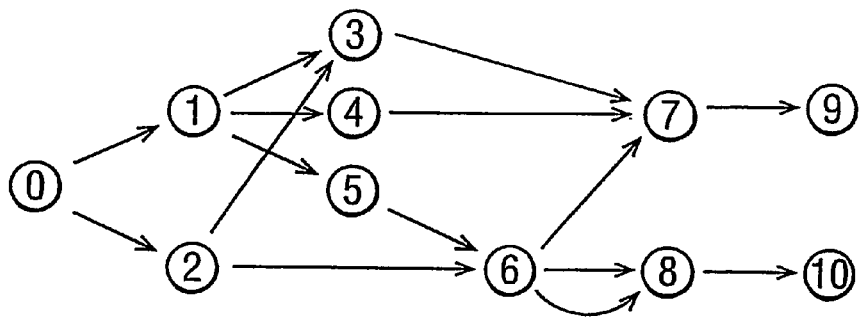
FIGS. 6A-6E are schematic illustrations of the processing of an exemplary lattice structure by the embedding module of the lattice processor of FIG. 1.
Figure 8A:
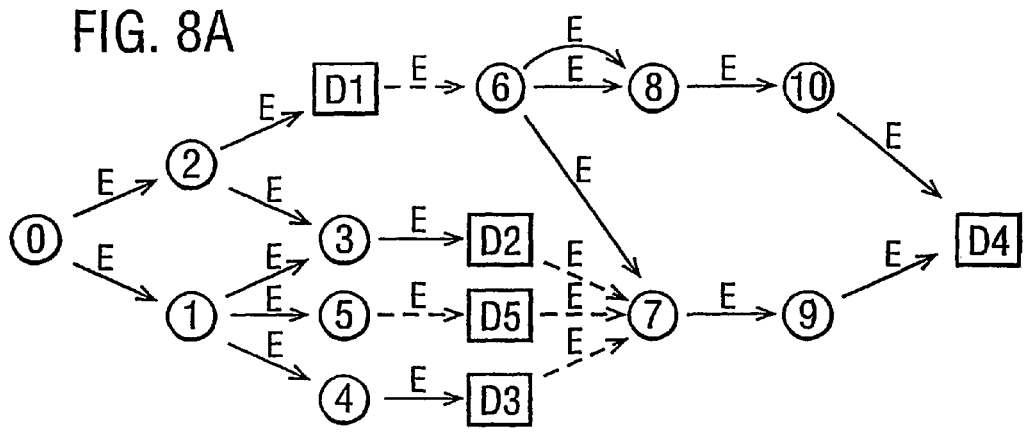
FIGS. 8A-8H are schematic illustrations of the processing of the exemplary embedded lattice structure of FIG. 6E by the link encoding module of the lattice processor of FIG. 1.
Figure 8B:
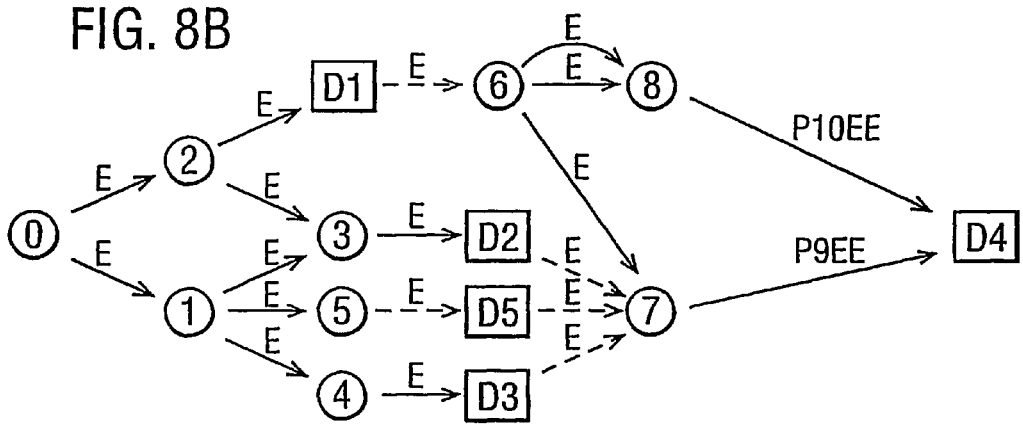
Figure 8C:
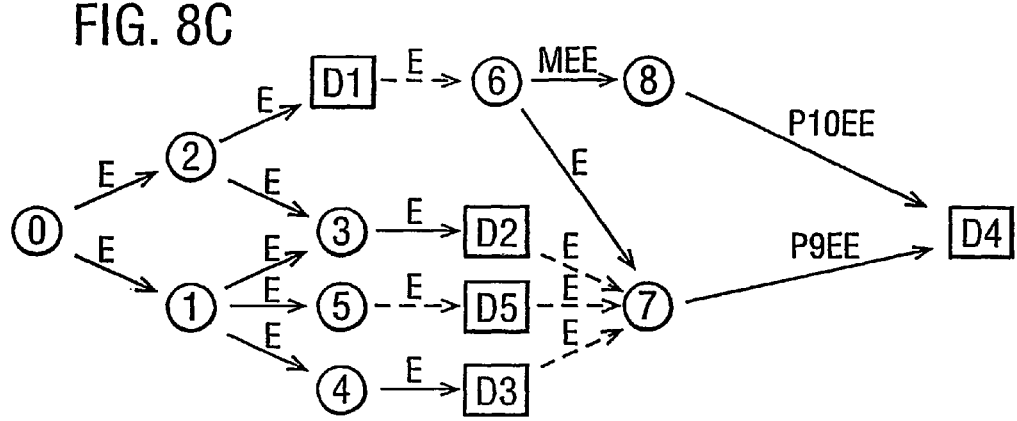
Figure 8D:
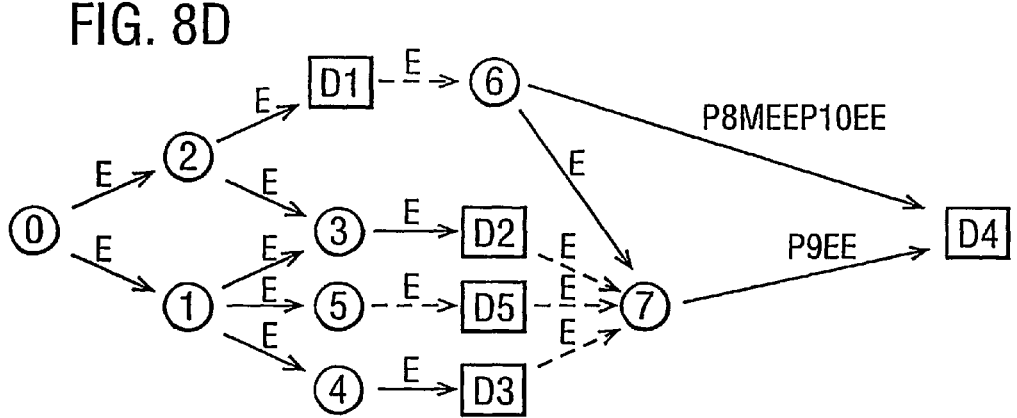
Figure 8E:
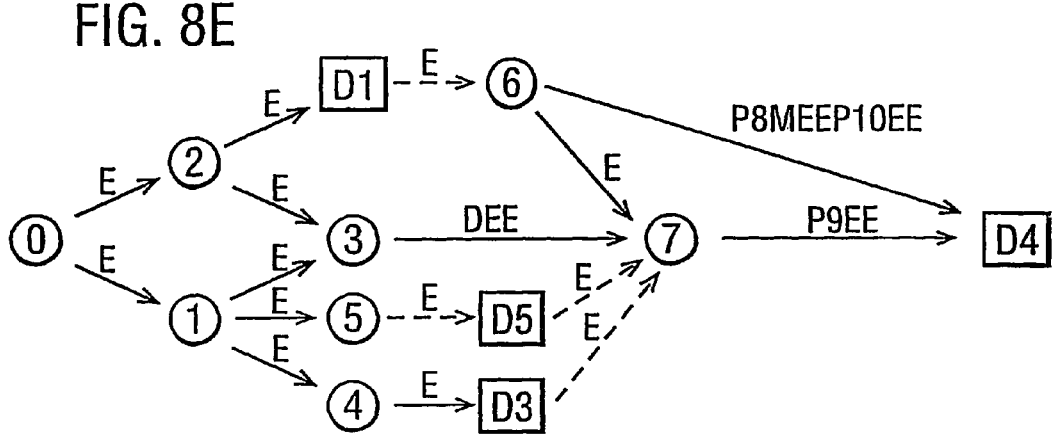
Figure 8F:
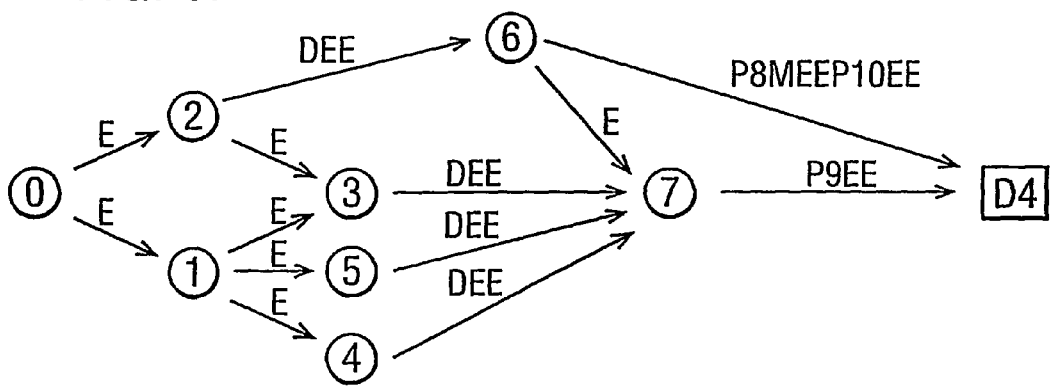
Figure 8G:
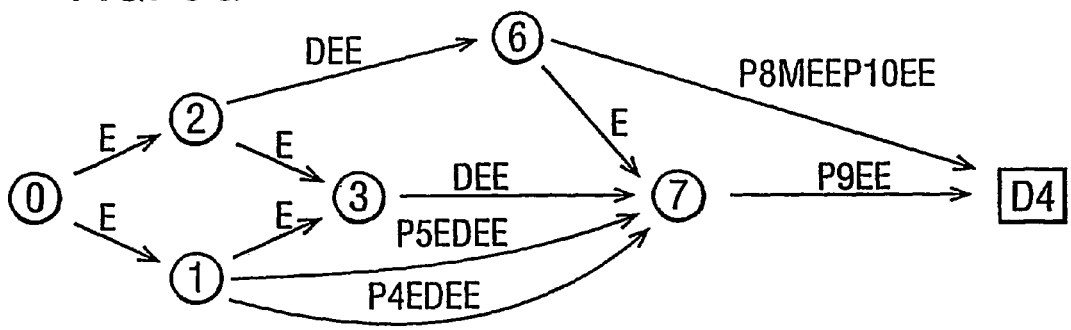
Figure 8H:
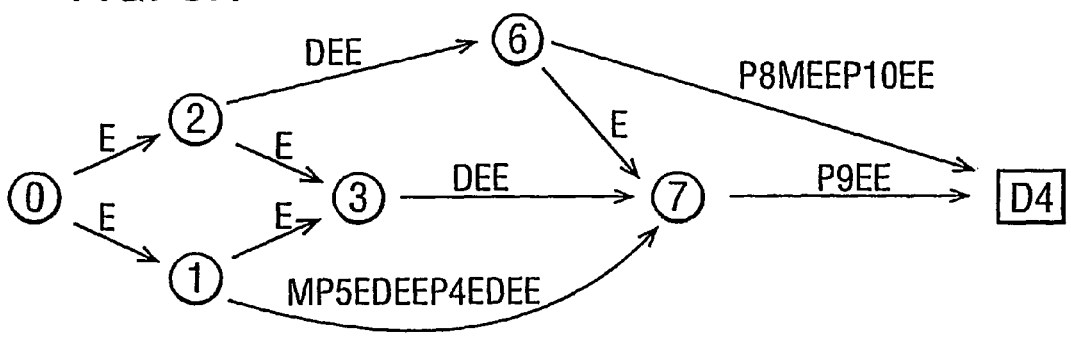
Figure 9A:
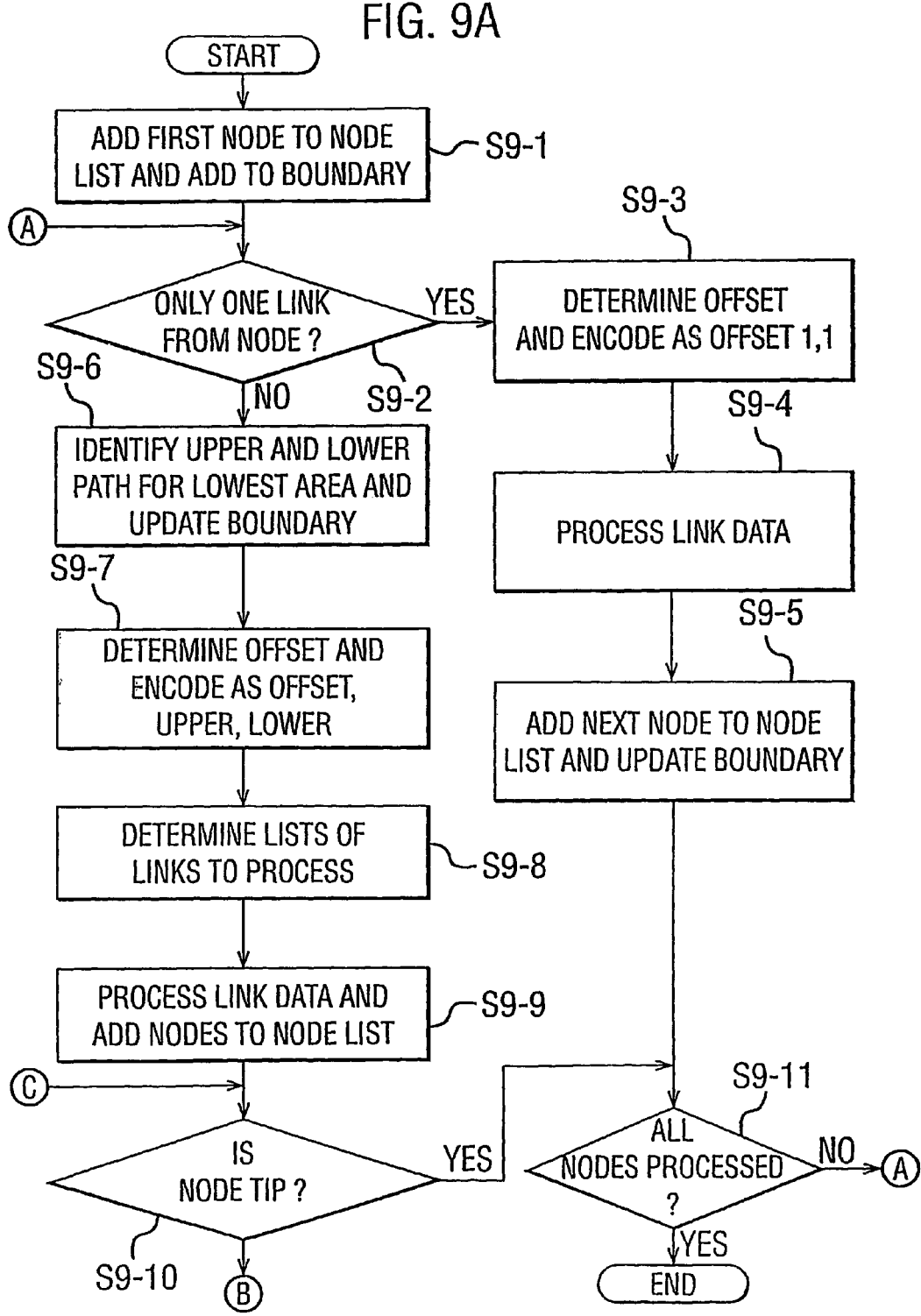
Figure 10A:
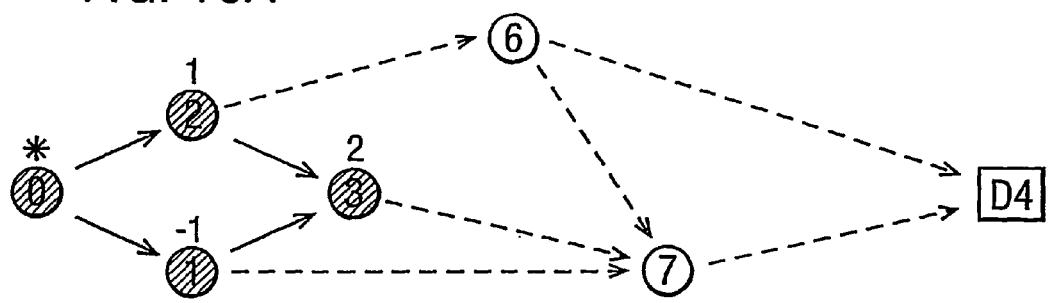
Figure 12:
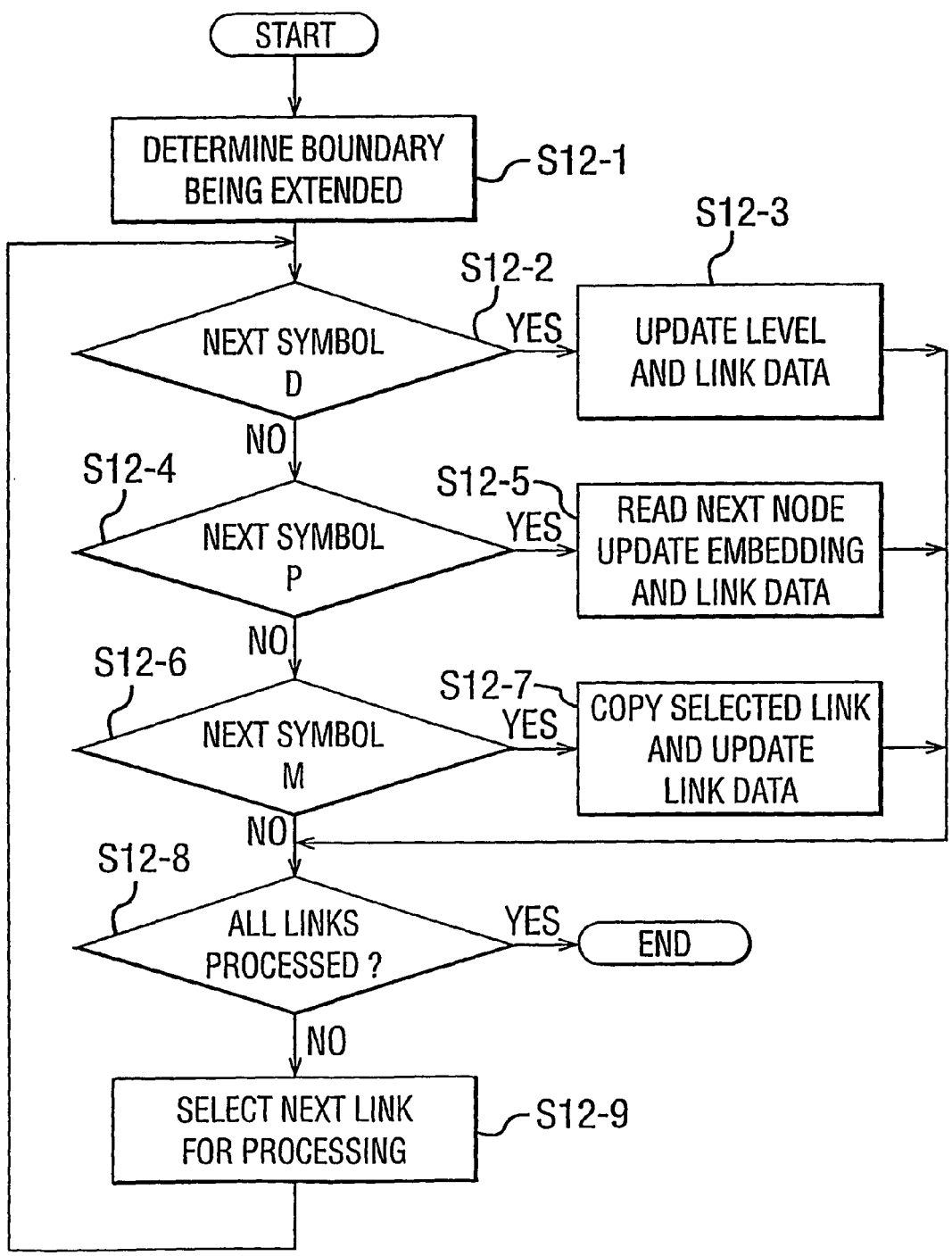
Figure 14A:
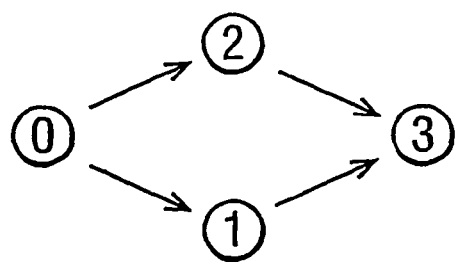
Figure 14B:
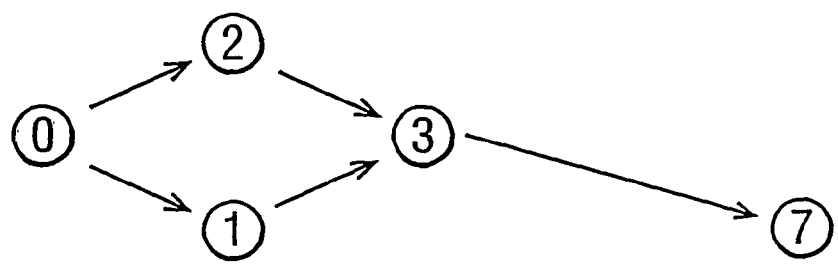
Figure 14C:
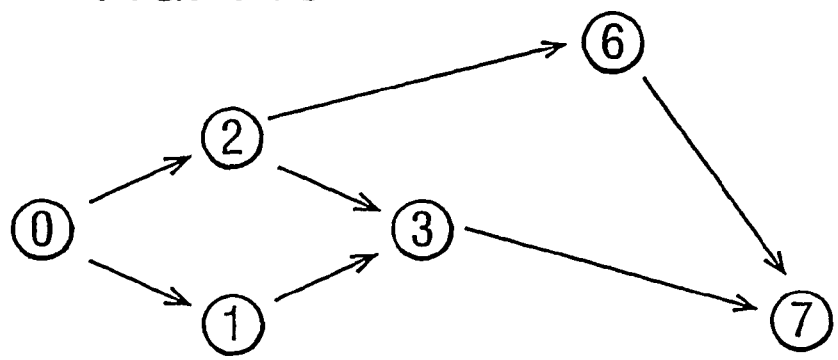
Figure 14D:
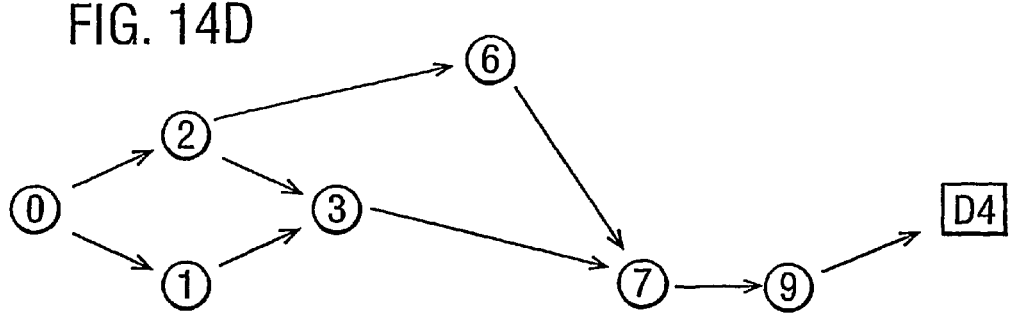
Figure 14E:
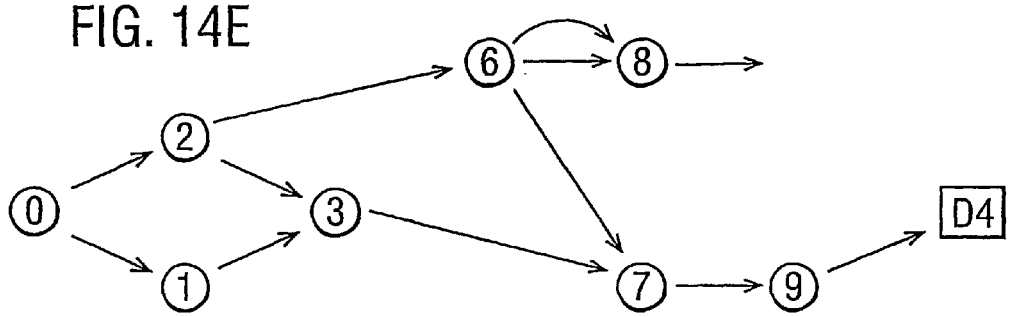
Figure 14F:
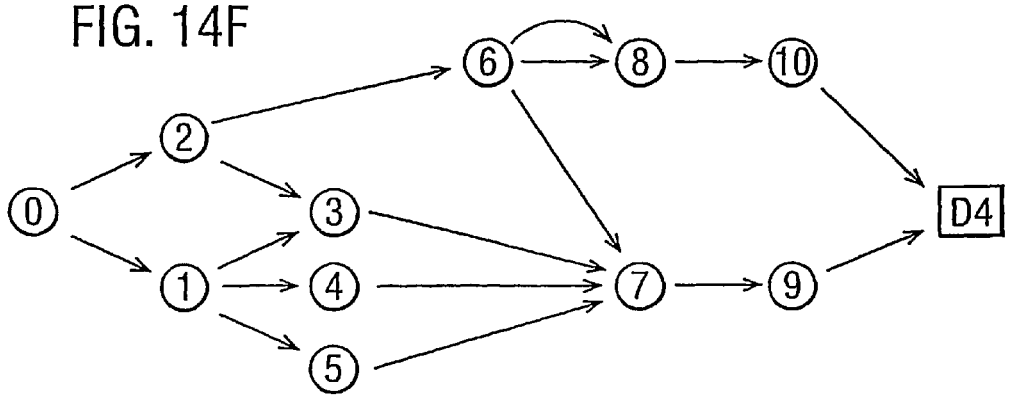
Figure 14G:
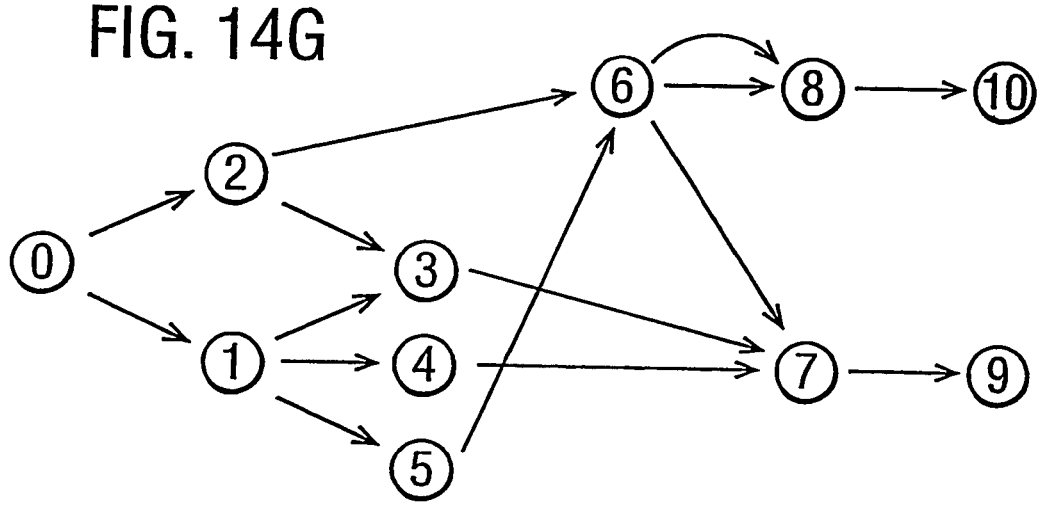
Figure 15:
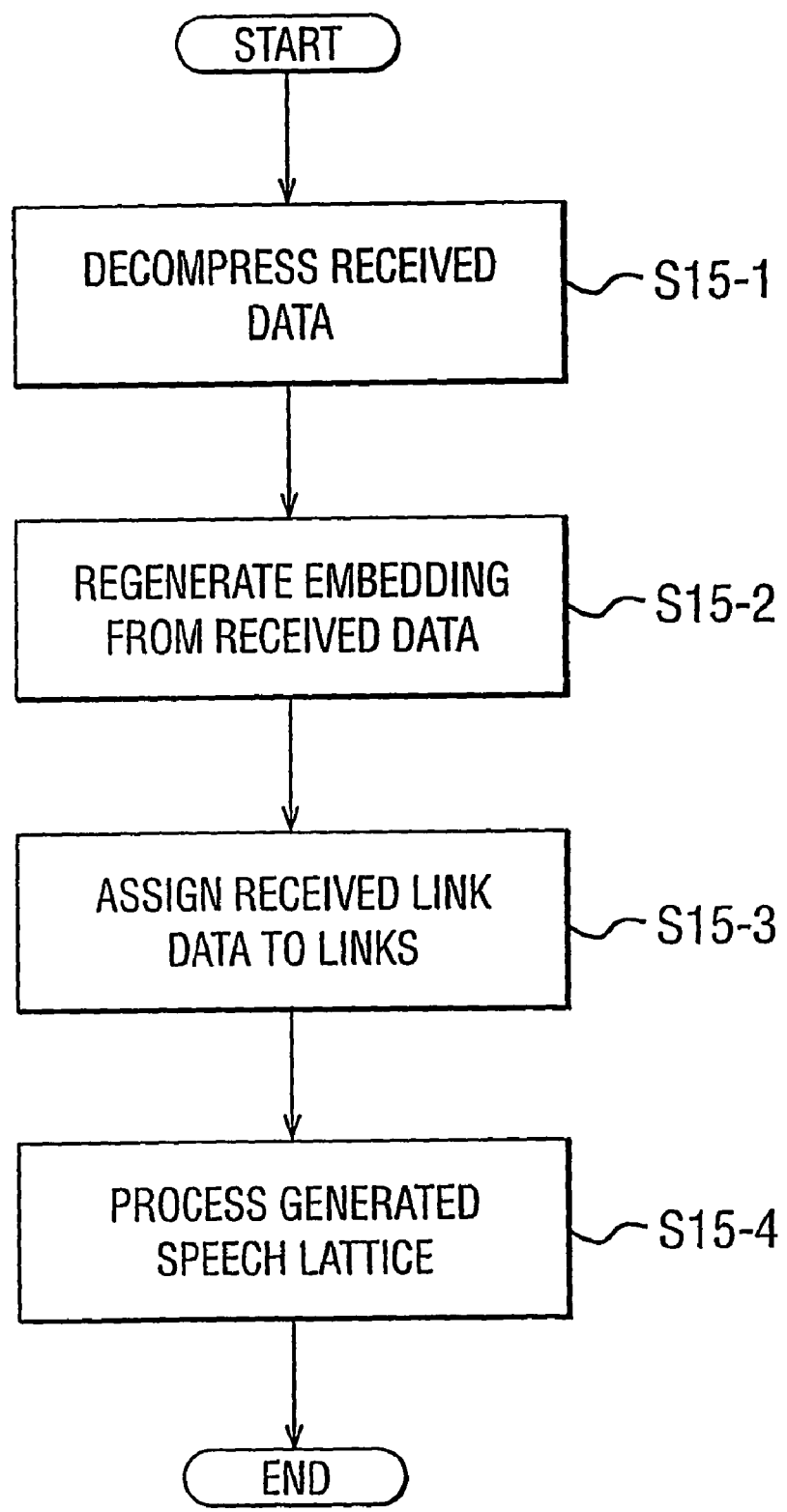

FIGS. 9A and B are a flow diagram of the processing operations performed by the shape encoding module of the lattice processor of FIG. 1;

FIGS. 10A, B and C are schematic illustrations of the encoding of the exemplary embedded lattice of FIG. 8H by the encoding module of the lattice processor of FIG. 1;

FIGS. 11A-D are a flow diagram of the processing operations performed by the decoding module of the lattice processor of FIG. 1;

FIG. 12 is a flow diagram of the processing operations performed by the decoding module of the lattice processor of FIG. 1 to process link encodings;

FIGS. 13A-13F are schematic illustrations of the regenerations of a portion of an embedded lattice utilising link encoding data;

FIGS. 14A-14G are schematic illustrations of the regeneration of an exemplary embedded lattice of FIG. 6A by the decoding module of the lattice processor of FIG. 1; and FIG. 15 is a flow diagram of the processing operations performed by the document storage unit of FIG. 1 in response to receipt of compressed data.

SPECIFIC EMBODIMENT

A specific embodiment of the present invention will now be described by way of example only.

Referring to FIG. 1, which is a schematic block diagram of a document retrieval system, a client computer 1 is provided connected to a document storage unit 2 via a network 3. Also connected to the client computer 1 is a microphone 5.

In this embodiment, the client computer 1 and document storage unit 2 each comprise programmable computers configured by reading computer instructions from a storage medium such as a disk 8 or by downloading instructions in the form of a signal 9 via the network 3 to become configured into a number of notional functional modules.

In this embodiment, the functional modules for the client computer 1 comprise: a speech recognition module 10, a lattice processor 11 and a data compression module 12. The functional modules of the document storage unit 2 comprise: a decompression unit 15, a regeneration module 17 and a document retrieval unit 19.

The speech recognition module 10 of the client computer 1 is arranged to receive electrical signals generated by the microphone 5 in response to detecting audio signals for example a phrase spoken by a user. The speech recognition module 10 processes the received electrical signals to generate a speech lattice representative of multiple hypotheses of what phrase the audio signal spoken by a user and detected by the microphone 5 represents.

Figure 2:
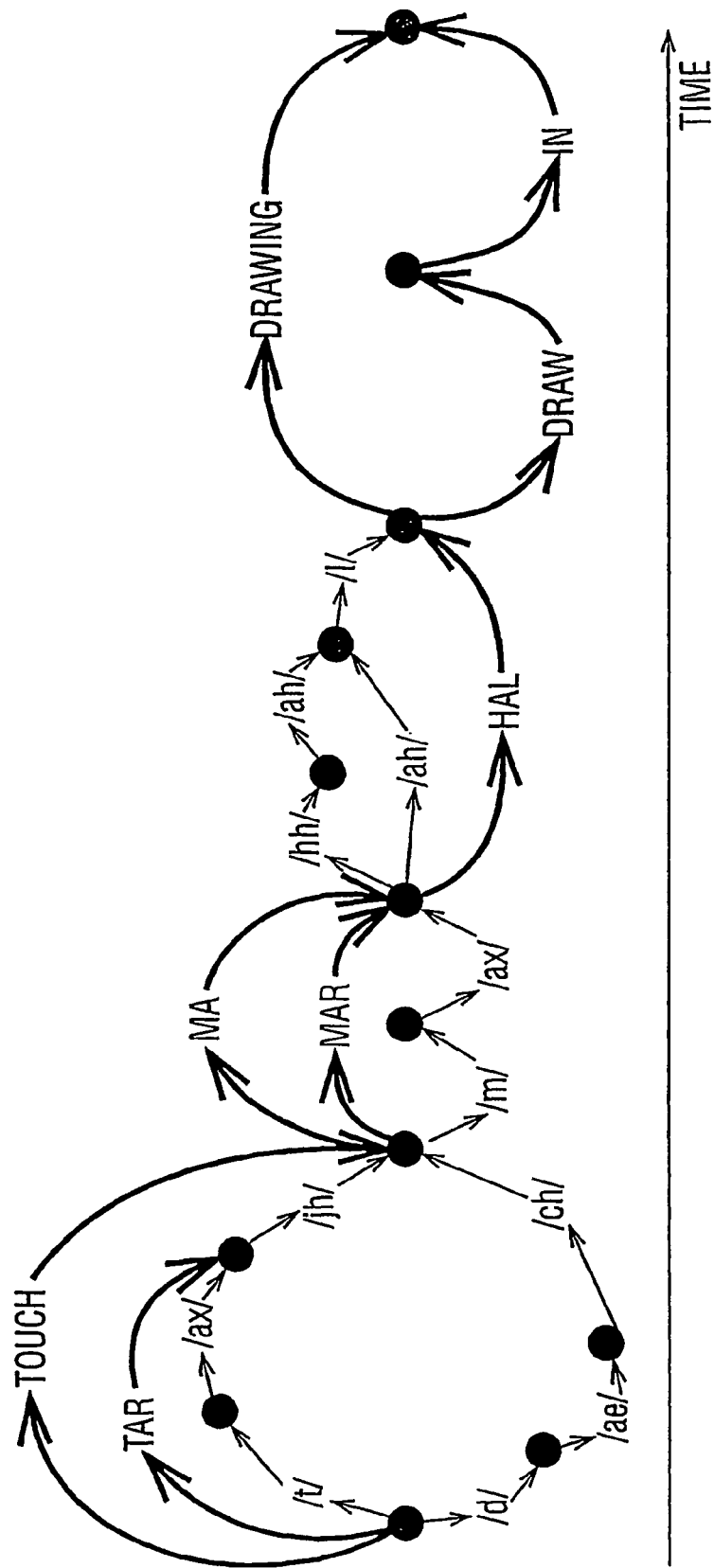
FIG. 2 is a schematic illustration of an exemplary lattice structure of a decoding by a speech recognition system of a signal representing the phrase "Taj Mahal drawing . . . ;"

By way of example, FIG. 2 is a schematic illustration of a lattice structure of a hypothetical combined phoneme and word decoding of the expression "Taj Mahal drawing". In the figure nodes are represented by circles and the circles are arranged from left to right in order of increasing time. The links in the lattice structure of FIG. 2 are represented by arrows between the nodes. These links are each shown either associated with words represented by upper case letters or phonemes represented by lower case letters. In this embodiment the speech recognition module 10 is arranged to generate and store speech lattice data in a conventional form for example in the form: [node number, list of links from node, time represented by node, other data associated with node]. The link data for the speech lattice is also stored in a conventional manner, for example the form [start node, end node, data associated with link].

A speech lattice generated by the speech recognition module 10 can be very large. To avoid the transmission of large amounts of data via the network 3, after a speech lattice has been generated the lattice processor 11 generates a compact representation of the lattice structure. As will be described in detail later, the compact representation is such to encode the same lattice substructures using the same symbol sequences and hence is particularly susceptible to being compressed using conventional data compression techniques.

Once a compact representation of the lattice structure has been generated this representation together with the data associated with links and nodes in the original generated speech lattice is then compressed using conventional data compression techniques by the data compression module 12. The compressed data is then sent via the network 3 to the document storage unit 2.

The document storage unit 2 using the decompression unit 15 and the regeneration module 17 processes the compressed data to regenerate the original speech lattice. The regenerated speech lattice is then passed to the document retrieval unit 17 which retrieves a document in response to the received speech lattice. This retrieved document is then sent back via the computer via the network 3 to the client computer 1.

Structure of Lattice Processor

Figure 3:
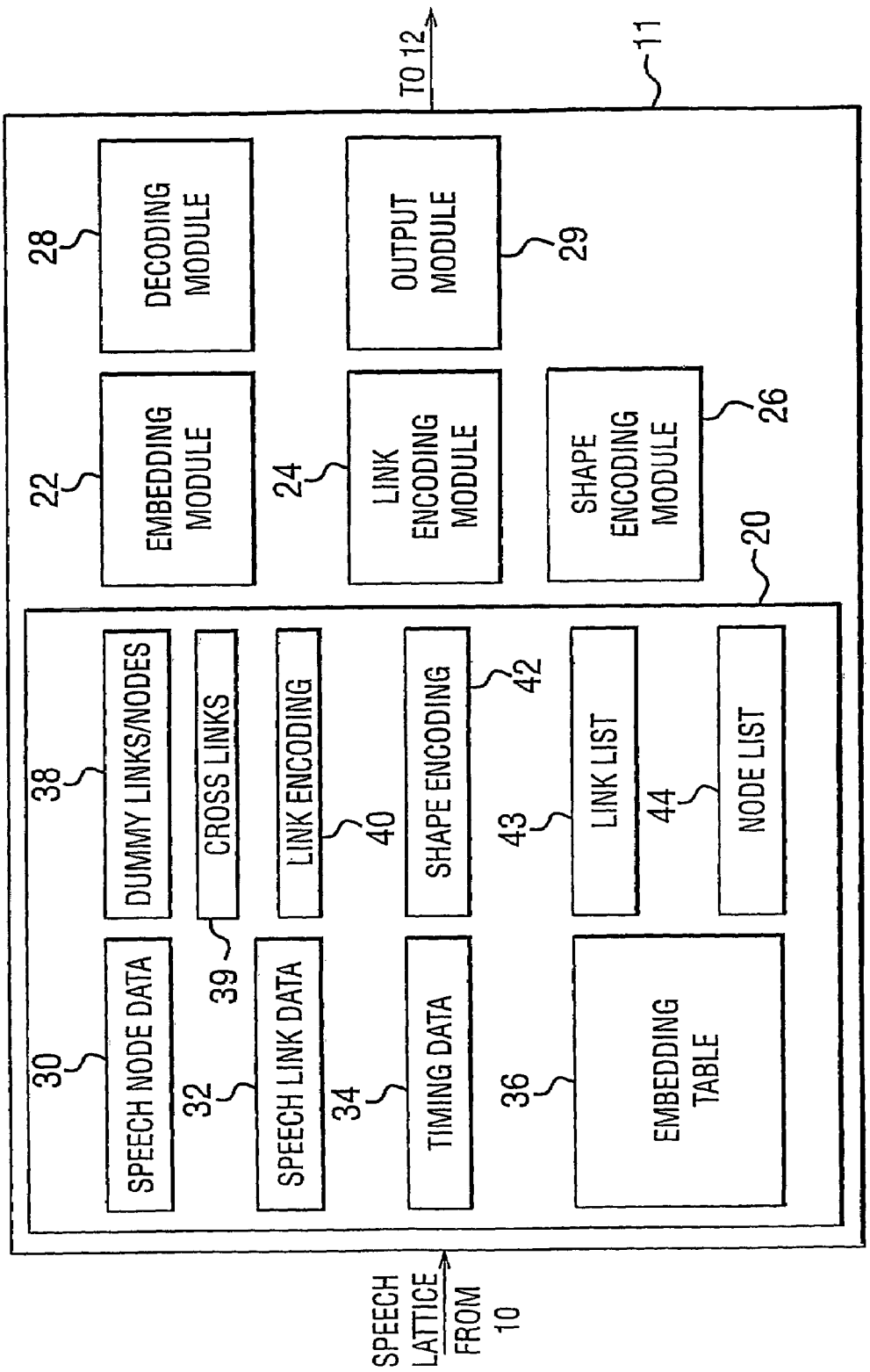
FIG. 3 is a schematic block diagram of the functional units of the lattice processor of FIG. 1.

Referring to FIG. 3 which is a schematic block diagram of the functional components of the lattice processor 11, in this embodiment the lattice processor 11 comprises: a data store 20, an embedding module 22, a link encoding module 24, a shape encoding module 26, a decoding module 28 and an output module 29.

More specifically, in this embodiment the data store 20 is arranged to receive speech lattice data from the speech recognition module 10. This speech lattice data comprising speech node data 30 and speech link data 32 is then stored in the data store 20.

In this embodiment the speech node data 30 comprises data defining a speech lattice stored in a conventional form such as in the form of data in the form [a node number, a list of connected nodes, a time represented by the node and other data such as for example transition probabilities associated with nodes]. The speech link data 32 comprises data associating links in the lattice structure defined by the speech node data 30 with data identifying words or phonemes. This speech link data 32 is also stored in a conventional form such as data in the form [start node, end node, other data such as data identifying a word or phone or a transition probability associated with that link].

The embedding module 22 is arranged to process the speech node data 30 to generate timing data 34 identifying the different times represented by the nodes of the speech node data 30. This timing data is then stored in the data store 20. The embedding module 22 then as will be described in detail later generates a first representation of the lattice structure defined by the speech node data 30. This representation is in the form of: an embedding table 36, dummy links and nodes data 38 and cross links data 39.

In this embodiment the representation of the lattice structure generated by the embedding module 22 is then processed by the link encoding module 24. More specifically, the link encoding module 24 processes the representation of the lattice structure to cause the lattice structure to be simplified by removing some links and nodes from the lattice structure whilst generating link encoding data 40 which identifies the links and nodes removed from the lattice structure. This link encoding data 40 is also stored in the data store 20.

After the lattice structure has been simplified by the link encoding module 24, the shape encoding module 26 then processes the simplified lattice structure and generates a final encoding of the lattice structure. In this embodiment, this encoding in the form of a shape encoding 42, a link list 43 and a node list 44 which are all stored within the data store 20. In contrast to the representation of the original lattice structure by the speech node data 30 as will be described in detail later, the shape encoding 42 and link list 43 comprise data encoding the same lattice structure in a representation which causes equivalent structures to be encoded using the same symbol sequence and hence is susceptible to higher compression using conventional compression techniques.

After the shape encoding module 26 has generated the final encoding of the lattice structure, the decoding module 28 then processes the final encoding to determine an ordering of the links in the encoded lattice structure. This is achieved by the decoding module 28, regenerating the encoded lattice structure and then determining an ordering of the links in the regenerated lattice structure.

When an ordering of links has been determined by the decoding module 28, the output module 29 then outputs to the data compression module 12: timing data 34, data identifying dummy nodes and links 38 and cross links data 39, generated by the embedding module 22; the shape encoding 42 and link list 43 generated by the shape encoding module 26; and the other data associated with nodes and links on the original speech lattice by the speech node data 30 and speech link data 32 respectively. The other data associated with nodes being ordered using the node list 44 generated by the shape encoding module 26; and the other data associated with links being ordered in an order determined by the decoding module 28.

The data output by the output module 29 is then compressed by the data compression module 12 in a conventional manner so that the compressed data can be sent via the network 3 before being decompressed and the speech lattice regenerated by the document storage unit 2.

Figure 4:
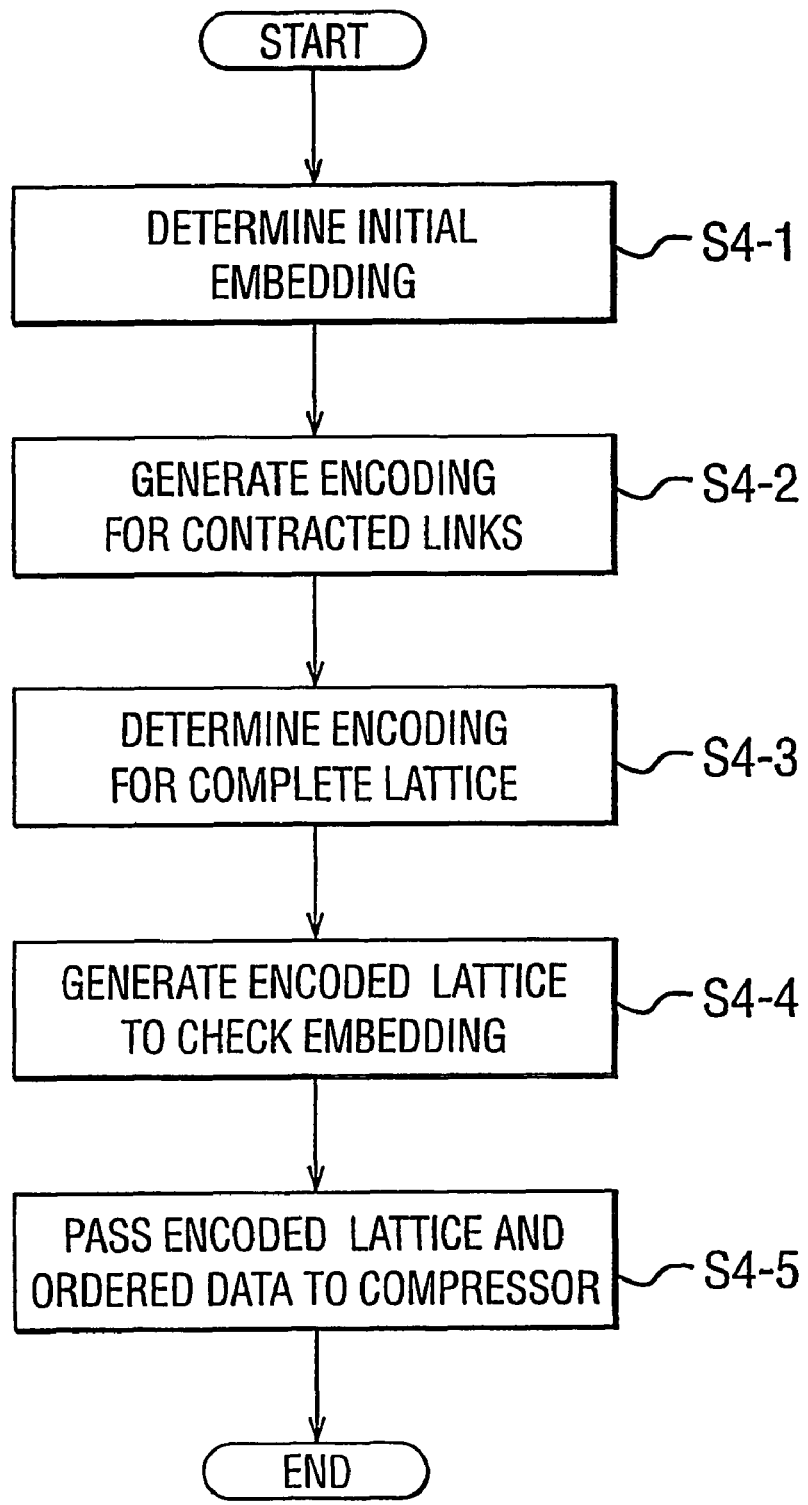
FIG. 4 is a flow diagram of an overview of the processing operations performed by the lattice processor of FIG. 1.
Figure 5:
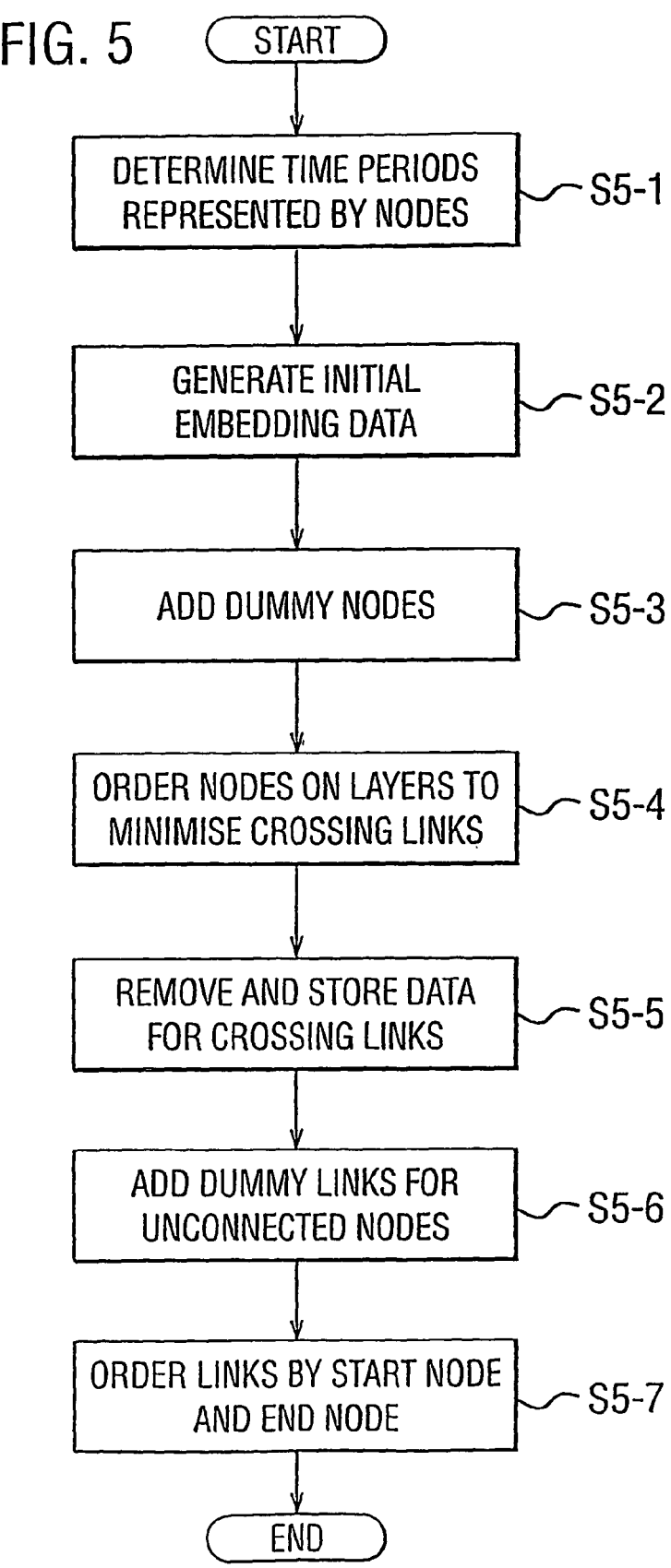
FIG. 5 is a flow diagram of the processing operations performed by the embedding module of the lattice processor of FIG. 1.

A more detailed overview of the processing of the lattice processor 11 will now be described with reference to FIG. 4 which is a flow diagram of the processing performed by the lattice processor 11.

Overview of Processing Performed by Lattice Processor

Initially (S4-1) when a speech lattice represented by speech node data 30 and speech link data 32 is received by the lattice processor 11 and stored in the data store 20, the embedding module 22 determines a first representation of the lattice structure represented by the speech node data 30. This initial representation is in the form of timing data 34, and an embedding table 36 stored in the data store 20.

More specifically, when speech node data 30 is received by the lattice processor 11, the embedding module 22 first generates timing data 34 comprising a list of all of the different times represented by the nodes of the speech node data 30.

As previously been stated, the speech node data 30 identifies for each node in the speech lattice a time represented by the node. Thus for example in the case of the speech lattice shown in FIG. 2, these different timings are represented by the different left/right positions of the circles representing nodes in the exemplary lattice of FIG. 2.

As the speech node data 30 expressly associates time data with each node, this time data will be repeated where more than one node is associated with the same time. It is therefore possible to reduce the amount of data representing the times represented by the nodes by removing this repetition. More specifically, if a list of the different timing is generated, individual nodes can then be identified as being associated with a particular timing in the list. In this way where many nodes are associated with the same timing, this timing data is recorded once rather than many times by being explicitly included as time data within the speech node 30 data associated with each node.

After timing data 34 for a lattice structure has been determined and stored by the embedding module 22 in the data store 20, an initial representation of the lattice structure encoded by the speech node data 30 is generated by the embedding module 22.

In this embodiment, this initial representation comprises for each of the timings hereafter referred to as layers identified by times in the list of timing data 34, a list of nodes which are associated by the speech node data 30 with those timings, together with copies of the data identifying pairs of start nodes and end nodes for each of the links in the lattice. This data is stored by the embedding module 22 as embedding data and link data within the embedding table 36 in the data store 20.

FIG. 6A is an exemplary illustration of a lattice structure in which the nodes are represented by circles enclosing numbers and the links between nodes are shown in the form of arrows between the circles. In FIG. 6A the nodes sharing the same timing data are shown in the same horizontal position.

In the case of the lattice of FIG. 6A, the initial representation of the illustrated lattice structure generated by the embedding module 22 would be of the form of the following embedding data stored within the embedding table 36:

| Layer No | List of Nodes |
| --- | --- |
| 1 | [0] |
| 2 | [1, 2] |
| 3 | [3, 4, 5] |
| 4 | [6] |
| 5 | [7, 8] |
| 6 | [9] |

Where layer number indicates the column in which nodes are contained and the list of nodes indicate the nodes in that column. In this example the link data comprises a list of data identifying a start node and end data for each of the arrows shown in FIG. 6A. Thus link data in the form links (0,1), (0,2), (1,3), (1,4), (1,5) etc would also be stored in the embedding table 36.

As will be described in detail later the initial representation generated by the embedding module 22 is then processed so as to generate an alternative representation.

Figure 6B:
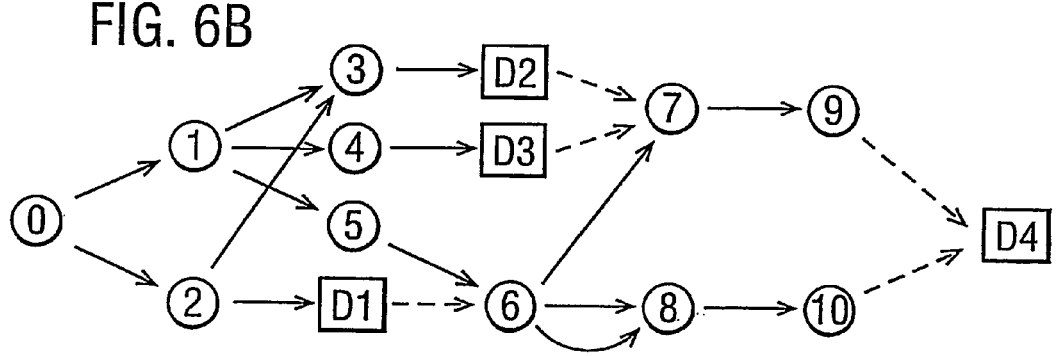
Figure 6C:
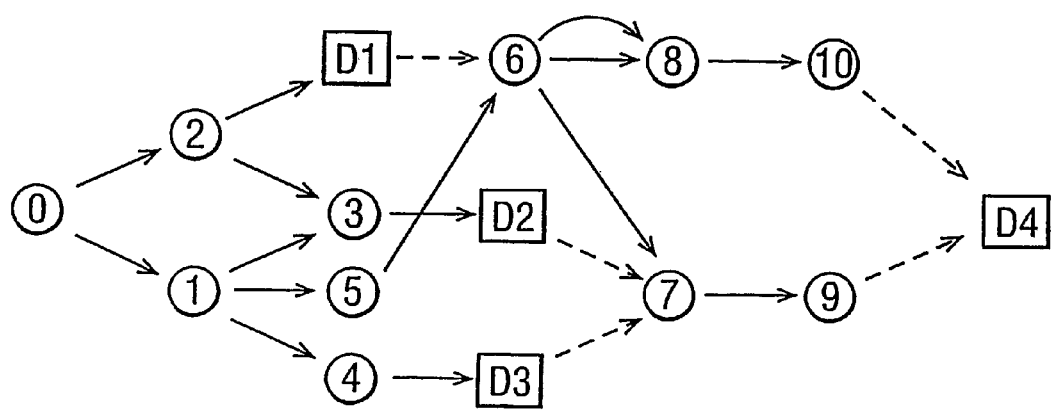
Figure 6D:
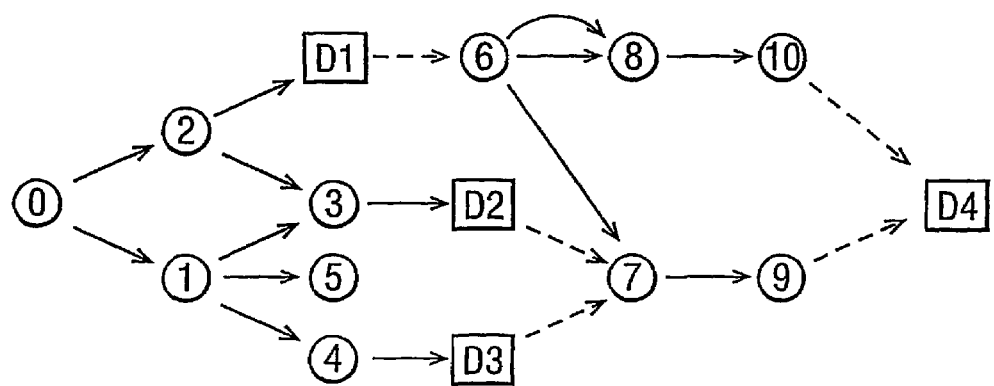
Figure 6E:
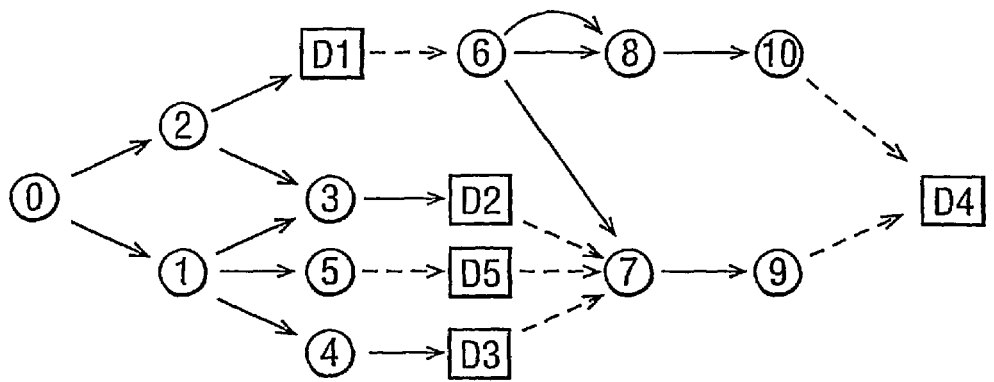

In the case of the lattice of FIG. 6A this alternative representation is illustrated by FIG. 6E. Comparing the structures of FIG. 6A and FIG. 6E, in contrast to FIG. 6A where some of the arrows (for example the arrows between nodes 3 and 7 and nodes 4 and 7 link nodes in columns which are not adjacent to one another, in FIG. 6E additional dummy nodes and dummy links have been added to the representation so that each node is connected to one or more nodes in an adjacent column. In FIG. 6E these additional nodes are shown by squares appearing in the lattice and the added links are illustrated by dotted lines.

Additionally compared with FIG. 6A, in FIG. 6E an extra layer has been added to the lattice so that the final layer contains a single node shown in FIG. 6E as a dummy node D4.

The structure has also been altered by rearranging the orders of nodes within columns and removing a link (the link between link 5 and 6) so that the resultant structure shown in FIG. 6E contains no links which cross one another in the manner shown by links 2-3 and 1-5 in FIG. 6A. That is to say the links and nodes in the representation identify a planar graph, i.e. a graph which can be embedded in a plane without any cross links.

Data identifying the nodes and links which are added or removed as a result of processing by the embedding module 22 are stored by the embedding module 22 in the data store 20 as dummy links/nodes data 38 and cross links data 39 respectively.

Once a revised representation of the lattice structure has been determined by the embedding module 22, the lattice processor 11 then proceeds to generate an encoding of this revised structure. This encoding is performed in a two stage process.

Initially (S4-2) the link encoding module 24 causes some portions of the structure to be encoded in the form of data associated with links between nodes. Specifically as will be described in detail later, the link encoding module 24 encodes portions of the revised lattice structure which correspond to either a number of links connected to one another in series or by way of a number of parallel paths which are not connected to any other nodes in the lattice structure.

Thus for example in the case of the lattice structure illustrated by FIG. 6E, an encoding of the links and nodes between node 6 and node D4 via nodes 8 and 10 of FIG. 6E is determined, as is an encoding of the parallel paths between node 1 and node 7 via nodes 4 and 5 of FIG. 6E.

FIG. 8H is an example of the simplified lattice structure corresponding to the lattice of FIG. 6E after linear and parallel paths have been encoded. In FIG. 8H, nodes are illustrated by circles and links between nodes are indicated by arrows. Associated with each of the links shown in FIG. 8H is a code which is written adjacent to the arrow. These codes are generated by the link encoding module 24 and stored as link encoding data 40 in the data store 20.

After the link encoding module 24 has generated a simplified lattice structure and link encoding data 40, the simplified lattice structure will as is illustrated by the lattice structure of FIG. 8H be a planar graph having no cross-links, the links and nodes of which define a number of interconnected areas. In the case of FIG. 8H, these areas are going from the left to the right in FIG. 8H a diamond formed by the nodes 0, 2, 3 and 1, and their associated links a rhombus formed by the nodes 2, 6, 7 and 3 and their associated links, a triangle formed by the nodes 1, 3 and 7, and their associated links and a further triangle formed by the nodes 6, 7 and D4 and the links between those nodes.

The shape encoding module 26 then (S4-3) proceeds to encode the lattice structure originally processed by the link encoding module 24 in the form of 3 lists of symbols.

In this embodiment these lists comprise a shape encoding 42 identifying the manner in which the areas defined by the simplified lattice generated by the link encoding module 24 link to one another, a link list 43 being an ordered concatenation of the link encoding data 40 associated with the links in the simplified lattice and an node list 44 identifying the order in which the node numbers appear in the simplified lattice and associated link encoding data.

As will become apparent when the generation of these lists are described in detail, these lists encode the lattice structure processed by the link encoding module 24 in a manner which causes the same sub structures to be encoded by the same symbol sequences and hence generates an encoding which is highly susceptible for data compression using conventional data compression techniques.

After these three lists have been created by the shape encoding module 26 and stored in the data store 20, the shape encoding 42, link list 43 and node list 44 are then (S4-4) processed by the decoding module 28. The result of the decoding by the decoding module 28 is to generate a further representation of the lattice structure represented by the speech node data 30 stored in the embedding table 36 of the data store 20. The process of generating a lattice from the shape encoding 42, link list 43 and node list 44 generated for the lattice structure of FIG. 6A will be described in detail later.

The final representation determined by decoding the shape encoding 42, link list 43 and node list 44 for the structure of FIG. 6A is shown in FIG. 14G. Comparing the illustration of the lattice structures illustrated by FIG. 14G and FIG. 6A, it is visually possible to establish that the interconnections between links shown by FIGS. 6A and 14G are identical and the nodes are shown in the same columns, although the ordering of the representations of the nodes within the columns differs between the two illustrations. However, as the ordering within columns is not dependent upon the speech node data 30, although the embedded lattices of FIG. 6A and FIG. 14G are not identical, they are representative of the same lattice structure.

After the actual embedded lattice structure encoded by the data stored in the data store 20 has been determined by the decoding module 38, the output module 29 then (S4-5) passes to the data compression module 12 the timing data 34, the list of dummy nodes and dummy links 38 cross links data 39 and the shape encoding 42 and link list 43 which represent this final embedded representation as decoded by the decoding module 28.

Additionally, as will be described later the output module 29 also passes to the output module 12 ordered lists of data associated with nodes and links by the speech node data 30 and speech link data 32.

The data associated with nodes by the speech node data 30 is ordered in the order corresponding to the node list 44 stored in the data store 20. The data associated with links by the speech link data 32, is ordered based on the final lattice structure generated by the decoding module 28 for the speech lattice. For example in the case of the speech lattice of FIG. 13G, the link data might be ordered corresponding to the columns of links appearing from top to bottom and then from left to right. Thus, for example, initially the data for link 0-2 would be passed by the output module 29 to the decompression module 12 and then the link data for the following links in the order 0-1, 2-6, 2-3, 1-3, 1-4, 1-5 etc, corresponding to the order of links in FIG. 14G.

As previously stated, the shape encoding data 42 and link list 43 for encoding the lattice structure expresses equivalent structures using exactly the same symbol sequence. This means that where many of the lattice substructures are similar, the data passed by the lattice processor 11 to the data compression module 12 can be efficiently compressed using conventional compression techniques so as to reduce the amount of data which needs to be transmitted via the network 3.

When the compressed data is decompressed by the decompression unit 15, the decompressed data is utilised to regenerate the original speech lattice which is then used to cause the document retrieval unit 19 to access a particular document stored in the document storage unit 2.

The detailed processing of data by the embedding module 22, the link encoding module 24, the shape encoding module and the decoding module 28 will now each be considered in turn.

Processing Performed by the Embedding Module

The processing of the embedding module 22 of the lattice processor 11 will now be described in detail with reference to FIG. 5 and FIGS. 6A-E.

Initially (S5-1) when a speech lattice in the form of speech node data 30 and speech link data 32 is received and stored in the data store 20 by the lattice processor 11, the embedding module 22 then proceeds to generate timing data 34 identifying the individual times represented by nodes in the speech node data 30.

More specifically, in this embodiment where speech node data 30 is stored in the data store 20 in the form of: [Node number, list of connecting nodes, timing of node, other data associated with node], the embedding module 22 initially processes the speech node data 30 to generate a list of all the timings represented by the nodes of the speech node data 30. The embedding module 22 then processes the generated list to create an ordered list of timings. Duplicate timings represented in the list are then removed so that timing data 34 comprising a list of different times represented by different nodes by the speech node data 30 ordered in the order of the different timings is created. This list is then stored as timing data 34 in the data store 20 of the lattice processor 11.

After a list of timings has been stored in the form of timing data 34 in the data store 20, the embedding module 22 then (S5-2) generates initial embedding data for the lattice structure represented by the speech node data 30 stored in the data store 20.

Specifically the embedding module 22 determines for each of the timings hereinafter referred to as layers represented by the timing data 34 a list of nodes which have time data corresponding to the identified times. These lists are stored as embedding data in the embedding table 36 one for each time identified by the timing data list 34. Additionally, for each of the links between nodes identified by the speech node data 30, the embedding module 22 then generates and stores link data in the embedding table 36 comprising data identifying a start node and an end node for each link.

Thus, for example, in the case of the lattice structure illustrated by FIG. 6A where node numbers are illustrated by circles containing numbers and links are illustrated between arrows connecting the circles and where the nodes associated with same timings and hence in the same layer are shown in vertical columns above one another, the following data would be stored in the embedding table 36.

| Embedding Data | |
| --- | --- |
| Layer No | List of Nodes |
| 1 | [0] |
| 2 | [1, 2] |
| 3 | [3, 4, 5] |
| 4 | [6] |
| 5 | [7, 8] |
| 6 | [9, 10] |

Links (0,1), (0,2), (1,3), (1,4), (1,5), (2,3), (2,6), (3,7), (4,7), (5,6), (6,7), (6,8) (7,9), (8,10).

It will be appreciated that together the timing data 34 and embedding table 36 encode all the lattice structure of the speech lattice received from the speech recognition module 10. Further the timing data 34 and embedding table 36 also implicitly records the data identifying the timings associated with each node.

Also, the direction of the links between nodes is also implicitly encoded in the data within the embedding table 36. This is because the lists of nodes identified by different layers and hence different timings are ordered in timing order so that nodes representing earlier times appear in lists for the earlier layer numbers whilst nodes appearing for later timings appear in the lists for later layers in the embedding table 36. It is therefore implicit that where a link is recorded from one node to another the direction of that link as shown by the arrows in FIG. 6A will be between the direction from the node for a layer for an earlier timing to the node for a layer for a later timing.

After the initial embedding for a lattice structure has been determined, the embedding module 22 then (S5-3) proceeds to modify the initial stored data to add a number of additional nodes to the embedding table 36 and update the link data so that each link only connects from nodes of one layer to nodes in an adjacent layer and the list of nodes of the first and last layers comprise a single node.

Specifically the embedding module 22 proceeds to consider each of the links, stored in the embedding table 36 in turn. For each of the links the layer number of the start node is compared with the layer number of the end node of the link. Wherever the layer numbers for the start node and end node are separated by a single number, no further action is taken. Wherever a start node is linked to an end node separated by more than one layer, a dummy node is added to each of the intervening layers. The link data is then updated to replace the link data being processed with a series of items of link data identifying links between the start node and the end node in each layer via each of the added dummy nodes.

Thus, for example, in the case of the embedding illustrated by FIG. 6A, each of the links would be considered in turn. When the link between node 2 and node 6 was processed, node 2 would be identified as being in the second layer and node 6 would be identified in the fourth layer. The embedding module 22 would then proceed to add a dummy node in the list of nodes for the third layer and replace the link between node 2 and node 6 by two links, a link between node 2 and the added dummy node and a link between the added dummy node and node 6.

More specifically, in the case of the lattice shown in FIG. 6A, the links between 2 and 6, 3 and 7 and 4 and 7 would be identified as connecting nodes in layers separated by more than one layer. The embedding data stored in the embedding table 36 would then be updated as follows:

| Layer No | List of Nodes |
|---|---|
| 1 | [0] |
| 2 | [1, 2] |
| 3 | [3, 4, 5, D1] |
| 4 | [D2, D3, 6] |
| 5 | [7, 8] |
| 6 | [9, 10] | where D1, D2, D3 are the additional dummy nodes added by the embedding module 22 with link data for links between nodes 2 and 6, 3 and 7 and 4 and 7 being replaced by the following link data: (2,D1), (D1,6), (3,D2), (D2,7), (4,D3), (D3,7).

Data identifying these dummy nodes is then stored by the embedding module 22 in the dummy links/nodes data 38 in the data store 20.

The embedding module 22 then considers the list of nodes for the first and last layers of the data stored in the embedding table 36. If the first layer contains more than one node an additional 0 layer is added containing a dummy node and dummy links are added between this initial dummy node and the nodes in the first layer.

The list of nodes of the final layer is then considered. Where more than one node appears in the final layer an additional layer is added to the embedding data containing a single dummy node and links to the added dummy node from each of the nodes in the final layer are added to the list of links. Data identifying all the added dummy nodes is then added to the dummy link/node data 38 within the data store 20.

Thus, in the case of the example of FIG. 6A as the first layer contains a single node, node 0, no dummy nodes are added. However, the final layer initially contains the nodes 9 and 10. An additional final layer is then added containing a single dummy node. All of the nodes in the previously final layer in this case nodes 9 and 10 are then recorded as being connected to this final node in the extra layer.

FIG. 6B is a schematic illustration of the lattice of FIG. 6A after dummy nodes have been added to the lattice. The dummy nodes are shown in FIG. 6B by squares labelled D1, D2, D3 and D4. The extra links added to the lattice are shown in FIG. 6B by dotted lines. As can be seen by FIG. 6B in the case of the lattice of FIG. 6B all of the arrows appearing in the Figure do not cross more than one column and the entire lattice has a single start node, node 0 on the left of the illustration and a single end node labelled D4 on the right of the illustration.

After dummy nodes have been added to the lattice to ensure that links connect nodes of adjacent columns, and dummy nodes have been added to ensure that the lattice contains a single start node and a single end node, the embedding data in the embedding table 36 is then processed (S5-4) to re-order the lists of nodes associated with each layer so that the lattice embedding represented by the embedding data in the embedding table 36 contains a limited number of links which cross one another.

In this embodiment the embedding module 22 processes the embedding data stored in the embedding table 36 using conventional techniques such as are described by Roberto Tamassia "Graph Drawing" "CRC Handbook of Discrete and Computational Geometry", CRC Press, ed. Jacob Goodman and Joseph O'Rouke, 1997, which is hereby incorporated by reference.

More specifically, starting with the second layer, each of the nodes in the layer is initially assigned an order number corresponding to the ordering of the nodes in that layer. Thus in the case of the nodes of FIG. 6B, Node 1 would be assigned an order 1 and node 2 would be assigned an order 2. The nodes in the next layer are then ordered on the basis of the average order value for the nodes in the previous layer linked to those nodes.

Thus in the case of FIG. 6B if nodes 1 and 2 are given values 1 and 2 respectively, node 3 which is linked to both node 1 and node 2 would be assigned a value of (1+2)/2=1.5. Nodes 4 and 5 which are only connected to node 1 would be assigned values of 1 respectively. Node D1 which is only connected to node 2 would be assigned a value of 2.

The embedding module of 22 then proceeds to re-order the nodes in the next layer so that the nodes having the lowest order numbers associated with them appear at the head of the list and the node associated with increasingly higher numbers appear later on in the list.

Thus in the case of FIG. 6B, the list representing the column for the third layer would be re-ordered from the list [3,4,5,D1] to become the list [4,5,3,D1]. The next layer is then re-ordered in a similar way until the final node in the final layer is reached. The re-ordering of the nodes in each layer is then repeated starting from the second to last layer of nodes and re-ordering the immediately previous layer on the basis of order values determined from average values of order numbers identified by links from that last layer. This processing is repeated for the next previous layer until the first layer is reached.

FIG. 6C is an exemplary illustration of the lattice of FIG. 6B after the nodes have been reordered to minimise to crossing links. As can be seen from FIGS. 6B and 6C whereas in FIG. 6B the links between node 2 and node 3 and node 1 and nodes 4 and 5 all cross one another, in FIG. 6C only a pair of crossing links remain namely the links between node 3 and node D2 and node 5 and node 6.

After the embedding module 22 has reordered the nodes in the layers of the embedding data in the embedding table 36, the embedding module 22 then (S5-5) considers each of the links in turn and removes crossing links from the revised lattice and stores data identifying the removed links in the cross link data 39 stored within the data store 20.

More specifically, each link in each layer is considered in turn, whenever the link is determined to cross any other link, a number representing the number of times that link crosses any other link is incremented by one. When data for all the links has been generated, each set of links between layers is considered in turn. Where any cross link exist, one link having the greatest number associated with it is removed and data identifying this link is stored in the cross link data 39. The calculation of the number of crossing links in each layer is then updated and links are removed until no crossing links remain. In this way the crossing links which are removed and stored as crossing links 39 separately from the embedding in the embedding table 36 are selected so as to correspond to the links which cross the greatest number of other links. That is to say where one link crosses two other links, a single link will be removed rather than removing the two links which are crossed.

Referring to FIG. 6C, after the nodes in the layers are re-ordered to minimise the number of crossing links the embedding data for the example lattice of FIG. 6A will be reordered so as to be in the order represented by FIG. 6C. In FIG. 6C there is a single pair of crossing links being the link between node 3 and D2 and the link between node 5 and 6. As both of these links cross only one other link, one of these links is randomly selected and stored in the cross-link data 39.

FIG. 6D is an illustrative example of the lattice of FIG. 6C after the link between node 5 and node 6 has been removed. As can be seen from FIG. 6D each of the arrows representing links connects two nodes in two adjacent columns and none of the links represented by the arrows crosses any of the other links represented by arrows.

After sufficient links have been removed from the link data in the embedding table 36 and stored as cross link data 39, so that the lattice represented by the data in the embedding table 36 contains no cross-links, the embedding module 22 then (S5-6) considers each node in turn except for the nodes in the first and last layers and determines whether that node is connected to nodes in both the previous and subsequent layers.

That is to say the embedding module 22 considers each node in turn and checks the link data within the embedding table 36 to establish whether the node being processed appears both as a start node and an end node in at least one of the links stored as link data within the embedding table 36 for the lattice. Wherever any such unconnected nodes are identified the embedding module 22 then adds link data to connect that node to other nodes in the lattice.

More specifically, each node except the node in the last layer is considered in turn. If a node is determined not to be represented as a start node by link data within the embedding table 36 the nodes adjacent to the unlinked node in the list of nodes in the layer are then considered.

Thus in the case of the lattice of FIG. 6D node 5 which is not a start node for any link would be identified and the two adjacent nodes, nodes 3 and 4 would be considered. The nodes connected by links having the adjacent nodes as start nodes are then identified. In the case of FIG. 6D the nodes in question will be dummy nodes D2 and D3.

If both of these nodes are dummy nodes as they are in the case of FIG. D6, a new dummy node is added between these nodes in the embedding data for the layer including the two dummy nodes and a link between the unconnected node and the new dummy node is added.

The embedding module 22 then considers the nodes linked to the two dummy nodes. If these are also dummy nodes, an extra dummy node in the next layer is added between the two identified dummy nodes in that layer and a link between the most recently added dummy node and the new dummy node is added to the embedding data in the embedding table.

Eventually, in a layer connected to one of the neighbours of an unconnected node, a node which is not as a dummy node will be reached. When this layer is reached, the embedding module 22 then adds a link to the path connecting the unconnected node in the previous layer to the real node in the next layer.

After an unconnected node has been connected to the lattice where the unconnected node did not appear as a start node, similar processing is undertaken to add additional nodes and links to nodes which are identified as not being an end node apart from the single node appearing in the first layer. Whenever nodes and links are added to the data stored in the embedding table 36 data identifying the dummy nodes and dummy links added is stored as dummy links/node data 38 in the data store 20.

FIG. 6E is a schematic illustration of the lattice of FIG. 6A after the lattice of FIG. 6A has been processed by the embedding module 22. As can be seen from FIG. 6E in the processed lattice all links connect between nodes of adjacent layers and none of the links in the lattice of FIG. 6E crosses any other link.

This means that the paths connecting nodes implicitly identify the layer the nodes are associated with. This is because nodes in the first layer will be identified with paths from the first node one node long, whereas nodes in the second layer will be connected to the node in the first layer by a path two nodes long and in general nodes in the nth layer will be connected to the first node by a path containing n nodes.

At this stage of processing the lattice of FIG. 6A the following embedding data would be stored in the embedding table representing the structure of FIG. 6E together with link data identifying each of the links in the structure.

| Embedding Data | |
|---|---|
| Layer No | Nodes In Layer |
| 1 | [0] |
| 2 | [2, 1] |
| 3 | [D1, 3, 5, 4] |
| 4 | [6, D2, D5, D3] |
| 5 | [8, 7] |
| 6 | [10, 9] |
| 7 | [D4] |

The embedding module 22 then orders (S5-7) the link data stored in the embedding table. Specifically, the embedding module 22 initially orders the link data, in the order in which their start nodes appear in the embedding data for different layers. The links having the same start node are then ordered by the order in which their end nodes appear is the embedding data.

Thus in the case of the links of FIG. 6E, the following ordered link data would be stored in the embedding table 36:

Links (0,2) (0,1) (2,D1), (2,3), (1,3), (1,5), (1,4), (D1,6), (3,D2), (5,D5) (6,8), (6,8), (6,7), (D2,7), (D5,7), (D3,7), (8,10), (7,9), (10, D4), (9,D4).

Additionally stored within the data store 20 will be the following data identifying the dummy nodes added to the lattice of FIG. 6A: Dummy nodes: D1, D2, D3, D4, D5.

The following data would be stored as dummy link data: (5,7) and cross link data: (5,6).

This embedded lattice structure from which cross links and links crossing adjacent layers have been removed is then passed for processing by the link encoding module 24 which proceeds to simplify this generated lattice structure as will now be described.

Processing by the Link Encoding Module

The processing performed by the link encoding module 24 of the lattice processor 11 will now be described in detail with reference to FIGS. 7 and 8A-H.

The processing of the link encoding module is such to process the embedding table 36 generated by the embedding module 22 and to simplify the lattice structure represented by that in the generated table 36. Specifically, the processing of the link encoding module 24 is such to encode portions of the lattice structure generated by the embedding module 22 where portions of the lattice identify linear paths between nodes being nodes only connected to two other nodes and where multiple linear paths connect the same two nodes.

Referring to FIG. 7, when the embedding module 22 has generated and stored embedding data and link data in the embedding table 36, the link encoding module 29 initially (S7-1) generates initial link encoding data 40.

Specifically, for each of the links identified by link data in the embedding table 36, data comprising a single symbol, in this embodiment the letter E is stored as link encoding 40 within the data store 20 as link encoding for the identified link.

FIG. 8A is a schematic illustration of the lattice of FIG. 6E where each of the links is associated with the link encoding 40 comprising a single symbol E for each link. As will be described in detail later the subsequent processing of the link encoding module 24 is such to modify the link encoding 40 and data stored within the embedding table 36 to remove links and nodes from the lattice represented by the data within the embedding table 36 whilst modifying the link encoding 40 to identify where in the lattice the nodes and links have been removed.

After the initial link encoding data 40 has been stored, the link encoding module 24 then selects a first node for processing (S7-2). In this embodiment the first node for processing is selected from the head of the list identifying nodes in the second to last layer of the lattice structure defined by the embedding data in the embedding table 36.

In the case of the exemplary lattice of FIG. 8A, the node selected on the second to last layer would be node 10.

After an initial node has been selected, the link encoding module 24 then (S7-3) selects an initial link for processing. In this embodiment the links from the selected node are selected in the order in which the links appear in the link data stored in the embedding table having that node as a start node. In the present example of FIG. 8A as there is a single link from node 10 to node D4, it is this link which is first selected for processing.

Once a link has been selected for processing, the link encoding module 24 then (S7-4) considers the end node of the link being processed. Specifically the link encoding module 24 determines whether the end node identified by the link appears only once as a start node and only once as an end node in the list of links in the embedding data stored in the embedding table 36.

If this is the case then there is a single path which passes through that node and the link encoding module 24 then proceeds to modify the link encoding data 40 and the data within the embedding table 36 to encode the presence of that node on that single path (S7-5).

Specifically where the link being processed comprises link data (N1,N2) where N1 identifies the start node and N2 identifies the end node of the link, and there is another single link (N2, N3) having N2 as a start node the link encoding module 24 proceeds to delete these items of link data from the embedding table 36 and replaces them with a single item of link data (N1, N3), where the new link is included in the ordered link data in the position of the deleted link (N1,N2).

The link encoding module 24 then utilises the link encoding data for the two links which have been deleted to generate link encoding data for the new link.

Specifically the link encoding module 24 appends the link encoding data for the link (N1,N2) to the end of the encoding data for the link (N2,N3). The link encoding module 24 then adds to the head of the newly generated list of symbols either the letter D where the node N2 corresponds to a dummy node as identified by data within the dummy nodes 38 or a symbol P and the number of the node identifying that the numbered node is being pushed from the representation in the embedding table. The link encoding module 24 then deletes the identified node N2 from the list of nodes in the embedding data stored within the embedding table 36.

Thus in the case of the links between node 8 and node 10 and node 10 and node D4 in FIG. 8A after deleting the link data identifying the links between node 8 and node 10 and node 10 and node D4, new link data comprising data identifying a link between node 8 and node D4 would be stored. The link encoding data 40 stored for the links between node 8 and node 10 and node 10 and node D4 would then be utilised to generate link encoding data for the new link which in this example would comprise the symbol P and identifier for the node being removed in this case 10 and the symbols associated with the links being removed in the order link encoding for the link between node 8 and node 10 and then the link encoding for the link between node 10 and node D4. In the present case this would be the encoding E followed by another E. The encoding data for the deleted links and the representation of the node 10 within the embedding table 36 would then be deleted.

After the embedding table 36 and link encoding 40 have been updated, the connections between the current node and other nodes are then reconsidered (S7-3, S7-4). Specifically the first link in the link data in the embedding table 36 having the currently selected node as a start node is reconsidered (S7-3) and whether the end node identified by the link is identified by a single start node in the link data within the embedding table 36 is determined (S7-4). If this is the case the embedding table 36 and link encoding 40 is then updated (S7-5) in the manner described above.

If it is determined (S7-4) that the selected link identifies a node which is not only identified once as a start node and once as a end node by data within the embedding table 36, the link encoding module 24 then (S7-6) determines whether all the links from the currently selected node have been processed. If this is not the case the link encoding module 24 then (S7-7) considers the next link in the link data within the embedding table 36 having the currently selected node as a start node and determines (S7-4) whether that link data identifies an end node which appears only once as a start node in the same way as been described above.

When all of the links from the currently selected node have been processed, the link encoding module 24 then determines whether there is more than one link between the currently selected node and any other node (S7-8). That is to say the link encoding module 24 determines whether any of the stored items of link data having the current selected node as a start node is a duplicate of any of the other items of link data stored in the embedding table 36. If this is determined to be the case, the link encoding module 24 then deletes (S7-9) one of the duplicate links and updates the link encoding 40 associated with the remaining links.

Specifically the link encoding is updated to a list of symbols comprising a symbol in this embodiment letter M indicating two links have been merged followed by the longer of the two list of symbols comprising the link encoding for one of the pair of links being processed followed by the list of symbols for the other link being considered. The first link (S7-3) from the currently selected node is then reconsidered before the links are processed in the same manner as being described above (S14-S7-8).

If it is determined that none of the remaining links from the currently selected node has the same end node as any other link from the currently selected node (S7-8), the link encoding module 24 (S7-10) then determines whether the final node has been reached.

Specifically the link encoding module 24 determines whether the current node corresponds to the node identified in the first layer of the embedding data. If this is the case the encoding of the linear and parallel paths in the lattice will have been completed and processing ends.

If it is not the case then the next node (S7-11) is selected for processing. In this embodiment this next node is the next node in the list in the same layer as the node previously processed or if the tail of the list has been reached, the first node in list of nodes for the layer for the next earlier timing.

The first link from the newly selected node is then selected (S7-3) and then processed in the same way as been described above (S7-4-S7-10).

Thus for example when processing the lattice of FIG. 8A, initially nodes 10 and 9 will be selected and processed. For both these nodes there is a single link from the node to node D4. However, D4 is not a start node for any link and thus no links or nodes are removed at this stage.

The link encoding module 24 will then consider the link between node 8 and node 10. This identifies node 10 which as shown from the illustration of FIG. 8A is a node which is identified once as a single end node by the link between node 8 and node 10 and once as start node between the link between node 10 and node D4. When considering the links having node 10 as a start node or an end node, the link encoding module 24 will therefore determine that node 10 is a node on a linear path.

The link encoding module 24 will then proceed to delete node 10 and the links between node 8 and node 10 and node 10 and node D4 from the embedding data in the embedding table 36 and replace them with single link between node 8 and node D4. Associated with the new link will be a link encoding 40 comprising symbol P a number 10 identifying the deleted node and the two symbols EE being the appended codes for the two deleted links.

The link encoding module 24 will then reconsider the links from node 8, in this case the single link between node 8 and node D4 to determine whether node D4 appears once as a start node and once as an end node. As this is not the case the link encoding for the link between node 8 and node D4 is not modified further. As all of the links from node 8 will then have been processed the link encoding module 24 will then proceed to consider links from node 7.

In a similar way to the processing of node 10 the link encoding module 24 will identify that the link between node 7 and node 9 identifies a node, node 9, which appears only once as a start node and only once as an end node. The link encoding nodule 24 would then proceed to delete the link between node 7 and node 9 and node 9 and D4 and replace it with a single link between node 7 and node D4 associated with link encoding data P9EE identifying node 9 had been removed. The processing of the lattice of FIG. 6E at this stage is illustrated by FIG. 8B.

After deleting node 9 the link encoding module 24 would then reconsider the link from node 7 to node D4 and determine that no further links could be removed from node 7.

The link encoding module 24 would then turn to node 6. In the case of node 6 both the links from node 6 identify node 8. This means that node 8 is not only identified once as a start node. However, as both of the links from node 6 are identical in that they both link to node 8, link encoding module 24 will identify these as encoding parallel paths and delete one of the links whilst updating the link encoding for the remaining link being a link encoding MEE being the letter M followed by the two previous codings E and E appended to one another.

FIG. 8C illustrates the result of processing the lattice of FIG. 8B after one of the links between node 6 and node 8 has been deleted and the link encoding has been updated.

The new single link from node 6 to node 8 will then be considered and node 8 will now be identified as being start node once in link 8-D4 and an end node once by the new single link 6-8. This means that node 8 can therefore be deleted with the link encoding for the new link between node 6 and node D4 being P8 representing the deleted node, followed by MEE the link encoding for the node 6 and node 8 followed by P10EE the previous link encoding for the link between node 8 and node D4.

FIG. 8D is a illustration of the lattice at this stage of processing. As can be seen from FIG. 8D the link between node 6 and node D4 is associated with the code P8MEEP10EE whilst the link between node 7 and node D4 is associated with the code P9EE and all the remaining links are associated with the same code namely the single letter E.

After processing node 6 and removing node 8, no further processing of links from node 6 can take place so the link encoding module 24 would then consider in turn each of the nodes D2, D5 and D3. In all these cases the nodes are connected to node 7 which is an end node for four links and therefore cannot be removed.

Having considered nodes D2, D5 and D3, node D1 would then be considered. This is connected by a single link to node 6. However, node 6 is the start node for two links a link to node 7 and a link to node D4. Therefore node 6 is not removed.

Node 3 is then considered. This node is the start node for the single link to node D2. In addition to appearing once as an end node in the link 3-D2, node D2 is also recorded once as a start node for a single link D2-7. D2 is therefore processed. As D2 is a dummy node, D2 is then deleted from the data stored within the embedding table 36 and the links between nodes 3 and D2 and node D2 and 7 are replaced by a single link between node 3 and node 7 that link being associated with code DEE, D identifying that a dummy node has been deleted and E and E being the two codes associated with the two links which have been removed.

FIG. 8E illustrates the lattice and link encoding at this stage of processing.

Having processed node 3, nodes 5, 4 and 2 are processed one after another in a similar way removing dummy nodes D5, D3 and D1 respectively and updating the link data in the embedding table 36 and the link encoding 40 associated with processed links in the same way to the removal of dummy node D2 is processed.

FIG. 8F is a schematic illustration of the lattice after the dummy nodes D5, D3 and D1 have been processed and removed. At this stage each of the links between node 2 and node 6, node 3 and node 7, node 5 and node 7 and node 4 and node 7 are associated with the code DEE indicating that from each of the links a single dummy node has been removed.

Having processed node 2, node 1 is then selected. The link between node 1 and node 3 identifies node 3 which is an end node for the links between node 1 and node 3 and the link between node 2 and node 3. For this reason node 3 cannot be removed.

The next link having node 1 as a start node is then selected. In this example the next link would be the link between node 1 and node 5. Node 5 would then be identified as appearing once as an end node for that link and once as a start node for the link from node 5 to node 7. Node 5 would therefore be deleted and a new link between node 1 and node 7 generated and associated with the link encoding P5EDEE.

The links between node 1 and node 4 and node 7 would then be processed in the same way with node 4 being deleted and the links between node 1 and node 4 and node 4 and node 7 being replaced by a single link from node 1 to node 7 associated with link encoding P4EDEE.

The stored lattice at this stage of processing is illustrated by FIG. 8G. At this stage, two of the links having a start node of node 1 identify a same end node namely node 7. The link encoding module 24 therefore deletes one of these links and updates the encoding for the remaining link as an encoding M followed by the larger encoding for the deleted or remaining links and then shorter encoding for the remaining or deleted link.

In the present case the updated encoding will be MP5EDEEP4EDEE. The lattice at this stage of processing is illustrated in FIG. 8H. At this stage neither of the nodes identified by links from node 1 can be removed and so the links from node zero are then considered. As neither of the nodes identified by links having node zero as a start node can be removed and node zero is the final node, the processing of the link encoding module is complete.

Thus at this stage in the case of the exemplary lattice of FIG. 8H the following data would be stored in the embedding table 36.

| Embedding Data | |
| --- | --- |
| Layer No. | Nodes |
| 1 | [0] |
| 2 | [2, 1] |
| 3 | [3] |
| 4 | [6] |
| 5 | [7] |
| 6 | |
| 7 | [D4] |

Link Data (0,2),(0,1),(2,6),(2,3),(1,3),(1,7),(3,7),(6,D4),(6,7),(7,D4)

And the link encoding 42 would associate each of the above links with the following link endcoding data:

E, E, DEE, E, E, MP5EDEEP4DEE, DEE, P8MEEP10EE, E, P9EE respectively.

After the link encoding module 24 has removed all linear and all parallel paths from the lattice so that only nodes in the first and last layers and nodes which are connected to at least three other nodes in the simplified embedding remain, the remaining simplified lattice is then encoded by the shape encoding module 26 as will now be described.

Processing Performed by the Shape Encoding Module

The processing of the shape encoding module 26 will now be described in detail with reference to FIGS. 9A and 9B which are a flow diagram of the processing operations performed by the shape encoding module 26 and FIGS. 10A, 10B and 10C which are schematic illustrations of the encoding of the lattice of FIG. 8H.

As previously described, the link encoding module 24 simplifies the lattice structure identified by embedding data and link data 40 within the embedding table 36 to encode in the form of link encoding data 40 associated with links in the lattice structure, portions of the lattice corresponding to linear and parallel paths between nodes which connect only to themselves and not to any other portion of the lattice. The result of processing by the link encoding module 24 is therefore a lattice structure where with the exception of nodes at the beginning and the end of the lattice (in a case of the lattice of FIG. 8H nodes 0 and D4), all of the nodes are connected to at least three other nodes. Further in the simplified lattice structure none of the links between nodes are duplicated. That is to say there is never more than one link between any pair of nodes.

When a simplified lattice structure has been generated by the link encoding module 24, a complete representation of the original lattice structure processed by the link encoding module 24 is then created by the shape encoding module 26 in the form of three sets of data. These three sets of data comprise shaping encoding data 42 which encodes the shape of the simplified lattice generated by the link encoding module 24; a link list 43 which is a concatenated list of the determined link encodings 40 for links in the simplified lattice; and a node list 44 comprising an ordered list of all the nodes in the original lattice structure processed by the link encoding module 24.

The shape encoding data 42 in this embodiment comprises for each area defined by the simplified lattice a three number code. The first number of this three letter code identifies where on the lattice an area is attached whilst the second two numbers identify the number of links in the area encoded.

Thus for example, referring to FIGS. 10A-10C and as will be described in detail later, when processing the lattice of FIG. 8H, initially the area of the shaded nodes 0,2,3,1 in FIG. 10A is enclosed by a shape encoding 0,2,2. Being an offset 0 and 2 and 2 identifying the number of links in the paths 0,2,3 and 0,1,3 defining the encoded shape.

The offset for the next area to be encoded is determined. In this example the next area 2,6,7,3. The offset relative to node 0 for node 2 is one and the shape encoding 1,2,2 is then determined. The area encoded at this stage is shown in FIG. 10B by the shaded nodes and full arrows.

Figure 10B:
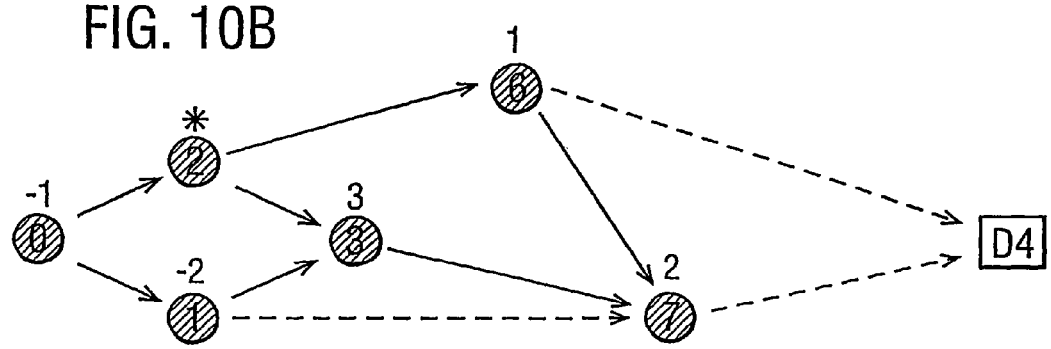
Figure 10C:
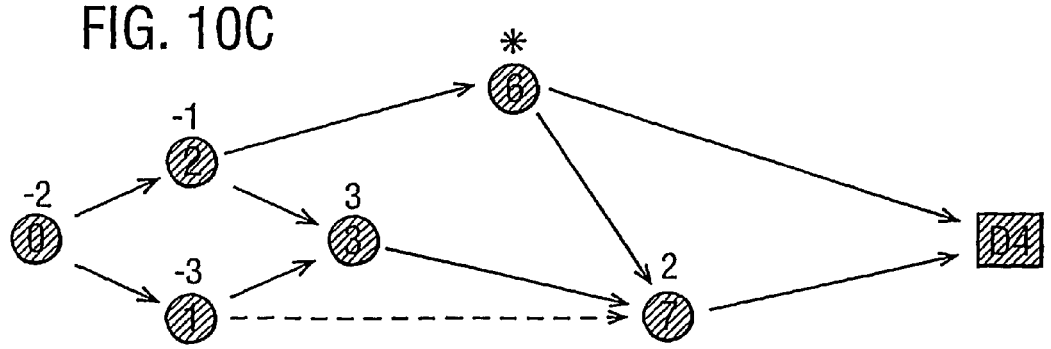

The next area 6, D4, 7 is then identified and this area is then encoded as illustrated by FIG. 10C. The final unencoded area 1,3,7 is then identified and a final three number code for that are is generated.

As will be described in detail later once a complete shape encoding 42, link list 43 and node list 44 have been generated, they are then processed by the decoding module 28 to establish a final lattice structure corresponding to the lattice structure defined by speech node data 30 stored in the data store 20. The shape encoding 42 and link list 43 are then output by the output module 29 together with the additional data associated with nodes which is ordered in the order corresponding to the node list 44 and data associated with the links in the nodes by the speech link data 32 ordered in an order determined by the final lattice structure generated by the decoding module 28.

Referring to FIG. 9A, initially (S9-1) the single node in the list of nodes for the first layer of nodes is identified. The number identifying this node is added to the node list 44 and also added to lists for an upper and lower boundary and also set to be identified as both the current node and the last node processed.

Thus for example in the case of the lattice of FIG. 8H, where the first node is 0, the following data would be stored.

| Last Processed Node | 0 |
| Current Node | 0 |
| Node List | [0] |
| Upper Boundary | [0] |
| Lower Boundary | [0] |

The shape encoding module 26 then (S9-2) determines whether one or more links identified by link data within the embedding table 36 identify the current node as a start node.

If only a single link having the current node as a start node is identified by link data within the embedding table 36, this indicates that the portion of the lattice directly adjacent to the current node comprises a number of links or nodes representing one or more parallel or linear paths. If this is the case, the shape encoding module 24 (S9-3) then compares the values of the last node processed with the value of the current node. If these two numbers are equal, as will be the case when processing the initial node, the link encoding module 24 then adds to the shape encoding stored in the data store, a string of numbers comprising an offset value set to zero and the numbers 1 and 1 (S9-3). If the two values are not equal a different offset number is calculated as will be described in detail later.

The shape encoding module 26 then (S94) selects the link encoding data 40 associated with the current link being processed, namely the single link having the current node as a start node and utilises the link encoding associated with that link to update the link list 43 and the node list 44. Specifically if any numbers appear in the link encoding 40 for the link being processed, these numbers are added to the node list in the order in which they appear in the link encoding. The remainder of the link encoding from which these numbers have been removed is then added to the link list 43.

The last node processed is then (S9-5) set to the node identified as the end node for the link and the current node the lists for the upper and lower boundaries are all reset to identify only this end node. The end node is then appended to the end of the node list 44.

Thus for example in the case of a node 0 having a single link (0,5) associated with the following link encoding MP4EEP3EEE, the last processed node, current node, node list 44, link list 43, shape encoding 42 and upper and lower boundaries would be updated to become as follows:

| Last Processed Node | 5 |
| Current Node | 5 |
| Node List | [0, 4, 3, 5] |
| Link List | [MPEEPEEE] |
| Shape Encoding | [0, 1, 1] |
| Upper Boundary | [5] |
| Lower Boundary | [5] |

If the shape encoding module 26 determines (S9-2) that the current node appears more than once as a start node for the links identified by link data within the embedding table 36 (S9-2) such as is the case in the exemplary lattice of FIG. 8H, where node 0 is connected by two links, one between node 0 and node 2 and one between node 0 and node 1, the shape encoding module 26 then (S9-6) identifies an upper and a lower path for the area of the lattice being encoded.

Specifically, the shape encoding module 26 initially identifies the last two unprocessed links identified by the ordered link data in the embedding table 36 having the current node as a start node.

Thus in the case of the lattice of FIG. 8H the links between node 0 and nodes 2 and 1 will be identified. Data identifying these links is then stored by the shape encoding module 26 as path data for the area being encoded.

Specifically data identifying the later link in the ordered link data is added to a path identifying a lower path and data identifying the other link is added to data for an upper path.

Thus for example in the case of the lattice structure of FIG. 8H, the following data would be stored:

| Upper Path: | [0, 2] |
| Lower path: | [0, 1] |

The layer numbers for nodes identified by the final nodes in the upper and lower paths are then compared. If the final node in the upper path list corresponds to a layer for earlier timing data 34 than the final node in the lower path list, the upper path list is processed. If this is not the case the lower path is processed.

When the upper path is processed, links having the final node in the upper path as a start node are identified. In the case of the paths above and the lattice structure of FIG. 8H, the links 2-6 and 2-3 will be identified. The node identified by the end node of the latest link in the ordered link data having the final node in the upper path as a start node is then identified. The identified node is then added to the end of the upper path list. Thus in the case of the lattice structure of FIG. 8H the upper path list would be updated to become [0,2,3].

When the lower path is processed, links having the final node in the lower path as a start node are identified and the earliest link in the ordered link data having the final node as a start node is identified. This end node of this identified link is then added to the list of nodes for the lower path.

This process is repeated for each layer until the final node in the list of nodes the upper and lower paths is identical. Thus for example in the case of the lattice of FIG. 8H an upper path comprising nodes 0,2 and 3 and a lower path comprising the nodes 0,1 and 3 would be identified and stored. The upper and lower boundaries stored by the shape encoding module 26 are then updated to correspond to these identified upper and lower paths respectively.

The shape encoding module 26 then proceeds (S9-7) to update the shape encoding 42 utilising the identified paths. Specifically, the last processed node data and current node are then compared and an offset value determined. Where these two numbers are equal as will be the case when processing the first area of a lattice an offset of zero is determined. The shape encoding is then updated by adding to the end of the current list, a list of three numbers comprising the determined offset number and a number identifying the number of links in the upper path and the number of links in the lower path. Thus in the case of the area identified by nodes 0,2,3 and 1 of FIG. 8H, a shape encoding of [0,2,2] indicating an area having two links in the upper and lower paths would be stored.

The link data associated with the links identified by the upper and lower paths are then identified (S9-8) and processed (S9-9) and the link list 43 and node list 44 are then updated.

Specifically starting from the first node identified by the updated upper path list, the first link identified by the first two numbers in the upper boundary list is identified. In the case of the lattice of FIG. 8H this will be the link between node 0 and node 2. The link data associated with this link is then processed so that any node numbers appearing in the link encoding associated with that link are added to the node list and the link encoding from which these numbers have been removed is then added to the link list.

In the case of the link encoding data identified by the link between 0 and 2 in FIG. 8H as this link comprises a single symbol the letter E no nodes are added to the node list and the letter E is added to the link list. The next node in the upper path list is then added to the node list and the link identified from that node by the upper path list of nodes is processed in the same way as has previously been described. When all of the upper path list has been processed in this way the lower path list is processed in the same way until the final link between the last two nodes in the lower path list has been processed.

Thus for example in the case of processing the lattice structure of FIG. 8H the following data will be stored at this stage.

| | |
|---|---|
| Last Processed Node | 0 |
| Current Node | 0 |
| Node List | [0, 2, 3, 1] |
| Link List | [EEEE] |
| Shape Encoding | [0, 2, 2] |
| Upper Boundary | [0, 2, 3] |
| Lower Boundary | [0, 1, 3] |

After the link list and node list have been updated the shape encoding module 26 then (S9-10) determines whether the current node corresponds to the node identified by the final number in the upper and lower boundary lists. If this is the case, alternatively after having processed the single link from the current node being processed (S9-2-S9-5), the shape encoding module 26 then (S9-11) determines whether the current node being processed identifies the single node in the last layer of the embedding data in the embedding table 36. If this is the case the entire lattice structure will have been encoded by the shape encoding module 26 and the processing of the shape encoding module 26 comes to an end.

If, however, the current node does not identify the node in the last layer identified by the embedding data in the embedding table 36, the shape encoding module 26 then (S9-2) determines the number of links having the current node as a start node and proceeds to process those links in the manner described above (S9-2-S9-10).

If the current node does not identify the final node in the boundary upper and lower boundary lists, the shape encoding module 26 then (S9-12) determines whether the current node is associated with any links which have not already been processed.

If this is not the case the shape encoding module 26 then (S9-13) proceeds to select another node for processing.

More specifically where the current node corresponds to one of the nodes in the upper boundary list except for the final two nodes in that boundary list, the next node for processing is selected as being the next node in the upper boundary list. If the current node identifies the penultimate node in the upper boundary list, the next node selected is the second node in the lower boundary list. If the current node is a node identified by any of the numbers in the lower boundary list except for the first node number, the next node in the lower boundary list is selected. Thus in the case of the lattice of FIG. 8H, after all the links from node 0 have been processed, the next node selected will be node 2.

After the current node has been updated the shape encoding module 26 then determines whether the current node identifies the last node in the upper and lower boundary lists (S9-10) before either determining whether-all the nodes have been processed (S9-11) or determining whether the newly-selected node is the start node for any links which have not yet been processed (S9-12).

When it is determined (S9-12) that the current node is a start node for any link which as not been processed, upper and lower paths for the area including the unprocessed link are then determined (S9-14).

More specifically, if the current node is in the upper boundary list the link having the current node as a start node and the next node to the current node on the upper boundary list is identified. This link is used to set the first two nodes in the lower path for the next area to be processed. Thus in the case of the lattice of FIG. 8H after the area defined by nodes 0,2,3 and 1 has been encoded and node 2 was being processed the nodes 2 and 3 would be set as the initial nodes in the lower path list.

The unprocessed link closest to the tail of the ordered link data having the current node as a start node is then used to identify nodes to add to the upper path. In the case of the lattice of FIG. 8H, above, this will be the link (2,6) and hence the upper path would be updated by being set to be the list [2,6].

Where the current node is not identified by a number in the upper boundary list, the link identified by the current node and the next node in the lower boundary list is set as the start of the upper path list and the next unprocessed link closest to the head of the ordered link data and having the current node as a start node is used to set the start of the lower path list.

The rest of the upper and lower path lists are then determined for the area to be encoded in the same way as has previously been described in relation to step (S9-6). Thus in the case of an area having node 2 of FIG. 8H as a start node, the upper and lower paths identifying nodes [2,6,7] and [2,3, 7] would be determined.

The shape encoding module 26 then (S9-15) determines whether the area defined by the calculated upper and lower paths can be encoded at this stage. In order to determine this, initially, the shape encoding module 26 checks whether the current node is identified by a node in the upper boundary list. If this is the case, the shape encoding module 26 then determines whether the lower path for the current area includes only nodes identified by the upper boundary list or includes all of the nodes in the upper boundary list from the current node to the end of the upper boundary list. If this is the case the area can be encoded.

Where the current node does not correspond to any of the nodes in the upper boundary list, the shape encoding module 26 determines whether the upper path determined for the area either includes only nodes identified by the lower boundary list or includes all of the nodes in the lower boundary list from the current node to the end of the lower boundary list. If this is the case the area can be encoded.

If it is determined (S9-15) that the current area cannot be encoded at this stage, the node and the upper and lower paths associated with that node are stored (S9-16) and the next node on the boundary to the current node is selected for processing (S9-13).

If the shape encoding module 26 determines that the area for the current node can be encoded (S9-15) the shape encoding module 26 then determines an offset value from the values of the current node and the last processed node and adds to the shape encoding the number corresponding to the determined offset and numbers identifying the number of links in the upper and lower paths associated with the node being processed.

The offset determined by the shape encoding module 26 is determined in the same way as the offset is determined for steps (S9-3) and (S9-7) as will now be described in detail with reference to FIG. 10A.

As has previously been stated whenever the current node is set to be equal to the last node processed, the offset value for the shape encoding generated by the shape encoding module 26 is set to 0.

If the last processed node number and the current node number are not equal an offset value is calculated in the following manner. An offset list is first generated by copying the upper boundary list and removing the final node appearing in that list before appending the lower boundary list in reverse order.

Thus in the case of the boundary shown by FIG. 10A by the darkened circles, an offset list comprising the numbers [0,2, 3,1] identifying the nodes in the boundary will be generated.

The number of steps around the boundary following the nodes in order starting from the last processed node to reach the current node by going either clockwise or anticlockwise around the nodes in the order identified by the offset list is then determined.

Where the number of steps going clockwise is smaller than the number of steps going anticlockwise this is the value of the offset. Where the number of steps going anticlockwise is less than the number of steps going clockwise, the offset is set to a negative number corresponding to the number of the steps.

Thus for example as shown in FIG. 10A when 0 is the last processed node identified by a * in the Figure and the upper and lower boundaries comprise the nodes 0,2 and 3 and 0,1 and 3 respectively the offsets for nodes 2, 3 and 1 are 1, 2 and −1 respectively as shown by the numbers above the shaped circles in the Figure. These numbers uniquely identify the position each node on the boundary relative to the last processed node, node 0.

After the shape encoding 42 has been updated, the shape encoding module 26 then updates the boundary lists (S9-19).

Specifically, the shape encoding module 26 first determines whether the node identified as the current node is in the upper boundary list. If this is the case, the number of links in the lower path determined for the area being encoded is compared with the number of links between the current node to the node at the end of the upper boundary list.

If the number of links in the lower path is greater than the number of links separating the current node being processed from the final node in the upper boundary list the number of nodes in excess of the nodes separating the current node from the final node in the upper boundary list at the end of the lower path are appended to the lower boundary list.

Thus, for example in the case of processing the area defined by nodes 2,6,7,3 in FIG. 10A, where the area defined by nodes 0,2,3 and 1 has already been processed, as the lower path [2,3,7] for the area being processed includes more links than separates the current node, node 2 from the end of the upper boundary list [0,2,3], namely one link, the lower boundary is updated by adding the final node, node 7, from the lower path for the area being encoded. Thus in this case the lower boundary becomes [0,1,3,7].

The upper boundary list is then modified by having all nodes from the current node to the end of the list deleted and the upper path list being appended to the shortened upper boundary list.

Thus in the case of processing area defined by nodes 2,6,7 and 3 where the current node is 2 and the upper boundary is originally [0,2,3] the upper boundary will first be shortened to become [0] and then the upper path [2,6,7] will be appended to this shortened list so that the upper boundary list becomes [0,2,6,7]. In FIG. 10B shaded nodes are nodes included in the boundary lists at this stage.

Where the current node being processed does not correspond to a node on the upper boundary list, the number of links separating the current node from the final node in the lower boundary list is determined. The number of links by which the upper path exceeds this number of links is then determined. The number of nodes appearing at the end of the upper path list corresponding to this number are then appended to the list of nodes identifying the upper path boundary. The nodes in the lower boundary including the current node or subsequent nodes are then deleted and the lower path list is appended to the lower boundary list.

After the boundary has been updated, the links which have been added to the encoded area of the lattice are then identified (S9-20). These links will comprise the links added to the upper and lower boundary lists respectively. Thus in the case of processing the area defined by nodes 2,6,7 and 3 of FIG. 10A after the area defined by nodes 0,2,3 and 1 has been encoded, the added links will comprise links between 3 and 7, 2 and 6 and 6 and 7.

In the case of an area being encoded associated with a current node in the upper boundary, these links are ordered in the order of the links added to the lower boundary and then the upper boundary, thus in the above case links are ordered 3-7, 2-6 and 6-7. If the current node is not in the upper boundary list links added to the upper boundary placed before the links added to the lower boundary.

The link data of each of these links is then (S9-21) processed in order in the same way as has previously been described in relation to steps (S9-5) and (S9-9) with the end node for each link being added as a node to the node list after the link data has been processed where this node has not already been added to the node list. The last processed node is then updated to be equal to the value of the current node.

Thus in the case of encoding the area defined by nodes 2,6,7 and 3 of FIG. 8H after the area defined by nodes 0,2,3 and 1 has been encoded, the following data will be stored at this stage.

| | |
|---|---|
| Last Processed Node | 2 |
| Current Node | 2 |
| Node List | [0, 2, 3, 1, 7, 6] |
| Link List | [EEEEDEEDEE] |
| Shape Encoding | [0, 2, 2, 1, 2, 2] |
| Upper Boundary | [0, 2, 6, 7] |
| Lower Boundary | [0, 1, 3, 7] |

After the link list and node list and last processed node have been updated, the shape encoding module 26 then (S9-22) determines whether any nodes on the boundary have been scheduled for later processing. If this is the case the final area which was rejected for encoding is then selected (S9-23) and an offset and shape encoding is determined for the area setting the current node equal to the selected node and processing the upper and lower path data determined for that node. The boundary data, shape encoding, node list and link list and other data stored by the shape encoding module 26 is then updated utilising the upper and lower path data as previously described above (S9-18-S9-22).

When all of the nodes which are scheduled for later processing have been processed, the shape encoding module 26 then determines whether the currently selected node has any further links which have not been processed which may encode an area (S9-12) and then processes those links (S9-14-S9-23) or selects the next node on the boundary (S9-13) before processing that node in the manner previously described (S9-S9-23).

Thus by processing the simplified lattice in this way each area defined by the lattice is encoded in turn. Referring to FIGS. 10A, B and C, for example after the area identified by the shaded circles in FIG. 10A has been encoded the next node selected for encoding will be node 2 which has an offset value of 1 relative to node 0 which is the start node for the previously encoded area. The area identified by node 2 and the links 2-6, 6-7, 3-7 and 2-3 is then encoded and the boundary updated accordingly as shown in FIG. 10B.

At this stage node 2 will be the current node and the nodes from the boundary will comprise the nodes shaded in FIG. 10B.

When the next node on the boundary associated with unprocessed links is determined, node 6 will be identified. An offset for that node relative to node 2 will then be determined which in this case will be 1 as indicated by the numbers above the circles in FIG. 10B. The area identified by nodes 1, 6, D4 and 7 is then encoded.

Having processed the entirety of the upper boundary, the nodes in the lower boundary are then considered in turn and the first node in the lower boundary, node 1, attached to an unprocessed link will be identified. An offset value relative to node 6 is then determined which as indicated by the numbers above the circles shown in FIG. 10C is −3. A shape encoding for the shape identified by nodes 1, 3 and 7 is then determined and the link list and node list are updated as has been previously described. After node 1 has been considered node 7 and node 4 are considered in turn until the final node, node D4, is reached at which point no further encoding can take place.

At the end of this process the following data will be stored where the link encoding for links in the lattice correspond to those identified in FIG. 8H.

| | |
|---|---|
| Node List | [0, 2, 3, 1, 7, 6, 9, D4, 8, 10, 5, 4] |
| Link List | [EEEEDEEDEEEPEEPMEEPEEMPEDEEPEDEE] |
| Shape Encoding | [0, 2, 2, 1, 2, 2, 1, 1, 2, −3, 2, 1] |
| Dummy Nodes | [D1, D2, D3, D4, D5] |
| Dummy Links | (5-7) |
| Cross Links | (5-7) |

This data as will now be described is sufficient for the decoding module 28 to generate a lattice structure representative of the originally encoded lattice structure shown in FIG. 6A.

The processing by the decoding module 28 for regenerating the lattice structure will now be described in detail with reference to FIGS. 11A-D, FIG. 12 and FIGS. 13A-G.

Processing Performed by the Decoding Module

Figure 11A:
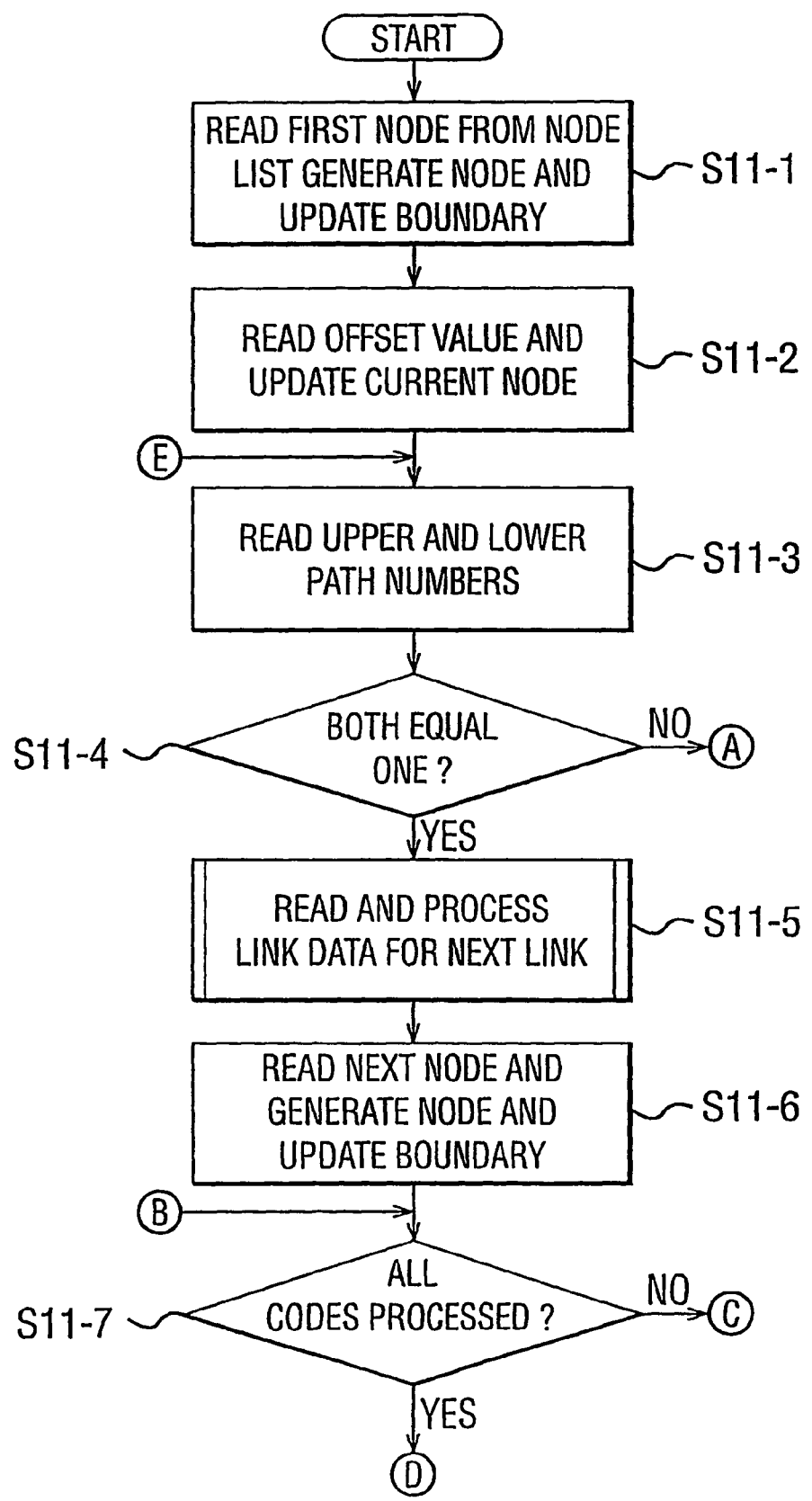
Figure 11B:
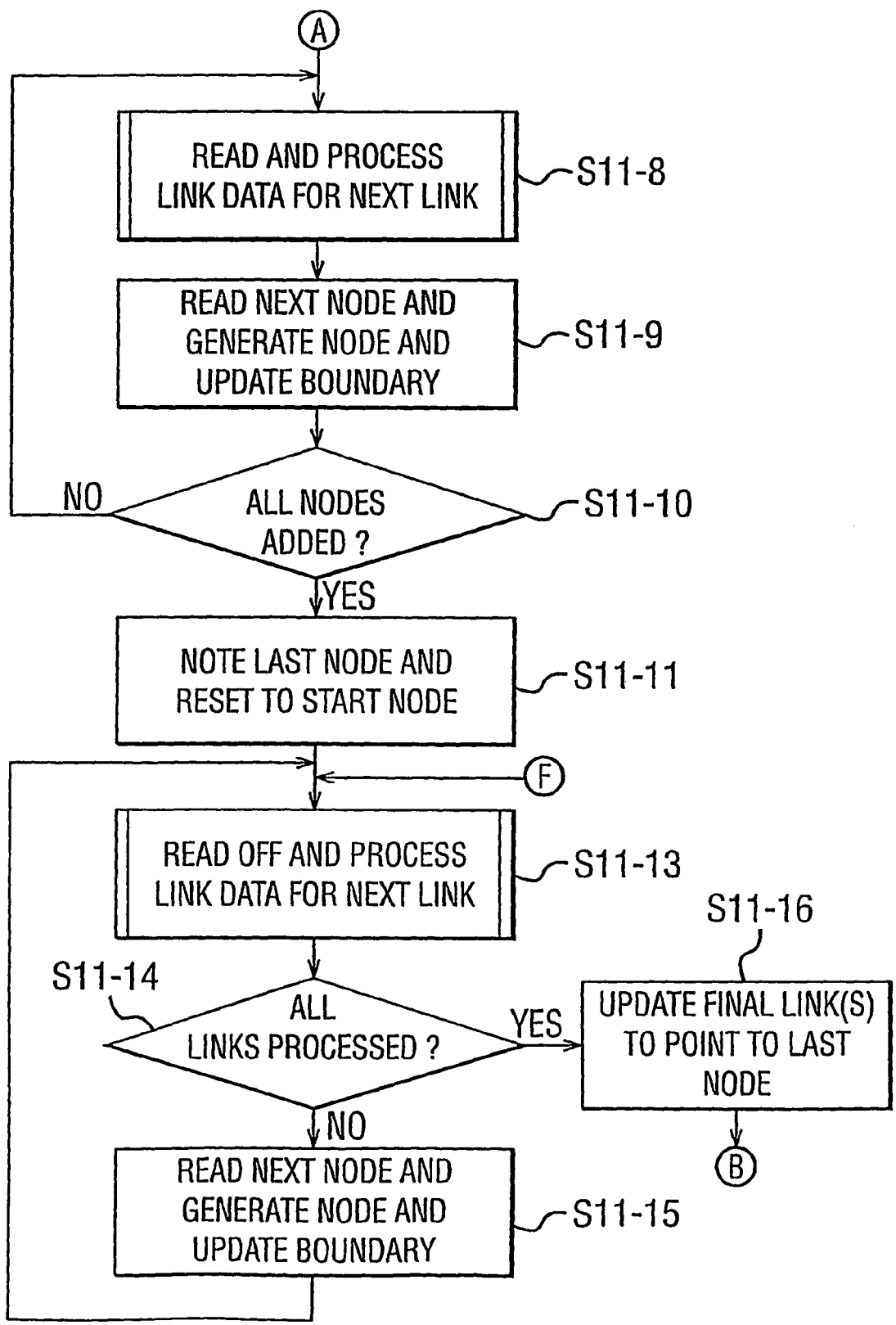

Referring to FIG. 11A, once a node list 44, link list and shaping encoding 42 for the entire lattice structure has been determined by the shape encoding module 26, the decoding module 28 then proceeds to generate a further representation of the lattice structure from the node list 44, link list 43, shape encoding 42 and dummy nodes and dummy links 38 and cross links 39 stored in the data store 20.

Specifically the decoding module 28 initially (S11-1) reads the first node from the node list. This node will be the node number for the first node in the lattice structure. The decoding module 28 then generates a list of nodes for the first layer in the lattice structure being generated which comprises the number of the node read from the node list.

Thus in the case of the node list above where the first node in the node list 44 is node zero, a node list for an item of embedding data for a first layer is generated comprising the list of nodes [0].

The decoding module 28 then generates an initial upper and lower boundary list both of which comprise lists having a single element, the element being the number of the node read from the node list 44. The decoding module 28 also sets the last process node and current node to equal the node read from the node list.

Thus at this stage the decoding module 28 will have the following data stored in the data store 20.

| | |
|---|---|
| Last Processed Node | 0 |
| Current Node | 0 |
| Node List | [2, 3, 1, 7, 6, 9, D4, 8, 10, 5, 4] |
| Link List | [EEEEDEEDEEEPMEEPEEMPEDEEPEDEE] |
| Shape Encoding | [0, 2, 2, 1, 2, 2, 1, 1, 2, −3, 2, 1] |
| Dummy Nodes | [D1, D2, D3, D4, D5] |
| Dummy Links | (5-7) |
| Cross Links | (5-7) |
| Upper Boundary | [0] |
| Lower Boundary | [0] |
| Embedding Data | |
| Layer 1 | [0] |
| Link Data | None |

The decoding module 28 then (S11-2) reads the next number from the shape encoding which in this case will be the value zero, and updates the current node number.

More specifically, where the number read from the shape encoding is equal to zero no action is taken. If the number is not equal to zero, the current node is updated as will now be described.

Initially, where the number read from the shape encoding is either a positive or negative number the location of the current node within the upper and lower boundary list is identified.

If the number read from the shape encoding is a positive number and the current node number identifies a node in the upper boundary list, the node in the list that number of nodes further in the list is identified and the current node updated accordingly. Where the current node is in the upper boundary list and the number read from the shape encoding is a negative number the decoding module 28 then counts toward the head of the list. When the number of nodes corresponding to the number from the shape encoding have been read off, the final number read off is identified and the current node updated accordingly.

If either the head or the tail of the upper boundary list is reached in the case of a positive number the next nodes counting the remaining number of nodes in from the tail of the lower boundary list are considered until the required number of nodes have been counted. Conversely in the case of a negative number if the head of the list is reached, the number of nodes from the head of the lower boundary list are considered in turn for the remaining number of nodes.

Where the current node does not appear in the upper boundary list, the position of the current node in the lower boundary list is identified, if the number read from the shape encoding is a positive number that number of nodes towards the head of the lower boundary list are read off and the final node read off is used to update the current node. Where the number read from the shape encoding is a negative number and the current node does not appear in the upper boundary list, the number of nodes represented by the number from the shape encoding, are read off starting from the current node heading towards the tail of the lower boundary list.

If the head or the tail of the lower boundary list is reached, further nodes are counted off from the upper boundary list (from the head in the case of a positive number and back from the tail in the case of a negative number) until all of the number of nodes identified by the shape encoding list have been accounted for. The current node value is then set equal to this final node identified in the boundary list.

After the current node data has been updated (S11-2) the encoding module 28 then (S11-3) reads off the next two numbers from the shape encoding list. In the case of the example shape encoding list above these numbers will be the numbers 2 and 2.

After the next two numbers from the shape encoding list have been read, the decoding module 28 then (S11-4) determines whether both of the numbers read off are equal to one.

If this is the case the decoding module 28 then (S11-5) proceeds to read symbols from the link list 43 until the number of symbols E read off exceeds the number of other symbols read from the list. This will comprise a link encoding for one of the links of the simplified lattice generated by the link encoding module 24. The link encoding read from the link list 43 is then processed as will now be described in detail with reference to FIG. 12 which is a flow diagram of the processing by the decoding module 28 of link encoding data from the link list 43 to regenerate the portion of the encoded lattice represented by the link encoding.

Referring to FIG. 12 initially, the decoding module 28 determines (S12-1) whether the current node corresponds to a node in the upper boundary list. If this is the case then when processing the link encoding any nodes added to the embedding data for the lattice structure being generated are added to the head of the lists for each layer. Otherwise newly added nodes are added to the tail of the lists in the embedding data.

Link data identifying the last node added to the lattice as a start node and a null end node is then generated and the link encoding read from the link list is associated with the newly generated link data and level data identifying the layer containing the start node of the generated link. The decoding module 28 then processes each of the links associated with link encoding data in turn.

Specifically the decoding module 28 initially (S12-2) determines whether the first symbol in the link encoding being processed is the letter D. If this is the case the decoding module 28 then (S12-3) increments level data associated with the link and deletes from the link encoding for that link the first two symbols from the link encoding.

If the first symbol of a link encoding associated with a link is not the letter D the decoding module then (S12-4) determines whether the first symbol is the letter P (S12-4). If this is the case the next element in the node list is read off and the link data associated with the link encoding being processed is updated (S12-5) to identify the node number read from the node list as an end node.

The node list for the layer one greater than the data associated with the link is then updated to include the end node for the link.

New link data having the newly read node as a start node and a null end node is then generated and associated with level data identifying the layer containing the start node of the link. The link encoding associated with the link which is being processed is then updated by having the first symbol, the letter P, deleted from the link encoding. The symbols in the remaining link encoding are then read one after another until the numbers of letters E read off exceeds the numbers of other letters. This read off link encoding data is associated with the newly generated link data and the symbol read off by the decoding module 28 are deleted from the link encoding of a link currently being processed.

If the next symbol of the link encoding being processed is not determined to be the letter P (S12-4), the decoding module 28 then (S12-6) determines whether the symbol at the beginning of the link encoding being processed is the letter M.

If this is the case, the decoding module 28 then (S12-7) generates a copy of the link data, and level data associated with the link encoding being processed. The decoding module 28 then updates the link encoding data associated with the current link by deleting the letter M from the beginning of the sequence of the symbols associated with the link and reading off the symbols of the link encoding data until the number of letters E exceeds the number of other letters in the link encoding. The symbols read off from the link encoding are then associated as link encoding with the newly generated link and the link encoding for the link being processed is updated by having the link encoding which has been read off deleted from the list of symbols associated with that link.

Thus, for example, referring to FIGS. 13A-F considering the case of decoding the following data from a link list: [MDEPEEDEDEE] associated with the following initial link data and level data:

(0,–)—level 0 and the following embedding data

Embedding Data

Layer 0 [0]

Figure 13A:

Referring to FIG. 13A, the above link encoding and link data is schematically illustrated in FIG. 13A where the start node of a link is shown as a number in a circle and the link is shown as an arrow pointing to a second circle. In the illustration the length of the node corresponds the level data with longer arrows being associated with greater level numbers and the link encoding is shown adjacent to a link.

Figure 13B:
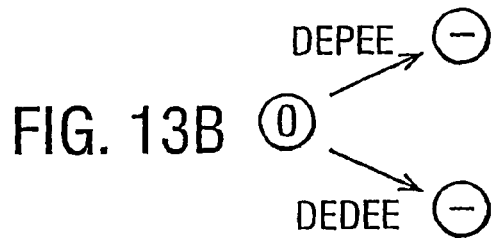

Initially the first letter in the link encoding is the letter M and therefore a copy of the link data (0,-) and level data will be created. The two copies of the link data would be associated with the following link encodings [DEPEE] and [DEDEE]. Thus at this stage the following data would be stored as is illustrated by FIG. 13B:

| Link | Link Encoding | Level |
|------|---------------|-------|
| (0, —) | [DEPEE] | Level 0 |
| (0, —) | [DEDEE] | Level 0 |

As the encoding data associated with the two links is not a single letter E one of the link encodings will then be selected for processing.

Figure 13C:
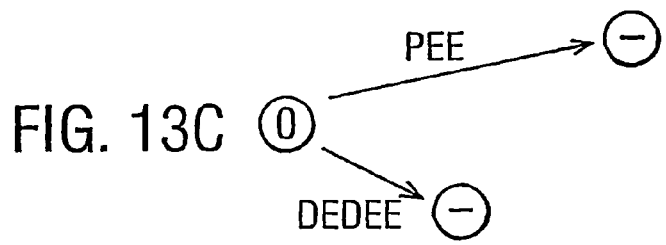

In the case of the first link encoding [DPEEE] the first symbol is D. Level data for that link then incremented by 1. The link encoding for the link replaced by the link encoding [PEE]. Thus at this stage the following data will be stored as is illustrated by FIG. 13C:

| Link | Link Encoding | Level |
|------|---------------|-------|
| (0, —) | [PEE] | Level 1 |
| (0, —) | [DEDEE] | Level 0 |

When the updated link encoding is processed, as the first symbol is the letter P, the link encoding associated with that link is updated by having the end node set to the next node appearing on the node list and a new link having the new node as a start node is generated and associated with the previous link encoding from which the first and last symbols have been removed. The new node is then added to the list of nodes adjacent to the layer identified by layer data for the link being processed and the new link is then associated with level data identifying this layer.

Thus, at this stage, if the next node on the node list was node 1 the following data would be stored.

| Embedding Data | | |
|---|---|---|
| Layer 0 | | [0] |
| Layer 1 | | — |
| Layer 2 | | [1] |
| Link Data | Link Encoding | Level |
| (0, 1) | [E] | Level 1 |
| (0, —) | [DDEE] | Level 0 |
| (1, —) | [E] | Level 2 |

Figure 13D:
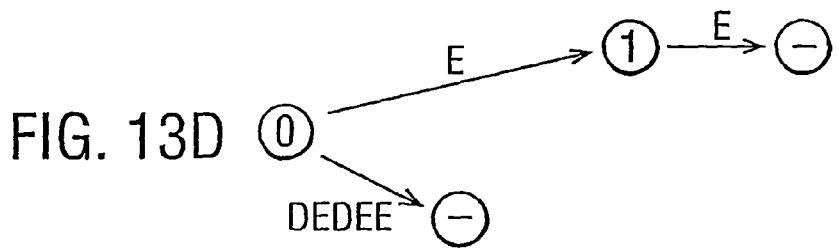

This data is illustrated by FIG. 13D.

Figure 13E:
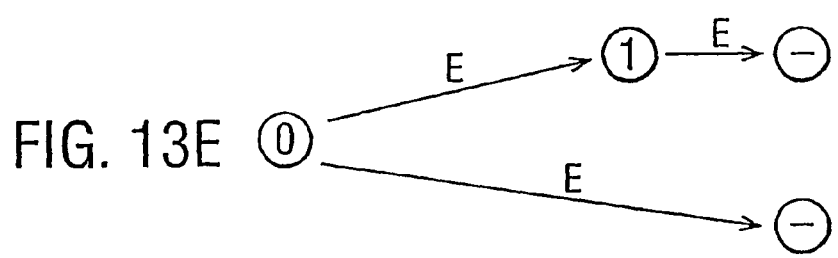

As the remaining links are both associated with a link encoding E, the decoding module 28 would then proceed to process the link encoding associated with the link data (0,-). As this link encoding comprises DEDEE, this would cause the level data to be updated to be equal to 2 at which point the encoding will only comprise the single letter E. After which all of the link encoding data will have been processed. The data at the end of processing the link encoding is illustrated by FIG. 13E.

Thus in this way the decoding module 28 is able to process data from the link list to generate embedding data and link data representing portions of the lattice structure including one or more parallel linear paths of nodes encoded by link encoding data 40.

Returning to FIG. 11A, after all of the link data has been processed (S11-5) the decoding module 28 then (S11-6) reads the next node from the node list 44. This node number is utilised to update the link data generated by the decoding module 28 from processing the link encoding obtained from the link list 43 which have null end nodes by replacing the null values with the value of the node read from the node list 44. One of the links which has just been updated is then selected and the node read from the node list 44 is then added to the list of nodes for the next layer to the layer identified by level data for the link.

Thus for example in the case of the links described above, if the next node number was node 2 the embedding data and link data would then become;

| Embedding Data |
|---|
| Layer 0 [0] |
| Layer 1 |
| Layer 2 [1] |
| Layer 3 [2] |
| Link Data |
| (0, 1), (0, 2), (1, 2) |

Figure 13F:

The final structure for the above example after node 2 has been added is shown in FIG. 13F.

The current node data and last processed node data is then re-set to be equal to the last node read from the node list 44 and the upper and lower boundary lists are reset to contain a single element being the number of the last node read from the node list 43.

The decoding module 28 then (S11-7) determines whether all of the shape encoding data 42 has been processed. If all the shape encoding data 42 has been processed the decoding module 28 then (S11-23) completes the representation of the lattice structure using the dummy links/node data 38 and cross link data 39 stored in the data store 20 as will be described later. Alternatively if this is not the case, the decoding module 28 proceeds to process (S11-7) the next numbers in the shape encoding 42 as will also be described in detail later.

If when the initial upper and lower path numbers are read from the shape encoding 42 (S11-3) the numbers are determined not to be both 1 (S11-4) the decoding module 24 then proceeds (S11-8) to read the next section of the link encoding from the link list 43 until the total number symbols represented by the letter E exceeds the number of other symbols and proceeds to process this link encoding data in the manner as previously been described in relation to step (S11-5).

After the link encoding data read from the link list 43 has been processed, the decoding module 28 then (S11-9) reads the next node number from the node list 44. Any link data generated as a result of processing the link encoding data which identify a null end node are then updated to include this node read from the node list 44 as the end node. The embedding data for the lattice structure is then updated in the manner which has previously been described where the number of the node read from the node list 44 is added to the list of nodes for the layer adjacent to that identified by level data of any of the links which has just been updated.

The decoding module 28 then (S11-10) determines whether all of the upper path encoded by the shape encoding data being processed has been decoded (S11-10). That is to say the decoding module 28 counts the number of times link encodings and nodes are added to the lattice structure being generated as a result of processing by step (S11-9 since the shape encoding being processed was read from the shape encoding 42. If this is less than the second number in the string of three numbers read from the shape encoding 42, the decoding module 28 proceeds to process (S11-8) the next section of link encoding from the link list 43 and then reads and processes (S11-9) the next node in the node list 44.

Thus, for example, if the following data were stored by the data store 20:

|  |  |
|---|---|
| Current Node | 0 |
| Node List | [2, 3, 1, . . . ] |
| Link List | [EEEE . . . ] |
| Shape Encoding Embedding Data | [0, 2, 2, . . . ] |
| Layer 1 | [0] |
| Link Data | None |
| Upper Boundary | [0] |
| Lower Boundary | [0] |

After processing the first two items in the link list, the data stored in the data store would be:

|  |  |
|---|---|
| Current Node | 0 |
| Node List | [1 . . . ] |
| Link List | [EE . . . ] |
| Shape Encoding Embedding Data | [0, 2, 2 . . . ] |
| Layer 1 | [0] |
| Layer 2 | [2] |
| Layer 3 | [3] |
| Link Data | (0, 2), (2, 3) |
| Upper Boundary | [0, 2, 3] |
| Lower Boundary | [0] |

When the decoding module 28 has determined that all the links identified for processing by the second number in the shape encoding 42 have been processed the decoding module 28 then (S11-11) proceeds to note the node number of the final node added and then processes (S11-13) the next section of link encoding from the link list containing more letters E than other letters. The decoding module 28 then associates the link encoding read from the link list 43 with a generated link having a start node corresponding to the current node and a null end node. The link encoding is then processed in the same way as previously been described. After an item of link encoding has been processed, the decoding module 28 then (S11-14) determines whether the total number of sections of link encoding processed by step (S11-13) since noting a last node value (S11-11) corresponds to the final number in the shape encoding being processed (S11-14).

If this is not the case the decoding module 28 then (S11-15) reads the next node from the node list adding this node as the end node the link data which currently identifies a null end node. The embedding data is updated using this node number in the manner previously described in relation to step (S11-9). The decoding module 28 then updates the boundary lists associated with the lattice being generated. In the present case, where the current node is both a member of the upper and lower boundary lists, this updating in contrast to that of step (S11-9) involves adding the newly identified node to the lower boundary list.

Thus in the case of the examples described above after two further items of link encoding data from the link list have been processed the following data will be stored:

|  |  |
|---|---|
| Current Node | 0 |
| Node List | [1 . . . ] |
| Link List | [. . .] |
| Shape Encoding Embedding Data | [0, 2, 2 . . . ] |
| Layer 1 | [0] |
| Layer 2 | [2, 1] |
| Layer 3 | [3] |
| Link Data | (0, 2), (2, 3), (0, 1) (1, —) |
| Upper Boundary | [0, 2, 3] |
| Lower Boundary | [0, 1] |
| Last Node | 3 |

When the total number of sections of link encoding data processed by step (S11-13) since the last node was noted (S11-11) corresponds to the number identified by the final value of the shape encoding being processed, the decoding module 28 then (S11-16) amends the link data having a null value as an end node to identify the last node and adds the last node to the lower boundary list.

The embedding data, link data and upper and lower boundary lists stored by the decoding module 28 in the data store 20 at this stage on the example described above will therefore be as follows:

| Embedding Data | |
|---|---|
| Layer 1 | [0] |
| Layer 2 | [2, 1] |
| Layer 3 | [3] |
| Link Data | (0, 2), (2, 3), (0, 1), (1, 3) |
| Upper Boundary | [0, 2, 3] |
| Lower Boundary | [0, 1, 3] |

The lattice structure encoded by this embedding data and link data at this stage is illustrated by FIG. 14A where the nodes corresponding to the same layers are shown in vertical columns and the link data is illustrated by arrows connecting a start node and end node for the link data.

Comparing the structure of FIG. 14A with that of FIG. 10A, it will be apparent that the generated structure corresponds to the shaded nodes and full arrows of FIG. 10A. Further comparing the initial node list, link list and shape encoding in this example with the corresponding node list, link list, and shape encoding of the example of FIG. 10A, it will be apparent that by processing the node list, shape encoding and link list generated for a structure in the manner as described, enables that structure to be recreated.

After the first set of three numbers comprising a shape encoding for links originating from the first node in the lattice structure has been decoded and a corresponding lattice structure generated, a decoding module then (S11-7) determines whether all the encoding data has been processed.

Figure 11C:
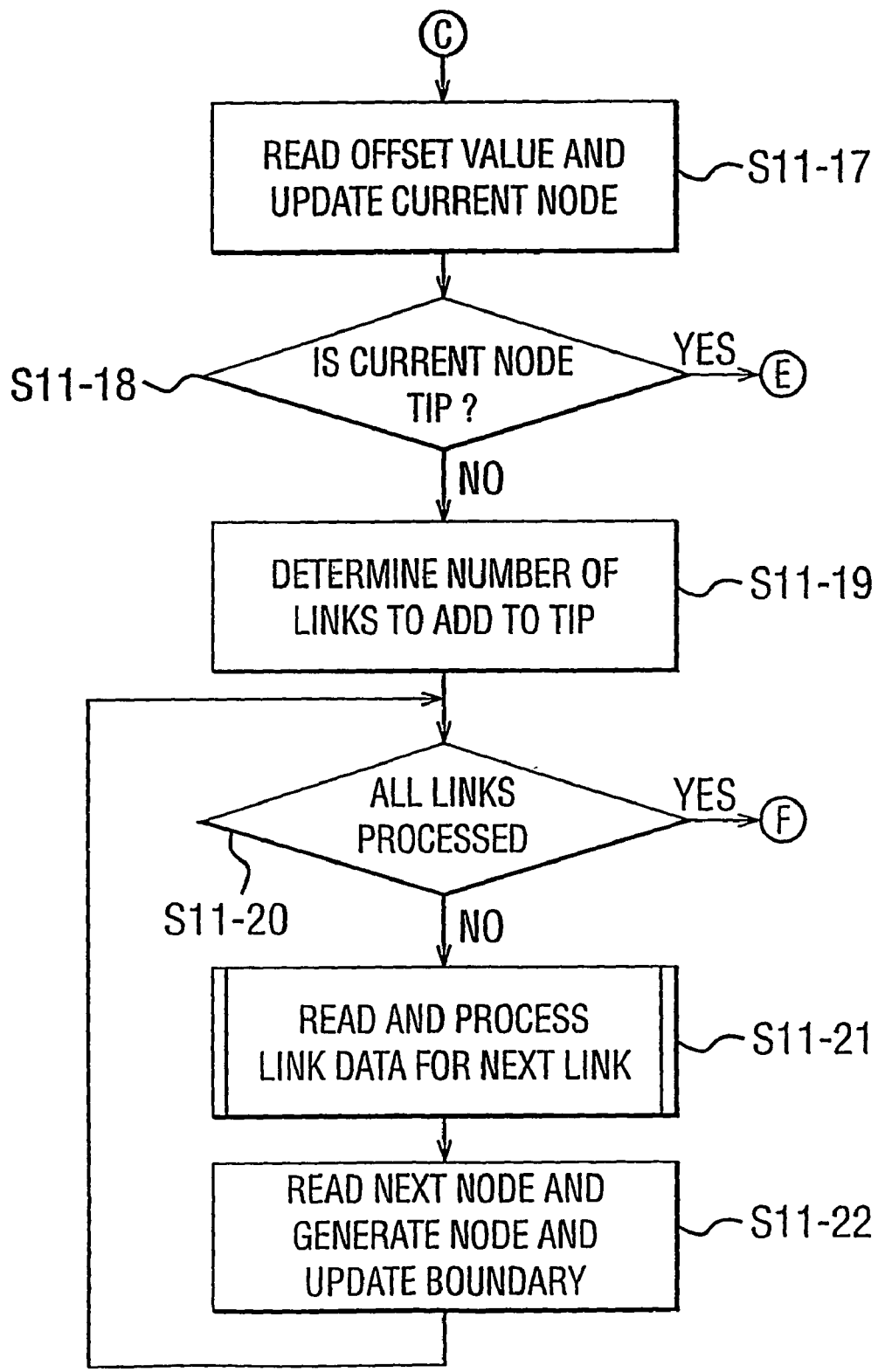
Figure 11D:
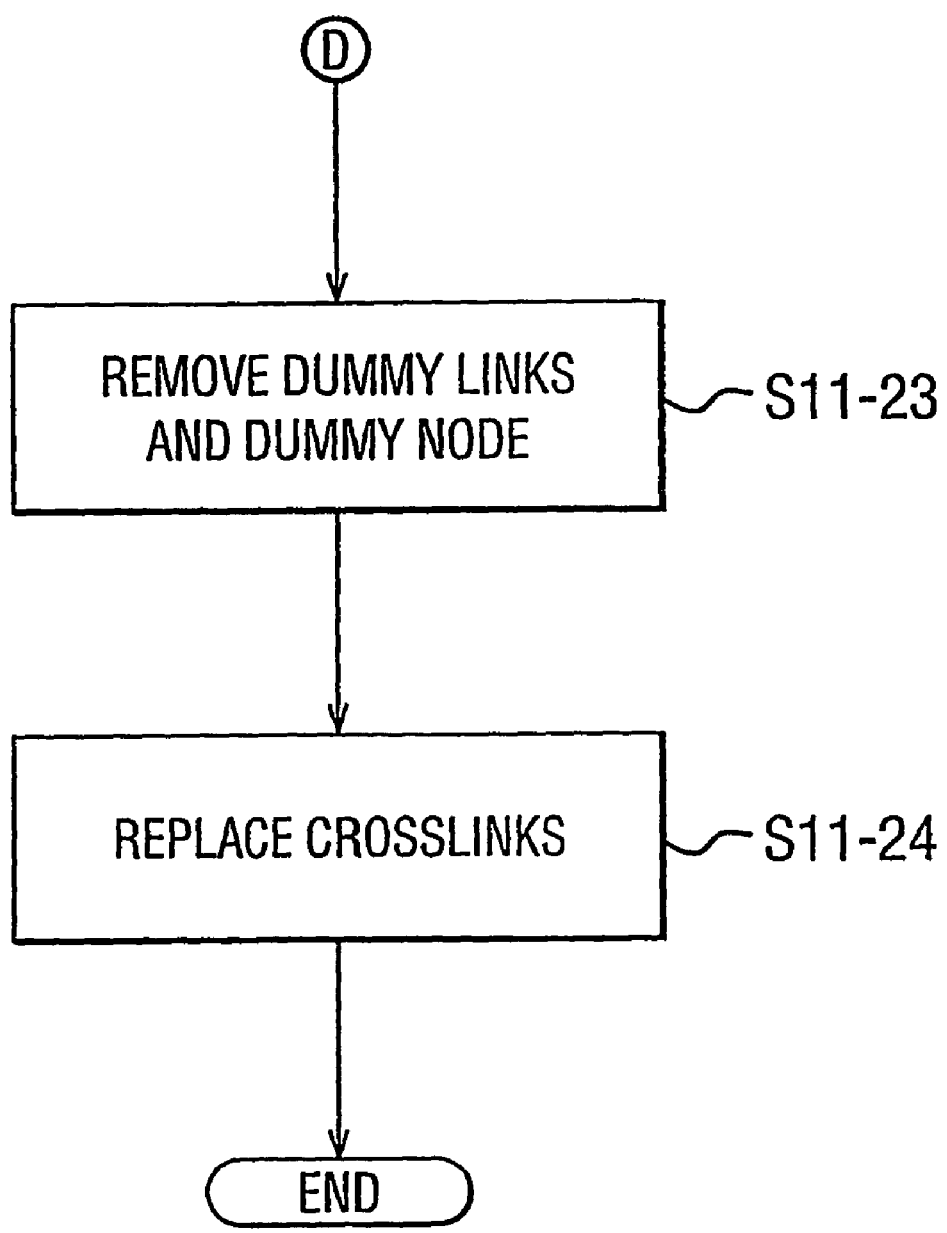

If this is not the case, referring to FIG. 11C, the decoding module 28 then (S11-17) reads the next number from the shape encoding 42. The decoding module 28 then updates the current node number in the same way as previously been described in relation to step (S11-2). That is to say if the number read from the shape encoding list 42 is zero no update occurs. If the number is a positive or negative number another node on the boundary of the structure which has been encoded is selected, the selected node being one of the nodes in either the upper or lower boundary lists.

Thus in the case of the structure of FIG. 14A if the next number in the shape encoding was 1 and the current node number is currently set to zero and upper and lower boundary lists [0,2,3] and [0,1,3] were stored, the current node number would be set to 2.

After the current node number has been updated (S11-17) the decoding module 28 then (S11-18) determines whether the node identified by the current node number corresponds to the final node in the boundary lists. If this is the case, the decoding module 28 then (S11-3-S11-S16) processes the next two numbers in the shape encoding and associated link encoding from the link list and nodes from the node list 44 in exactly the same way as has previously been described in relation to steps (S11-3-S11-16).

If the node identified by the current node number is not equal to the node identified by the last number in the boundary lists, the next two numbers of the shape encoding 42 are then read. The decoding module 28 then (S11-19) determines the number of links which are to be processed and added to the final node in the generated structure if any.

Specifically, initially the decoding module 28 determines whether the current node is a node in the upper boundary list. If this is the case, the second number of the two numbers from the shape encoding is compared with the number of nodes, separating the current node from the end of the upper boundary list.

Where the second number from the shape encoding exceeds the number of nodes separating the current node from the final node in the upper boundary list, the difference between the first number from the shape encoding and the number of nodes separating the current node from the end of the upper boundary list is determined and this is set to be the number of links to be processed.

If the current node is not identified by a node in the upper boundary list, the number of nodes separating the current node from the end of the lower boundary list is determined. This number is then compared with the first number of the two numbers from the shape encoding. Where the first number from the shape encoding exceeds the number of nodes separating the current node from the end of the lower boundary list, the difference between the first number from the shape encoding and the number of nodes separating the current node from the end of the lower boundary list is set as the number of links to be processed.

Thus, for example, in the case of processing the shape encoding [1,3,3] with the current node set to node 2 and the upper and lower boundaries equal to the following:

| Upper boundary | [0, 1, 2, 3, 4] |
| Lower boundary | [0, 5, 4] |

The current node 2 would be identified as being in the upper boundary and separated from the end of the upper boundary by nodes 3 and 4. As the total number of nodes 2 is less than the final number in the shape encoding [1,3,3] one extra node would be identified as having to be added to the structure from the final node (node 4) of the structure which has been generated.

In contrast if in the example above the current node was identified as node 1 and the same shape encoding is processed against the same boundary, as the above example node 1 is separated from the final node in the upper boundary by nodes 2, 3 and 4, comparing this number of nodes with the final number in the shape encoding being processed will identify that no nodes would have to be added to final node in the boundary list.

After the total number of links to be added has been determined (S11-19) the decoding module 28 then determines whether all necessary links have been processed (S11-20). If this is not the case the decoding module 28 then (S11-21) proceeds to read the link encoding data for the next link being the symbols at the head of the list until the total number of symbols represented by the letter E exceeds the total number of symbols represented by other letters. This link encoding is then processed in the same way as has previously been described in detail with reference to FIG. 12.

The next node number in the node list 44 is then read (S11-22). This node number is then used to update any link data identifying a null value as an end node. The level data associated with an updated link is then identified and the number corresponding to the readoff node number is added to the list of nodes in the embedding data for the layer adjacent to the layer identified by the level data for links being updated.

When the embedding data and link data have both been updated the node number is then added to the end of the upper boundary list where the current node is not identified by a node in the upper boundary list or to the lower boundary list where the current node is identified by a node number in the upper boundary list.

The decoding module 28 then re-determines (S11-20) whether the total number of sections of link data processed by step (S11-21) corresponds to the required number of links which need to be processed. If this is not the case further link data is processed (S11-21) and the boundary data embedding data and link data are all updated (S11-21, S11-22).

Thus, for example, referring to FIG. 14B after the shape encoding for the area identified by nodes 0, 2, 3 and 1 has been processed as described above in relation to FIG. 14A if the next shape encoding to be processed is the encoding [1,2,2]. In this case the first number 1 indicates an offset from the original start node 0 which moving clockwise around the decoded area causes node 2 to be reached. This node is in the upper boundary 0,2,3 and is separated from the final node in the boundary by the single link 2-3.

The final number in the shape encoding, in this example 2 is then compared with the number of links separating the current node 2 from the last node in the decoded area in the example a single link. As the shape encoding identifies a higher number than the number of links separating the current node from the last node in the decoded area, the number of links needed to be added to the final node is determined as the difference, in this case, one further link.

One set of link data is then processed and the next node is then read from the node table and added at the next layer. FIG. 14B is an illustration of the updated structure of FIG. 14A after link data DEE has been processed and the next node number 7 has been read from the node list 44.

After any required nodes have been added connecting to the final node in the previously encoded area, the decoding module then (S11-13) reads the next section from the link list 43 having more symbols E than symbols represented by other letters. This is then processed in the manner which has previously been described.

The decoding module 28 then (S11-14) determines whether all of the required additional links have been processed and if this is not the case the decoding module 28 proceeds to read the next node from the node list and update the upper or lower boundaries using the newly read off node (S11-15).

More specifically where the current node is identified by a number on the upper boundary list which is not the number at the head of the list, the number of sections of link encoding processed by step (S11-13) is compared with the first of the pair of numbers read from the shape encoding. If the number of processed sections of link encoding equals this number then no further nodes are added. If this is not the case, the next node is read off and the embedding data and link data pre-updated in the manner previously described and the upper boundary list is then updated.

When updating the boundary lists for the first iteration, all nodes from the current node to the final node in the upper boundary are deleted and the new node read off from the node list 44 it is appended to the list of nodes for the upper boundary. For all subsequent iterations no deletion occurs and the new node is added to the upper boundary list.

Conversely when nodes are being added to a current node in the lower boundary which is not also on the upper boundary list, the number of sections of link encoding processed by step (S11-13) is compared with the second of the pair of numbers read from the shape encoding. If the number of sections of link encoding equals this number then no further nodes are added. If this is not the case, the next node is read from the node list and the embedding data and link data updated as described previously. The lower boundary list is then updated. This updating is such that for the first iteration all nodes from the current node to the end of lower boundary list are deleted and the newly read off node is added to the end of the list. On subsequent iterations no deletion occurs and the new node number is added to the end of the list.

When it is determined that the decoding module 28 has processed the required number of sections of link encoding (S11-14) the generated links having null end nodes are then updated so as to have an end node identifying to the final node in the boundary list which does not include the current node. The last node in the boundary list node which does not include the current node is then appended to the end of the boundary list including the current node.

Thus for example processing the encoding 1,2,2 having previously generated the structure of FIG. 14A and processed part of the shape encoding to generate a structure shown in FIG. 14B, the final two links to be added to the current node, node 2, would be identified and processed one after another.

In doing so where the next node in the node list was [6] and the next sections of link encoding are [DEEE] the upper boundary list would firstly be amended to become [0,2,6]. After both of the required links have been processed the upper boundary would then become [0,2,6,7]. As a result the structure of FIG. 14C would be generated.

Thus considering the following shape encoding, link list and node list:

| | |
|---|---|
| Shape Encoding: | [0, 2, 2, 1, 2, 2, 1, 1, 2, −3, 2, 1] |
| Link Encoding: | [EEEEDEEDEEEPEEPMEEPEEMPEDEEPEDEE] |
| Node List: | [0, 2, 3, 1, 7, 6, 9, D4, 8, 10, 5, 4] | which corresponds to the shape encoding, node list and link list generated by encoding the structure of FIG. 8H, the structures of FIGS. 14A-14F will gradually be built up one after another.

More specifically, after processing the following:

| | |
|---|---|
| Shape Encoding: | [0, 2, 2, 1, 2, 2] |
| Link Encoding: | [EEEEDEEDEEE] |
| Node List: | [0, 2, 3, 1, 7, 6] |

The structure of FIG. 14C would have been generated and the processed node would identify node 2.

The next number from the shape encoding [1] would identify node 6 as the next node to process. The next two numbers 1,2 would then indicate a link to be added to node 7. Processing the next section of link encoding [PEE] and adding the next two nodes would then generate the structure of FIG. 14D.

The next section of link data [PMEEPEE] would then be processed adding links from node 6. FIG. 14E illustrates the structure generated whilst processing the link encoding where a link encoding [PEE] remains to be processed associated with a link (8,-).

The remaining data would then be processed and the structure of FIG. 14F eventually would be created.

When the final shape encoding has been determined (S11-7) to have been processed, the decoding module 28 then proceeds to (S11-23) remove dummy links and dummy nodes added to the structure.

More specifically the decoding module identifies the dummy nodes present in both the node list and dummy nodes/dummy links 38 identified by the data stored in the data store 20 and removes data representing the corresponding generated nodes from the embedding data created by the decoding module 28 for the structure being decoded. Whenever a dummy node is removed, any link data identifying that dummy node as either a start node or an end node is also deleted.

The links corresponding to the dummy links 38 are then also deleted from the link data and new links corresponding to the cross links 39 are added to the data stored in the embedding table 36.

Thus, for example, after generating the lattice structure illustrated by FIG. 14F from shape encoding data 42, a link list 43 and a node list 44, if the following dummy link/node data 38 and cross link data 39 were to be stored:

| | |
|---|---|
| Dummy Nodes | [D1, D2, D3, D4, D5] |
| Dummy Links | (5, 7) |
| Cross Links | (5, 6) | after processing the dummy nodes and link data 38 and cross links data 39 the lattice structure defined by generated embedding data and link data within the embedding table 36 would define the structure illustrated by FIG. 14G.

Comparing the structure of FIG. 14G with the original structure of FIG. 6A, it will be apparent that the lattices illustrated by FIGS. 6A and 14G are identical in that same nodes appear in the same layers although the nodes within some layers are slightly reordered. Further, for each of the connections between nodes in FIG. 6A there is a corresponding connection for nodes having the same numbers in FIG. 14G. The lattice structure identified by FIG. 14G is therefore a representation of the original lattice structure represented by the speech node data 30 originally processed by the embedding module 22 for which FIG. 6A was a representation. Furthermore, as the lattice structure of FIG. 14G is the result of a decoding operation from a defined shape encoding 42, link list 43 and node list 44, it is necessarily a structure which will be generated when the shape encoding 42 link list 43 and node list 44 are processed in the same way by another decoding module 48.

The final lattice structure generated by the decoding module 28 can therefore be used to determine a specific order for the links of the lattice structure so that data associated with those particular links by the speech link data 32 can be passed to the compression module 12 in a specific order.

Processing Performed by the Output Module

After the final representation of the speech lattice structure has been generated by the decoding module 28 and stored in the embedding table 36, the output module 29 is then invoked. The output module 29 then passes to the data compression module 12: the shape encoding 42 and link list 43 previously generated by the shape encoding module 26. The output module 29 then passes the data identifying dummy links 38 and cross links 39 and the timing data 34 to the data conversion module 12.

The output module 29 then utilises the node list 44 to select in turn items of other data associated with each of the nodes in the speech lattice by the speech node data 30. Specifically the first node in the node list 44 is read off and the other data associated with that node by the speech node data 30 is then passed to the data compression module. The next node in the node list is then identified and the other data associated with that node by speech node data 30 is then passed to the data compression module 12. In the case of dummy nodes appearing in the node list 44, data identify a node as a dummy node is passed to the data compression module. This process is repeated until the end of the node list 44 has been reached.

Finally, the output module 29 then orders the link data for the lattice structure stored in the embedding table 36 by start node number and orders link data having the same start node number by the order in which the end nodes for the links appear in the lists associated with layers by the embedding data.

Thus, for example, in the case of the lattice of FIG. 14G the links shown in FIG. 14G would be placed in the following order:

(0,2), (0,1), (2,3), (2,6), (1,3), (1,4), (1,5), (3,7) (4,7) (5,6) (6,8) (6,8), (8,10), (7,9)

The output module 29 then identifies for each of the ordered links the corresponding link in the speech link data 32 and outputs to the data compression module in the order corresponding to the order of the links the data associated with each of those links.

Thus in this way the data compression module 12 is made to receive a shape encoding 42 and a link list 43 representative of a lattice structure, a list of timing data 34 links and nodes 38 and cross links 39 which have been added or removed from the lattice structure dummy data 34 and in a defined order other data associated with each nodes and links in the original speech lattice and data associated with each of the links in the original speech lattice.

All of this data is then processed in a conventional manner by the data compression module 12 before being despatched in a compressed form by the network 32 to the document storage unit 2.

Processing Performed by the Document Storage Unit

The processing performed by the document storage unit 2 in response to receipt of compressed speech lattice data will now be described in detail with reference to FIG. 15.

Initially, (S15-1) when compressed data is received from the client computer 1 via the network 3, the compressed data is decompressed by the decompression unit 15 in a conventional manner.

The decompression of data by the decompression unit 15 enables the document storage unit 2 to regenerate the shape encoding 42, link list 43, list of dummy nodes and links 38 and cross links 39 and timing data 34 and the original ordered data associated with links and nodes by the speech node data 30 and speech link data 32 respectively.

The other data associated with the speech nodes by speech node data 30 is regenerated to be the order in which it was output by the lattice processor to the data compression module 12. Each item of other data is associated with a node number, with the node numbers being generated in numerical order. This data is stored by the regeneration module 17. Also stored by the regeneration module 17 is the timing data 34, dummy links and nodes 38, cross links 39, shape encoding 42 and link list 43 obtained by processing the compressed data by the decompression unit 15.

The regeneration module 17 then (S15-2) proceeds to process the received shape encoding 42 and link list 43. The processing by the regeneration module 17 is identical to the processing performed by the decoding module 28 which has previously been described and will not be repeated here except instead of selecting numbers from a node list 44 whenever a new node is required by the lattice processor 17 the next numerical available number is utilised.

As a result of processing the shape encoding 42 and link list 43, embedding data and link data will be generated by the regeneration module 17 defining the lattice structure encoded by the lattice processor 11 of the client computer 1. This data is then utilised to create lists of linked nodes and timing data for each of the items of speech node data 30 stored by the regeneration module 17.

The lattice processor 17 then (S15-3) orders the link data in the embedding table 36 by start node and end node as has previously been described in relation to the processing by the output module 29 of the lattice processor 11 of the client computer 1. Speech link data 32 is then generated by associating the received other data associated with links in the order of which the other data was received with the ordered data identifying links from the embedding table 36. This data is stored as speech link data 32 by the regeneration module 17.

After speech node data 30 and speech link data 32 has been recreated by the regeneration module 17 the speech node data 30 and speech link data 32 is passed to the document retrieval unit 19. The document retrieval unit 19 then (S15-4) utilises the received speech node data 30 and speech link data 32 to select a document for retrieval which is then passed via the network 3 to the client computer 1. Thus in this way the speech lattice generated by the client computer 1 is utilised to access documents stored in the document storage unit 2 with the speech lattice generated for a speech signal being encoded and compressed for transmission via the network 3.

Other Embodiments and Modifications

Although in the above described embodiment data associated with nodes and links has been described as being ordered in specific ways, it will be appreciated that once the shape of a lattice structure represented by shape encoding and a link list has been determined in the form of embedding data and link data in an embedding table 36, any suitable ordering could be utilised to assign specific data to identified nodes or links.

Although in the above described embodiment the processing of the embedding module 22 has been described as ordering nodes within layers based upon order numbers calculated as the average value for the position of nodes in a previous layer, it will be appreciated that any conventional technique for minimising the numbers of cross links in an embedding of a lattice structure could be utilised to perform this ordering. Thus for example, ordering could be performed on the basis of a median value rather than an average value.

In the above described embodiment the embedding table 36 is described as being reordered to minimise the number of cross links in an initial embedded representation. It will be appreciated that this step is performed in order to minimise the amount of cross link data 39 subsequently transmitted via the network 3 to the document storage unit 2. It will, however, be appreciated that the reordering step could be omitted and more cross link data 39 could instead be transmitted via the network 3.

In the above described encoding system dummy nodes are encoded using the letters DE for each dummy node encoded. It will be appreciated a shorter encoding of D could be used. In such an embodiment link encoding data for different links could be read off by continuing to read symbols from the link list 44 until the number of symbols E exceeds the number of symbols M and P. When processing the link encodings the level data associated with a link would be updated by one each time a letter D was encountered and the letter D removed from the head of the link encoding being processed.

It will be further appreciated that where there are multiple copies of the same letter in a link encoding, the link encoding data could instead be represented by a first encoding identifying different letters and a second encoding representing for each of the different letters a number indicating the number of times a particular letter was repeated.

Thus, for example, in the case of a link list [DDDDDDEEEEEEE] the link list could instead be represented in the form of two lists, one the list [DE] and the other the list [6,7].

In the case of such an embodiment, where multiple sets of letter D are encoded adjacent to one another, the level data associated with a link could be automatically updated by incrementing level data by the number of consecutive D's rather than processing each letter D separately.

Further, in other embodiments the two lists could comprise a list of letters and a list of numbers where only duplicate letters for dummy nodes were removed from the list of letters and the list of numbers identifies the number of repeated encodings of dummy nodes. In such embodiments, as above, the letters for a dummy node or nodes could be processed in one step by incrementing level data by the number associated with the letter in the number list.

Although in the above described embodiment, the offset values for adding new areas to a lattice structure being generated are described as being either positive or negative values, will be appreciated that in an alternative embodiment, only positive numbers might be used where the offset identifies the number of nodes around the boundary in a particular direction separating the last node used to generate an area from the next node being used to generate an area.

Alternatively, instead of using offset values for the relative positions of a current node and the next node to be processed on a boundary list, offset values relative to a current node in for example the node list could be used. Or more generally any suitable offset which enabled the next node to be identified from the value for the offset and the current node could be used.

In the above described embodiment when link encoding data 40 is being generated and either two links are merged the new link encoding data is described as being generated by appending link encoding data associated with links being removed in an order depending on the length of the link encoding data 40 for those links. Generating link encoding data 40 for a new link in this way is preferable in that this tends to generate sequences of letters which repeat and hence are highly susceptible to compression to using conventional techniques. Other methods of generating this encoding data 40 could however be utilised for example selecting the order in which link encoding data is appended based upon the ordering of links in the embedding table 36.

In the above described embodiment, dummy nodes are described as being added to all links which connect nodes are associated with non adjacent timing data. All of the dummy nodes are then encoded using the link encoding data. The subsequent decoding of the generated link encoding data is then utilised to ensure that when nodes are regenerated they are associated with the correct timings.

It will be appreciated that where nodes are added which are the end node for more than one link, it would be sufficient to ensure that when the link encoding is processed at least one generated link having a node as an end node is associated with level data such that the end node can be correctly placed in a layer and hence associated with the correct timing data.

In an alternative embodiment, after the lattice representation has been generated where each node is separated in all paths from the start node by the same number of nodes. The generated lattice structure could then be processed to remove a number of dummy nodes whilst ensuring that each proper node in the lattice structure is still separated from the start node by the same number of nodes as previously on at least on path reaching that node. The simplified lattice could then be encoded in the same way as has previously been described.

More specifically, starting with the first layer all real nodes in the first layer could be identified and associated with data identifying the layer for the nodes as being known. For each link having a real start node associated with data identifying a known layer, the real end nodes identified by those links are then also associated with data identifying the real end nodes has having known layers.

When all of the links have been considered, each real node not associated with known layer data can then be identified. Starting with real nodes in the second layer, if any real node is not associated with known layer data a depth first search could then be performed to find the shortest path from a real node in any earlier layer associated with known layer data to the node being considered. All dummy nodes in the path are then identified as being preserved and the real node being processed is associated with known layer data. This process is then repeated for each successive layer until the all real nodes are identified as having known layers. The dummy nodes not identified as being preserved can then be deleted.

When decoding the lattice, whenever a new node was to be added to the embedding data within the embedding table 36 the links containing the new node as an end node could then be identified and the new node associated with a layer identified by the greatest number determined from the level data for the links. The resultant structure generated in such an embodiment would be identical that generated in the manner described in the above embodiment. However, as a number of dummy nodes would have been removed and not encoded, the amount of data necessary to be compressed by the compression unit 12 would be smaller and hence better compression could be achieved.

Although in the above described embodiment crosslinks are described as being removed before determining link encodings, in an alternative embodiment crosslinks could be identified and encoded when link encodings were being generated. In such an embodiment, a link encoding of the form (C, Start Node, End Node) could be utilised to identify that a crosslink had been encoded. When decoding the link encodings, the crosslinks could then be regenerated from this data identifying that a crosslink between two nodes had been encoded.

Although in the above described embodiment a planar graph is described as being generated and then simplified by removing linear and parallel paths before being encoded as a shape encoding, it will be appreciated that the simplification of a planar graph representing parts of a lattice could be omitted.

In such an embodiment, where a single linear path extends between two layers a shape encoding in the form (offset, number of links, 0) could be used. Where a pair of links have the same start node and end node a shape encoding of the form (offset, 1,1) could be used.

The subsequent processing of the resultant shape encodings would substantially be the same as previously described except the encoding (0,1,1) would no longer indicate a single link extending from the tip of a lattice and instead the final number of the shape encoding being zero would indicate that a single path was being added to the tip of the lattice.

In the case of such an embodiment, the lattice of FIG. 6E could be encoded in the form of a simple shape encoding as follows, where the offset values are calculated in the same way as previously described:

[0,2,2,1,3,3,2,3,3,0,1,1,−4,3,3,0,3,3]

In the described embodiment the regeneration of a lattice from a shape encoding and a link encoding has been described as being built up by processing the shape encoding and link encoding at the same time. In other embodiments, an initial lattice structure could be generated by processing only the shape encoding where link encoding data was associated with the links in the initial structure. After the whole of the shape encoding had been processed, the link encoding could then be processed and layer data associated with nodes in the initial lattice updated using the link encoding and additional nodes and links being added when processing the link encoding.

In the above described embodiment, data associated with links has been described as being ordered based upon an ordering of links in an embedding generated from a shape encoding and a link encoding. Other orderings could however be used. More specifically the data associated with links in a lattice could be ordered in the order in which those links are generated from a shape encoding and a link encoding. By ordering data in this way complete representations of portions of a lattice could be regenerated before the whole of the lattice structure had been determined.

In the above embodiment all nodes are processed so as to add dummy links to nodes which are not both the start node and the end node of at least one link. In an alternative embodiment, instead of adding dummy links the shape encoding could identify nodes as being unconnected. For example a shape encoding of the form (offset, 0, 1) could be used to identify a link from the node identified by the offset to an unconnected node in one direction and an encoding of the form (offset, 0, 0) could be used to identify a link in the opposite direction:

Alternative methods of identifying unconnected nodes could be used to identify nodes being only the end node or only the start node of multiple links.

Thus for example in the case of a node which is not a start node for any links a shape encoding could be used to identify that node. For example, the encoding of the form (offset, −1, −1) could be used. When processing the next area, the identified node could then be ignored with the identified node being deleted from the boundary list and the final node in one boundary list being added to the other boundary list so that areas surrounding the unconnected node could then be encoded.

In the case of a node not being an end node of any links, a shape encoding could be used to identify the node which was not an end node for any link. The layer data associated with the identified node could then be modified so that the identified node precedes the nodes to which it is connected. The areas adjacent to the identified node could then be processed in the normal way.

Although in the above embodiment, an encoding method has been described which enables an original lattice structure to be regenerated, in some embodiments a lattice corresponding only in part to an original lattice could be generated. Thus for example, after determining an embedding of an original lattice a number of links could then be removed so that a planar graph with no crossing links was determined. Only the portions of the speech lattice corresponding to the structure defined by the planar graph might then be processed in the manner described above.

Although only part of the original lattice would then be represented by the generated data, as no cross link data would need to be generated, improved compression would be possible. In such a system the links removed and not represented could be selected as cross links associated with low probabilities so that the encoded structure represents the more probable hypotheses of what a received signal represents.

Alternatively, instead of removing crossing links to generate a planar graph other methods could be used. In one example dummy nodes could be introduced at all cross points and the crossing links replaced by links via the added dummy nodes.

Alternatively, where it was determined that a portion of a lattice could not be represented without any crossing links, additional copies of the nodes and links representing that portion could be generated and the crossing link replaced by a link to the added portion. Although in such an embodiment the size of the lattice would increase, because the encoding of the corresponding areas would be similar, the generated data for the larger lattice should be compressible to a similar size as the encoding for the original lattice.

In the above described embodiment, a reordering of nodes is described which reduces the numbers of crosslinks. The complexity of reordering of nodes in this way is dependent upon the numbers of nodes and links to be processed. It will be appreciated that in an alternative embodiment, the lattice structure being processed could be simplified prior to performing the reordering step.

Thus for example link encodings for portions of the lattice could be determined so that the numbers of nodes and links represented in the lattice structure could be reduced. The simplified lattice could then be reordered to minimise crosslinks. Any remaining crosslinks could then be removed and the lattice processed further to remove any further portions which could be represented by link encoding data at that time. A shape encoding for the remaining lattice structure could then be generated in the same way as has previously been described.

Although in the above described embodiment dummy nodes are described as being used to enable nodes to be associated with the correct items of timing data, other methods could be used. In one example a list of time offsets could be used to identify for each node in the node list the relative layer for that node relative to the immediately previous node in the list.

Although in the above described embodiment, data identifying a shape encoding for areas in the form of an offset and a number links in an upper end lower path has been described other ways could be used to identify the shape of areas.

Thus for example a number identifying the number of links bounding an area and data identifying the last link of the boundary of an encoded area which also forms part of the area being encoded could be used. Shapes generated in such a system would then need to be processed to associate nodes with timing data. This could be achieved by explicitly encoding the timings for nodes.

Alternatively, where all dummy nodes are retained, the upper and lower paths forming areas would necessarily contain the same number of nodes and links. Thus such areas could be encoded in the form of data identifying a start node and data identifying the number of links in one path only as the other path would necessarily contain the same number of nodes.

Although in the above embodiment processing of speech lattices has been described, it will be appreciated that the present invention is more widely applicable. Thus for example the present invention could be utilised to encode any lattice structure in which the nodes could be placed in some order so that an embedded representation of the lattice could be created.

Where a lattice structure such as a lattice structure for a graphical representation of an object is to be encoded which does not have a defined start node and end node and ordering of nodes, an arbitrary start node end node and ordering of nodes could be determined so that the lattice could be processed.

Although in the above described embodiments transmission of compressed encoding data is described, it will be appreciated that the present invention is equally applicable for the compression of lattice structure data for storage.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method of generating recognition data, comprising:
   receiving lattice data defining a lattice structure comprising a plurality of nodes connected by links, said links being associated with data identifying units;
   determining for at least part of the lattice structure defined by said lattice data a plurality of areas having edges and vertices defined by the nodes and links of at least part of said lattice structure;
   generating for said areas, data identifying the number of links bounding each area and data identifying the location of said areas within at least part of said lattice structure; and
   outputting as recognition data: data identifying said units associated with links and said data defining areas.

2. A method of generating recognition data in accordance with claim 1 further comprising the steps of:
   determining difference data identifying the differences between said at least part of said lattice structure and the lattice structure defined by said received data; and
   outputting as recognition data: data identifying said units associated with links; said data defining areas; and said difference data.

3. A recording medium, storing computer implementable processor steps for causing a programmable computer to perform a method in accordance with claim 1.

4. A method of generating data defining a speech lattice comprising:
   receiving data defining a first speech lattice comprising a plurality of nodes interconnected by links, said links being associated with data identifying speech units;
   processing said received data to determine a second speech lattice comprising a planar graph having a number of nodes interconnected by links where none of the links cross, said links being associated with data identifying speech units, the nodes and links of said planar graph defining vertices and edges of areas in a two dimensional plane;
   generating as data defining said planar graph, identifying data identifying the number of links bounding each said area defined by said planar graph and the location of said areas within said planar graph; and
   outputting as data defining said second speech lattice said identifying data and data identifying speech units associated with links of the planar graph defined by said identifying data.

5. A method in accordance with claim 4, wherein:
   said processing comprises:
   determining an embedding in a two dimensional plane of the lattice structure defined by said received data; and
   processing said determined embedding to generate said second speech lattice.

6. A method in accordance with claim 5 wherein:
   said processing said determined embedding comprises:
   identifying within said determined embedding portions of said embedding identifying links which cross; and
   deleting some of said identified crossing links to generate said second speech lattice.

7. A method in accordance with claim 6 wherein said identifying within said determined embedding portions of said embedding identifying links which cross comprises:
   determining cross links data identifying how many links each link crosses; and
   utilising said cross links data to select some of said identified links which cross to be removed to eliminate crossing links from said embedding.

8. A method in accordance with claim 7 wherein the selected links comprise links crossing more links than the identified crossing links not removed.

9. A method in accordance with claim 6 wherein said some of said identified cross linkings deleted comprise crossing links removed on the basis of probability data associated with said links.

10. A method in accordance with claim 5 wherein said determining of an embedding of said lattice structure comprises:
   determining an initial embedding of said lattice structure in a two-dimensional plane; and
   processing said initial embedding to determine a further embedding of said lattice structure wherein the number of links which cross in said further embedding is fewer than the number of links which cross in said initial embedding.

11. A method in accordance with claim 4 wherein said generating identifying data comprises generating for each said area:
   data identifying one node forming a vertex of said area; and
   a first and a second number identifying the number of links in a pair of paths from said first node to a selected second node defining another vertex of said area.

12. A method in accordance with claim 11 wherein each of said nodes is associated with one of a number of ordered layers, wherein said first node of an area comprises the node defining a vertex in one layer and said second node comprises a node defining a vertex associated with a layer further removed from said layer associated with said first node than the layers associated with other nodes defining vertices of said area.

13. A method in accordance with claim 12 wherein each of said nodes in said lattice structure is associated with timing data, the nodes associated with the same timing data being associated with the same layers.

14. A method in accordance with claim 4 wherein said generating identifying data comprises generating for each said area data identifying one node forming a vertex of said area, data identifying the total number of links bounding said area; and data identifying the number of links said area shares with areas for which data has already been generated.

15. A method in accordance with claim 4 wherein said generating identifying data comprises generating data identifying a first selected area; and
   generating data identifying the remaining areas defined by said planar graph wherein the order in which said identifying data is generated is such that the areas for which identifying data is generated correspond to areas adjacent to areas for which identifying data has previously been generated.

16. A method in accordance with claim 15 wherein said data identifying a node defining a vertex of an area comprises an offset value identifying the position of said node relative to the node identifying a vertex of an area for which identifying data has previously been generated.

17. A method in accordance with claim 16 wherein said offset value comprises an offset value identifying the relative positions of said nodes in a list of nodes.

18. A method in accordance with claim 17 wherein said list comprises a circular list.

19. A method in accordance with claim 18 wherein said offset values comprise positive or negative numbers identifying offsets in different directions in said list.

20. A method in accordance with claim 17 wherein said list comprises a list of nodes identifying the vertices of the boundary of area for which data has been generated.

21. A method in accordance with claim 4 wherein said identifying data comprises a concatenation of said identifying data generated for each of said area defined by said planar graph.

22. A method in accordance with claim 21 wherein said concatenation of said identifying data comprises a concatenation ordered in the order in which identifying data has been generated for said areas.

23. A method of generating a lattice comprising:
   receiving shape data defining a number of areas in a two dimensional plane having vertices and edges corresponding the nodes and links in a planar graph where none of said links cross;
   receiving items of hypothesis data associating links of the planar graph defined by shape data with data identifying units; and
   generating a lattice comprising a plurality of nodes connected via links by:
   determining the planar graph defined by said shape data; and
   associating the links of said determined planar graph with units utilising said hypothesis data.

24. A method in accordance with claim 23 wherein said shape data comprises for each of said areas:
   data identifying one node forming a vertex of said area; and
   a first and a second number identifying the number of links in a pair of paths from said first node to a selected second node defining another vertex of said area.

25. A method in accordance with claim 24 wherein each of said nodes is associated with one of a number of ordered layers, wherein said first node of an area comprises the node defining a vertex in one layer and said second node comprises a node defining a vertex associated with a layer further removed from said layer associated with said first node than the layers associated with other nodes defining vertices of said area.

26. A method in accordance with claim 25 wherein each of said nodes in said lattice structure is associated with timing data, the nodes associated with the same timing data being associated with the same layers.

27. A method in accordance with claim 23 wherein said shape data comprises for each of said areas data identifying one node forming a vertex of said area, data identifying the total number of links bounding said area; and data identifying the number of links said area shares with areas for which data has already been generated.

28. A method in accordance with claim 24 wherein said data identifying a node defining a vertex of an area comprises an offset value identifying the position of said node relative to the node identifying a vertex of an area for which data has previously been generated.

29. A method in accordance with claim 28 wherein said offset value comprises an offset value identifying the relative positions of said nodes in a list of nodes.

30. A method in accordance with claim 29 wherein said list comprises a circular list.

31. A method in accordance with claim 30 wherein said offset values comprise positive or negative numbers identifying offsets in different directions in said list.

32. A method in accordance with claim 29 wherein said list comprises a list of nodes identifying the vertices of the boundary of area for which data has been generated.

33. A method in accordance with claim 29 wherein said identifying data comprises a concatenation of said data generated for each of said area defined by said planar graph.

34. A method in accordance with claim 33 wherein said concatenation of said identifying data comprises a concatenation ordered in the order in which identifying data has been generated for said areas.

35. A method of generating data defining a lattice structure comprising:
   receiving data defining a lattice structure comprising a plurality of nodes interconnected by links;
   processing the received data to determine the differences between an embedding of said lattice structure in a two dimensional plane and a planar graph comprising a number of nodes interconnected by links where none of the links cross, the nodes and links of said planar graph defining edges and vertices of areas in a two dimensional plane;
   generating difference data identifying said determined differences;
   generating for said areas of said two dimensional plane defined by said planar graph, identifying data identifying the number of links bounding each said area and data identifying of the location of the said area within said planar graph; and
   outputting as data defining said lattice structure, said generated identifying data and said generated difference data.

36. A method in accordance with claim 35 wherein said processing comprises:
   determining an embedding of said lattice structure in a two dimensional plane;
   identifying within said determined embedding, portions of said embedding identifying links which cross; and
   identifying for said determined embedding a planar graph having no crossing links which corresponds to said embedding in the absence of some of said identified links wherein said difference data comprises data identifying the differences between said determined embedding and said identified planar graph.

37. A method in accordance with claim 36 wherein said processing comprises:
   determining an embedding of said lattice structure in a two dimensional plane;
   identifying within said determined embedding, portions of said embedding identifying links which cross; and
   generating a planar graph having no crossing links by removing from said determined embedding, data identifying some of said links which cross, wherein said difference data includes data identifying links removed from said determined embedding of said lattice structure.

38. A method in accordance with claim 36 wherein said identifying within said determined embedding portions of said embedding identifying links which cross comprises:
   determining cross links data identifying how many links each link crosses; and
   utilising said cross links data to select some of said identified links which cross to be removed to eliminate crossing links from said embedding.

39. A method in accordance with claim 38 wherein the selected links comprise links crossing more links than the identified crossing links not removed.

40. A method in accordance with claim 36 wherein said determining of an embedding of said lattice structure comprises:
   determining an initial embedding of said lattice structure in a two-dimensional plane; and
   processing said initial embedding to determine a further embedding of said lattice structure wherein the number of links which cross in said further embedding is fewer than the number of links which cross in said initial embedding.

41. A method in accordance with claim 36 further comprising:
   receiving data associating each of said nodes of said lattice structure defined by received data with an item of timing data said items of timing data together defining a sequence of timings;
   identifying nodes associated with the same timing data; and
   modifying said determined embedding of said lattice structure by:
   determining whether said first timing is associated with a single node; and
   if said timing is not associated with a single node, generating a earlier timing in said sequence, a dummy node associated with said earlier timing, and generating links between said generated dummy node and the nodes associated with said first timing wherein said difference data includes data identifying said added node.

42. A method in accordance with claim 41, wherein said modifying said determined embedding of said lattice structure further comprises:
   determining whether said last timing is associated with a single node; and
   if said timing is not associated with a single node, generating a later timing in said sequence, a dummy node associated with said later timing and links between said generated dummy node and the nodes associated with said last timing, wherein said difference data includes data identifying said added node.

43. A method in accordance with claim 41, wherein said modifying said determined embedding of said lattice structure further comprises:
   replacing links between nodes which are associated with non-adjacent timings in said sequence of timings with a series of links connecting dummy nodes associated with timing data for each of said timings within said sequence between said timing of said nodes identified by said removed link; wherein said difference data includes data identifying said modified portions of said lattice structure.

44. A method in accordance with claim 41 wherein said modifying said determined embedding of said lattice structure further comprises:
   determining for the nodes not associated with the earliest and latest timings of said sequence of timing, whether each said node is identified as the start node and end node of links in said embedded lattice by links not crossing other links; and
   if a node is not identified as both a start node and end node, adding further links to said embedding so that all of said nodes are identified as both a start node and end node of a link; wherein said difference data includes data identifying said added links.

45. A method in accordance with claim 41 wherein said modifying said determined embedding of said lattice structure further comprises:
   determining nodes of said lattice structure linked to nodes associated with the first timing in said sequence of timings via one or more paths which do not include any dummy nodes; and
   determining for nodes associated with successive timings in said sequence of timings whether any nodes are not in said determined group and identifying for said nodes a path comprising dummy nodes connecting said nodes to nodes in said determined group associated with earlier timings; and replacing paths between nodes via dummy nodes not included in said identified paths, with links between said nodes, wherein said difference data includes data identifying the remaining dummy nodes.

46. A method in accordance with claim 36 further comprising:

modifying said determined embedding by identifying portions of said embedding defining paths between pairs of nodes wherein said portions are not linked to any other nodes of said lattice structure;

replacing said portions with data identifying a single link between said pair of nodes; and associating said link between said pair of nodes with data identifying the nodes and links in said deleted portions; wherein said difference data include said data associated with links.

47. A method in accordance with claim 46 wherein said portions comprise paths between pairs of nodes paths via other nodes, said other nodes being identified as the start node of a single link and the end node of a single link wherein said data associated with a generated link comprises data identifying the removal of said node and data associated with the deleted links having said node as a start node and an end node.

48. A method in accordance with claim 46, wherein said portions comprise paths between pairs of nodes comprising a pair of links between said pair of nodes; wherein said data associated with a generated link between said nodes comprises data identifying the merger of said pair of links and the data associated with the deleted links.

49. A method in accordance with claim 48 wherein said data associated with a link replacing a pair of merged links comprises data identifying the merger of a pair of links and the concatenation of the data associated with said merged links, said data being concatenated in an order dependent upon the amount of data associated with each said link.

50. A method in accordance with claim 35 wherein said generating identifying data comprises:

data identifying one node forming a vertex of said area; and a first and a second number identifying the number of links in a pair of paths from said first node to a selected second node defining another vertex of said area.

51. A method in accordance with claim 50 wherein each of said nodes is associated with one of a number of ordered layers, wherein said first node of an area comprises the node defining a vertex in one layer and said second node comprises a node defining a vertex associated with a layer further removed from said layer associated with said first node than the layers associated with other nodes defining vertices of said area.

52. A method in accordance with claim 51 wherein each of said nodes in said lattice structure is associated with timing data, the nodes associated with the same timing data being associated with the same layers.

53. A method in accordance with claim 35 wherein said generating identifying data comprises data identifying one node forming a vertex of said area, data identifying the total number of links bounding said area; and data identifying the number of links said area shares with areas for which data has already been generated.

54. A method in accordance with claim 35 wherein said generating identifying data comprises generating data identifying a first selected area; and generating data identifying the remaining areas defined by said planar graph wherein the order in which said identifying data is generated is such that the areas for which identifying data is generated correspond to area adjacent to areas for which identifying data has previously been generated.

55. A method in accordance with claim 54 wherein said data identifying a node defining a vertex of an area comprises an offset value identifying the position of said node relative to the node identifying a vertex of an area for which identifying data has previously been generated.

56. A method in accordance with claim 55 wherein said offset value comprises an offset value identifying the relative positions of said nodes in a list of nodes.

57. A method in accordance with claim 56 wherein said list comprises a circular list.

58. A method in accordance with claim 56 wherein said offset values comprise positive or negative numbers identifying offsets in different directions in said list.

59. A method in accordance with claim 56 wherein said list comprises a list of nodes identifying the vertices of the boundary of area for which identifying data has been generated.

60. A method in accordance with claim 35 wherein said identifying data comprises a concatenation of said identifying data generated for each of said area defined by said planar graph.

61. A method in accordance with claim 60 wherein said concatenation of said identifying data comprises a concatenation ordered in the order in which identifying data has been generated for said areas.

62. A method in accordance with claim 35 wherein said difference data comprises a concatenation of said generated data associated with links of a planar graph.

63. Apparatus for generating recognition data, comprising:

a receiver operable to receive lattice data defining a lattice structure comprising a plurality of nodes connected by links, said links being associated with data identifying units;

a determinator operable to determine for at least part of the lattice structure defined by lattice data received by said receiver a plurality of areas having edges and vertices defined by the nodes and links of at least part of said lattice structure;

a generator operable to generate for said areas determined by said determinator, data identifying the number of links bounding each area and data identifying the location of said areas within at least part of said lattice structure; and an output unit operable to output as recognition data: data identifying said units associated with links and said data defining areas.

64. Apparatus for generating recognition data in accordance with claim 63 further comprising a difference determination unit operable to determine:

difference data identifying the differences between said at least part of said lattice structure and the lattice structure defined by said received data; wherein said output unit is operable to output as recognition data: data identifying said units associated with links; said data defining areas; and said difference data.

65. A recording medium storing computer implementable processor steps for causing a programmable computer to become configured as an apparatus in accordance with claim 63.

66. Apparatus for generating data defining a speech lattice comprising:

a receiver operable to receive data defining a first speech lattice comprising a plurality of nodes interconnected by links, said links being associated with data identifying speech units;

a processing unit operable to process data received by said receiver to determine a second speech lattice comprising a planar graph having a number of nodes interconnected by links where none of the links cross, said links being associated with data identifying speech units, the nodes and links of said planar graph defining vertices and edges of areas in a two dimensional plane;

a generator operable to generate as data defining a planar graph determined by said processing unit, identifying data identifying the number of links bounding each said area defined by said planar graph and the location of said areas within said planar graph; and an output unit operable to output as data defining said second speech lattice said identifying data generated by said generator and data identifying speech units associated with links of the planar graph defined by said identifying data received by said receiver.

67. Apparatus in accordance with claim 66, wherein:

said processing unit comprises:

an embedding unit operable to determine an embedding in a two dimensional plane of the lattice structure defined by data received by said receiver, and an embedding processor operable to process said determined embedding to generate said second speech lattice.

68. Apparatus in accordance with claim 67 wherein:

said embedding processor is operable to identify within said determined embedding portions of said embedding identifying links which cross; and delete some of said identified crossing links to generate said second speech lattice.

69. Apparatus in accordance with claim 68 wherein said embedding processor is operable to identify within said determined embedding portions of said embedding identifying links which cross by:

determining cross links data identifying how many links each link crosses; and utilising said cross links data to select some of said identified links which cross to be removed to eliminate crossing links from said embedding.

70. Apparatus in accordance with claim 69 wherein the selected links comprise links crossing more links than the identified crossing links not removed.

71. Apparatus in accordance with claim 68 wherein said receiver is operable to receive probability data associating probabilities with links in said lattice; said embedding processor being operable to delete links on the basis of probability data associated with said links.

72. Apparatus in accordance with claim 67 wherein said embedding unit is operable to:

determining an initial embedding of said lattice structure in a two-dimensional plane; and process said initial embedding to determine a further embedding of said lattice structure wherein the number of links which cross in said further embedding is fewer than the number of links which cross in said initial embedding.

73. Apparatus in accordance with claim 66 wherein said generator is operable to generate identifying data comprising for each said area:

data identifying one node forming a vertex of said area; and a first and a second number identifying the number of links in a pair of paths from said first node and a selected second node defining another vertex of said area.

74. Apparatus in accordance with claim 73 wherein said processing unit is operable to associate each of said nodes with one of a number of ordered layers, wherein said generator is operable to generate identifying data where said first node of an area comprises the node defining a vertex in one layer and said second node comprises a node defining a vertex associated with a layer further removed from said layer associated with said first node than the layers associated with other nodes defining vertices of said area.

75. Apparatus in accordance with claim 74 wherein said receiver is operable to receive data associating each of said nodes in said lattice structure is associated with timing data, the nodes associated with the same timing data being associated with the same layers.

76. Apparatus in accordance with claim 66 wherein said generator is operable to generate for each area identifying data comprising data identifying one node forming a vertex of said area, data identifying the total number of links bounding said area; and data identifying the number of links said area shares with areas for which data has already been generated.

77. Apparatus in accordance with claim 66 wherein said generator is operable to generate data identifying a first selected area; and generate data identifying the remaining areas defined by said planar graph wherein the order in which said identifying data is generated is such that the areas for which identifying data is generated correspond to area adjacent to areas for which identifying data has previously been generated.

78. Apparatus in accordance with claim 77 wherein said generator is operable to generate for each area, data identifying a node defining a vertex of said area comprising an offset value identifying the position of said node relative to the node identifying a vertex of an area for which identifying data has previously been generated.

79. Apparatus in accordance with claim 78 wherein said offset value comprises an offset value identifying the relative positions of said nodes in a list of nodes.

80. Apparatus in accordance with claim 79 wherein said list comprises a circular list.

81. Apparatus in accordance with claim 80 wherein said offset values comprise positive or negative numbers identifying offsets in different directions in said list.

82. Apparatus in accordance with claim 79 wherein said list comprises a list of nodes identifying the vertices of the boundary of area for which identifying data has been generated.

83. Apparatus in accordance with claim 66 wherein said generator is operable to generate identifying data comprising a concatenation of said identifying data generated for each of said area defined by said planar graph.

84. Apparatus in accordance with claim 83 wherein said concatenation of said identifying data comprises a concatenation ordered in the order in which identifying data has been generated for said areas.

85. Apparatus in accordance with claim 66 further comprising:

a compressor operable to compress output data defining said lattice structure output by said output unit; and a transmitter operable to transmit said compressed data generated by said compressor.

86. Apparatus in accordance with claim 85, further comprising:

a decompressor operable to receive and decompress compressed data transmitted by said transmitter;

a regeneration unit operable to process identifying data and said difference data by said decompressor to determine said defined lattice structure.

87. Apparatus in accordance with claim 86 wherein said regeneration unit is operable to:
  generate a planar graph utilising said identifying data; and
  associate the links of said planar graph with data identifying speech units utilising said data identifying speech units.

88. Apparatus for generating a lattice comprising:
  a receiver operable to receive shape data defining a number of areas in a two dimensional plane having vertices and edges corresponding the nodes and links in a planar graph where none of said links cross; and
  items of hypothesis data associating links of the planar graph defined by shape data with data identifying units;
  a generator operable to generate a lattice comprising a plurality of nodes connected via links by:
  determining the planar graph defined by said shape data received by said receiver; and
  associating the links of said determined planar graph with units utilising said hypothesis data received by said receiver.

89. Apparatus in accordance with claim 88 wherein said receiver is configured to receive shape data comprising for each of said areas:
  data identifying one node forming a vertex of said area; and
  a first and a second number identifying the number of links in a pair of paths from said first node and a selected second node defining another vertex of said area.

90. Apparatus in accordance with claim 89 wherein said receiver is operable to receive data associating each of said nodes with one of a number of ordered layers, wherein said first node of an area comprises the node defining a vertex in one layer and said second node comprises a node defining a vertex associated with a layer further removed from said layer associated with said first node than the layers associated with other nodes defining vertices of said area.

91. Apparatus in accordance with claim 90 wherein said receiver is operable to receive data associating each of said nodes in said lattice structure with timing data, the nodes associated with the same timing data being associated with the same layers.

92. Apparatus in accordance with claim 88 wherein said receiver is configured to receive shape data comprising for each of said areas data identifying one node forming a vertex of said area, data identifying the total number of links bounding said area; and data identifying the number of links said area shares with areas for which data has already been generated.

93. Apparatus in accordance with claim 89 wherein said receiver is operable to receive data identifying a node defining a vertex of an area comprising an offset value identifying the position of said node relative to the node identifying a vertex of an area for which data has previously been generated.

94. Apparatus in accordance with claim 93 wherein said offset value comprises an offset value identifying the relative positions of said nodes in a list of nodes.

95. Apparatus in accordance with claim 94 wherein said list comprises a circular list.

96. Apparatus in accordance with claim 95 wherein said offset values comprise positive or negative numbers identifying offsets in different directions in said list.

97. Apparatus in accordance with claim 94 wherein said list comprises a list of nodes identifying the vertices of the boundary of an area for which data has been generated.

98. Apparatus in accordance with claim 88 wherein said receiver is operable to receive identifying data comprising a concatenation of said data representative of each of said areas defined by said planar graph.

99. Apparatus in accordance with claim 98 wherein said concatenation of said identifying data comprises a concatenation ordered in the order in which identifying data has been generated for said areas.

100. Apparatus for generating data defining a lattice structure comprising:
  a receiver operable to receive data defining a lattice structure comprising a plurality of nodes interconnected by links;
  a processing unit operable to process data received by said receiver to determine the differences between an embedding of said lattice structure in a two dimensional plane and a planar graph comprising a number of nodes interconnected by links where none of the links cross, the nodes and links of said planar graph defining edges and vertices of areas in a two dimensional plane;
  a difference generator operable to generate difference data identifying differences;
  a shape encoder operable to generate for said areas of a two dimensional plane defined by a planar graph, identifying data identifying the number of links bounding each said area and data identifying of the location of the said area within said planar graph; and
  an output unit operable to output as data defining said lattice structure, said identifying data generated by said shape encoder and said difference data generated by said difference generator.

101. Apparatus in accordance with claim 100 wherein said processing unit comprises:
  an embedding unit operable to determine an embedding of a lattice structure defined by data received by said receiver in a two dimensional plane; and
  a planar graph identification unit operable to identify within said determined embedding, portions of said embedding identifying links which cross; and to identify for an embedding determined by said embedding unit a planar graph having no crossing links which corresponds to said embedding in the absence of some of said identified links wherein said difference data generated by said difference generator comprises data identifying the differences between said embedding and said planar graph identified by said planar graph.

102. Apparatus in accordance with claim 100 wherein said processing unit comprises:
  an embedding unit operable to determine an embedding of a lattice structure defined by data received by said receiver in a two dimensional plane; and
  a planar graph identification unit operable to identify within an embedding determined by said embedding, portions of said embedding identifying links which cross; and to generate a planar graph having no crossing links by removing from said determined embedding, data identifying some of said links which cross, wherein said difference data generated by said difference generator includes data identifying links removed from said determined embedding of said lattice structure by said planar graph identification unit.

103. Apparatus in accordance with claim 101 wherein said planar graph identification unit comprises:
  a cross link identifier operable to determine cross links data identifying how many links each link crosses of an embedding; and
  a link selection unit operable to utilise said cross links data to select some of said identified links which cross to be removed to eliminate crossing links from a said embedding.

104. Apparatus in accordance with claim 103 wherein said link selection unit is operable to select as links to be removed links crossing more links than the identified crossing links not removed.

105. Apparatus in accordance with claim 101 wherein said embedding unit comprises:
an embedding determinator operable to determine an initial embedding of said lattice structure in a two-dimensional plane; and
an embedding processor operable to process an initial embedding determined by said embedding determinator to determine a further embedding of said lattice structure wherein the number of links which cross in said further embedding is fewer than the number of links which cross in said initial embedding.

106. Apparatus in accordance with claim 101 wherein said receiver is operable to receive:
data associating each of said nodes of said lattice structure defined by received data with an item of timing data said items of timing data together defining a sequence of timings; said apparatus further comprising:
a layering unit operable to identify nodes associated with the same timing data; and
a modifying unit operable to modifying an embedding determined by said embedding unit by:
determining whether said first timing is associated with a single node; and
if said timing is not associated with a single node, generating a earlier timing in said sequence, a dummy node associated with said earlier timing, and generating links between said generated dummy node and the nodes associated with said first timing wherein said difference generator is operable to generate difference data including data identifying said added node.

107. Apparatus in accordance with claim 106, wherein said modifying unit is further operable to modify an embedding determined by said embedding unit by:
determining whether said last timing is associated with a single node; and
if said timing is not associated with a single node, generating a later timing in said sequence, a dummy node associated with said later timing and links between said generated dummy node and the nodes associated with said last timing, wherein difference generator is operable to generate said difference data including data identifying said added node.

108. Apparatus in accordance with claim 106, wherein said modifying unit is operable to modify an embedding determined by said embedding unit by:
replacing links between nodes which are associated with non-adjacent timings in said sequence of timings with a series of links connecting dummy nodes associated with timing data for each of said timings within said sequence between said timing of said nodes identified by said removed link; wherein said difference generator is operable to generate said difference data including data identifying said modified portions of said lattice structure.

109. Apparatus in accordance with claim 106 wherein said modifying unit is operable to modify an embedding determined by said embedding unit by:
determining for the nodes not associated with the earliest and latest timings of said sequence of timing, whether each said node is identified as the start node and end node of links in said embedded lattice by links not crossing other links; and
if a node is not identified as both a start node and end node, adding further links to said embedding so that all of said nodes are identified as both a start node and end node of a link; wherein said difference generator is operable to generate said difference data including data identifying said added links.

110. Apparatus in accordance with claim 106 wherein said modifying unit is operable to modify an embedding determined by said embedding unit by:
determining nodes of said lattice structure linked to nodes associated with the first timing in said sequence of timings via one or more paths which do not include any dummy nodes; and
determining for nodes associated with successive timings in said sequence of timings whether any nodes are not in said determined group and identifying for said nodes a path comprising dummy nodes connecting said nodes to nodes in said determined group associated with earlier timings; and
replacing paths between nodes via dummy nodes not included in said identified paths, with links between said nodes, wherein said difference generator is operable to generate difference data including data identifying the remaining dummy nodes.

111. Apparatus in accordance with claim 101 further comprising:
a link encoder operable to modify said determined embedding by identifying portions of said embedding defining paths between pairs of nodes wherein said portions are not linked to any other nodes of said lattice structure;
replacing said portions with data identifying a single link between said pair of nodes; and
associating said link between said pair of nodes with data identifying the nodes and links in said deleted portions; wherein said difference generator is operable to generate difference data including said data associated with links.

112. Apparatus in accordance with claim 111 wherein said link encoder is operable to identify portions comprising paths between pairs of nodes paths via other nodes, said other nodes being identified as the start node of a single link and the end node of a single link wherein said data associated with a generated link comprises data identifying the removal of said node and data associated with the deleted links having said node as a start node and an end node.

113. Apparatus in accordance with claim 111, wherein said link encoder is operable to identify portions comprising paths between pairs of nodes comprising a pair of links between said pair of nodes; wherein said data associated with a generated link between said nodes comprises data identifying the merger of said pair of links and the data associated with the deleted links.

114. Apparatus in accordance with claim 113 wherein said link encoder is operable to associate with a link replacing a pair of merged links comprising data identifying the merger of a pair of links and the concatenation of the data associated with said merged links, said data being concatenated in an order dependent upon the amount of data associated with each said link.

115. Apparatus in accordance with claim 100 wherein said shape encoder is operable to generate identifying data for each area, comprising:
data identifying one node forming a vertex of said area; and
a first and a second number identifying the number of links in a pair of paths from said first node to a selected second node defining another vertex of said area.

116. Apparatus in accordance with claim 115 wherein said processing unit is operable to associate each of said nodes with one of a number of ordered layers, wherein said first node of an area comprises the node defining a vertex in one layer and said second node comprises a node defining a vertex associated with a layer further removed from said layer associated with said first node than the layers associated with other nodes defining vertices of said area.

117. Apparatus in accordance with claim 116 wherein said receiver is operable to receive data to associate each of said nodes in said lattice structure with timing data, the nodes associated with the same timing data being associated by said processing unit with the same layers.

118. Apparatus in accordance with claim 100 wherein said shape encoder is operable to generate identifying data for each area comprising data identifying one node forming a vertex of said area, data identifying the total number of links bounding said area; and data identifying the number of links said area shares with areas for which data has already been generated.

119. Apparatus in accordance with claim 100 wherein said shape encoder is operable to generate data identifying a first selected area; and data identifying the remaining areas defined by said planar graph wherein the order in which said identifying data is generated is such that the areas for which identifying data is generated correspond to area adjacent to areas for which identifying data has previously been generated.

120. Apparatus in accordance with claim 119 wherein said shape encoder is operable to generate for each area data identifying a node defining a vertex of said area comprising an offset value identifying the position of said node relative to the node identifying a vertex of an area for which identifying data has previously been generated.

121. Apparatus in accordance with claim 120 wherein said offset value comprises an offset value identifying the relative positions of said nodes in a list of nodes.

122. Apparatus in accordance with claim 121 wherein said list comprises a circular list.

123. Apparatus in accordance with claim 121 wherein said offset values comprise positive or negative numbers identifying offsets in different directions in said list.

124. Apparatus in accordance with claim 121 wherein said list comprises a list of nodes identifying the vertices of the boundary of area for which identifying data has been generated.

125. Apparatus in accordance with claim 100 wherein said shape encoder is operable to generate identifying data comprising a concatenation of said identifying data generated for each of said area defined by said planar graph.

126. Apparatus in accordance with claim 125 wherein said shape encoder is operable to generate said concatenation of said identifying data ordered in the order in which identifying data is generated for said areas.

127. Apparatus in accordance with claim 100 wherein said difference generator is operable to generate data comprising a concatenation of said generated data associated with links of a planar graph.

* * * * *